US012664403B2

(12) United States Patent
O Conchuir et al.

(10) Patent No.: US 12,664,403 B2
(45) Date of Patent: Jun. 23, 2026

(54) MACHINE LEARNING, CAUSAL INFERENCE, AND PROBABILISTIC COMBINATORIAL TECHNIQUES FOR FORECASTING AND RANKING PREDICTION-BASED ACTIONS

(71) Applicant: Optum Services (Ireland) Limited, Dublin (IE)

(72) Inventors: Breanndan O Conchuir, Warrington (GB); Ciarán McKenna, Dublin (IE); Matthew Robinson, County Wicklow (IE); Amritendu Roy, Limerick (IE); Moataz Ahmed Abdelghaffar Mohamed, Dublin (IE); Saurabh Goel, Kildare (IE); Siddharth Chaudhary, Dublin (IE); Anthony Patrick Reidy, Dublin (IE); Colm Charles Doyle, Wicklow (IE); Mostafa Bayomi, Dublin (IE); Lisa E. Walsh, Dublin (IE); Harutyun Shahumyan, Dublin (IE); Kieran O'Donoghue, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 59 days.

(21) Appl. No.: 18/427,552

(22) Filed: Jan. 30, 2024

(65) Prior Publication Data

US 2025/0131363 A1 Apr. 24, 2025

Related U.S. Application Data

(60) Provisional application No. 63/591,559, filed on Oct. 19, 2023.

(51) Int. Cl.
G06Q 10/06 (2023.01)
G06N 3/042 (2023.01)
(Continued)

(52) U.S. Cl.
CPC ............... *G06N 3/042* (2023.01); *G06N 5/04* (2013.01); *G06Q 10/0635* (2013.01); *G06Q 10/06375* (2013.01)

(58) Field of Classification Search
CPC .................................................... G06Q 10/06
See application file for complete search history.

(56) References Cited

U.S. PATENT DOCUMENTS 11,308,567 B2   4/2022   Lachs et al.
11,574,731 B2   2/2023   Johnson et al.
(Continued)

FOREIGN PATENT DOCUMENTS

WO   2014/117151 A1   7/2014
WO   2022/272005 A1   12/2022

OTHER PUBLICATIONS

Mohammadi, et al., "Data Analytics and Modeling for Appointment No-show in Community Health Centers", Journal of Primary Care & Community Health, vol. 9, pp. 1-11, (2018), DOI: 10.1177/2150132718811692.
(Continued)

*Primary Examiner* — Nga B Nguyen
(74) *Attorney, Agent, or Firm* — ALSTON & BIRD LLP

(57) ABSTRACT

Various embodiments of the present disclosure provide computer forecasting techniques for initiating presentation of an interactive user interface. The techniques may include receiving one or more candidate prediction-based actions and generating a plurality of causal risk-based impact scores with respect to a candidate prediction-based action. The techniques include generating a plurality of causal quality-based impact scores and an action sequence for a plurality of evaluation entities and generating a causal net impact score based on (i) an aggregation of the plurality of causal risk-based impact scores and the plurality of causal quality-based impact scores and (ii) a sequence impact metric
(Continued)

corresponding to the action sequence. The techniques include generating a sequence ranking for the action sequence and initiating a presentation of an interactive user interface reflective of the action sequence and the sequence ranking.

20 Claims, 21 Drawing Sheets

(51) Int. Cl.

| | |
|---|---|
| *G06N 5/04* | (2023.01) |
| *G06Q 10/0635* | (2023.01) |
| *G06Q 10/0637* | (2023.01) |

(56) References Cited

U.S. PATENT DOCUMENTS

| | | | |
|---|---|---|---|
| 2011/0276514 | A1 | 11/2011 | Kalagnanam et al. |
| 2012/0303378 | A1 | 11/2012 | Lieberman |
| 2014/0330621 | A1 | 11/2014 | Nichols et al. |
| 2018/0240547 | A1 | 8/2018 | Albert |
| 2018/0341899 | A1 | 11/2018 | Yarnall |
| 2020/0175439 | A1 | 6/2020 | Abu El Ata et al. |
| 2021/0118557 | A1 | 4/2021 | Pauws et al. |
| 2021/0319887 | A1 | 10/2021 | Derrick, Jr. et al. |
| 2022/0004915 | A1* | 1/2022 | Neumann ............... G16H 50/70 |
| 2022/0067520 | A1* | 3/2022 | Dalli ...................... G06N 20/00 |
| 2022/0107852 | A1* | 4/2022 | Kulkarni ................. G06F 9/542 |
| 2022/0156614 | A1* | 5/2022 | Dalli ...................... G06N 5/048 |
| 2022/0359080 | A1 | 11/2022 | Basu |
| 2022/0391814 | A1* | 12/2022 | Kothandaraman ..... G06F 40/20 |
| 2023/0114867 | A1* | 4/2023 | Chawla .............. G06F 9/45558 |
| | | | 713/2 |
| 2023/0342526 | A1* | 10/2023 | Farley .................... G06F 30/27 |
| 2024/0169264 | A1* | 5/2024 | Dahlem ................. G06N 3/092 |
| 2024/0362097 | A1* | 10/2024 | Paulraj .................. G06F 11/004 |
| 2025/0028980 | A1* | 1/2025 | Johnson ................ G06N 20/20 |

OTHER PUBLICATIONS

Zhou, et al., "A New Method and Metric for Quantitative Risk Analysis", Proceedings of the 13th International Conference on Enterprise Information Systems, pp. 25-33, (2011), DOI: 10.5220/0003442200250033.

Veradigm, "Healthcare Risk Adjustment and Quality Management", Retrieved online via The Wayback Machine at https://veradigm.com/healthcare-risk-adjustment-quality-analytics, Feb. 23, 2023, (4 pages).

* cited by examiner

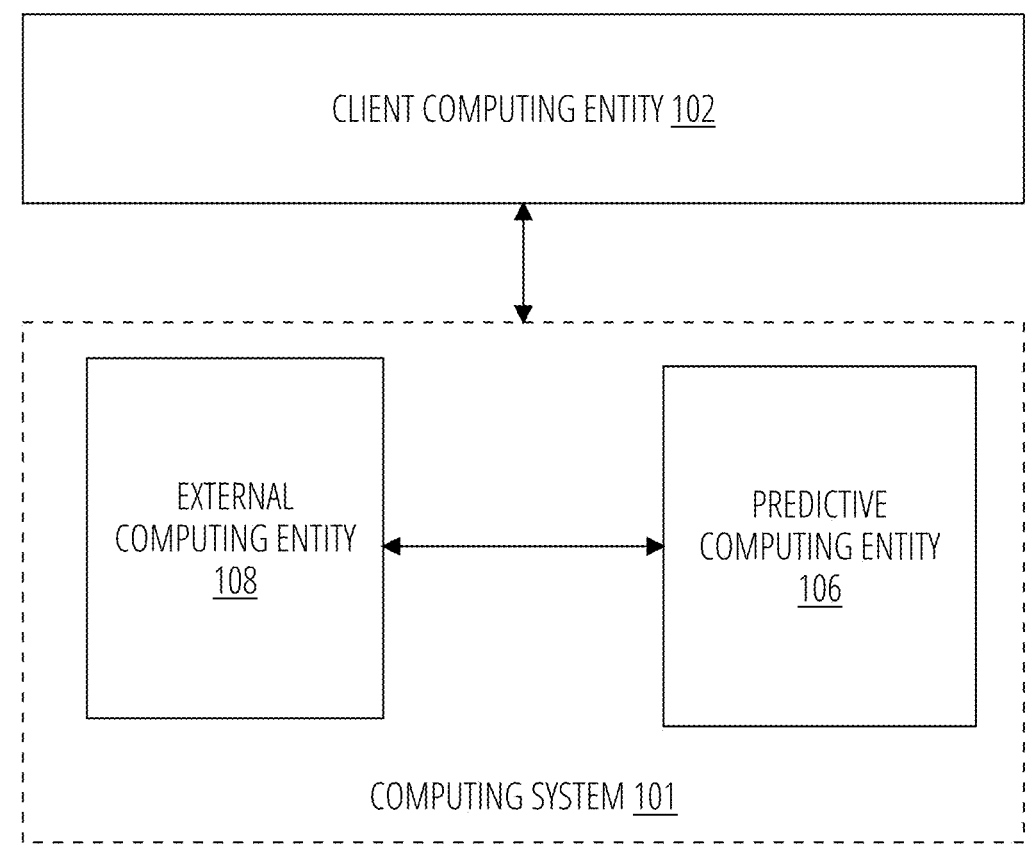
FIG. 1

200

102

500

| Evaluation Entities 502 | Predictive Entities 504 | Entity-specific sub-risk scores 316A | Entity-specific sub-risk scores 316B | ... | Entity-specific sub-risk scores 316C | Predictive risk scores 318 | Engagement Scores 314 | Entity-specific engagement-risk scores 506 |
|---|---|---|---|---|---|---|---|---|
| 502A | 504A | 0 | 0 | ... | 0 | 1 | 0.28 | 0.28 |
| 502A | 504B | 0 | 0 | ... | 0 | 70 | 0.66 | 46.20 |
| 502A | 504C | 0 | 0 | ... | 0 | 19 | 0.33 | 6.27 |
| 502A | 504D | 1 | 0 | ... | 0 | 27 | 0.34 | 9.18 |
| 502A | 504E | 0 | 0 | ... | 0 | 99 | 0.01 | 0.99 |
| 502A | 504F | 0 | 0 | ... | 0 | 68 | 0.40 | 27.20 |
| 502A | 504G | 0 | 1 | ... | 0 | 71 | 0.33 | 23.43 |
| 502A | 504H | 0 | 1 | ... | 0 | 53 | 0.72 | 38.16 |
| 502B | 504I | 0 | 0 | ... | 0 | 57 | 0.15 | 8.55 |
| 502B | 504J | 0 | 0 | ... | 0 | 53 | 0.05 | 2.65 |
| 502B | 504K | 1 | 0 | ... | 0 | 1 | 0.29 | 0.29 |
| 502B | 504L | 0 | 0 | ... | 0 | 4 | 0.47 | 1.88 |
| 502B | 504M | 0 | 0 | ... | 0 | 62 | 0.45 | 27.90 |
| 502B | 504N | 0 | 0 | ... | 0 | 54 | 0.96 | 51.84 |
| 502B | 504O | 0 | 0 | ... | 0 | 98 | 0.87 | 85.26 |
| 502B | 504P | 0 | 0 | ... | 0 | 24 | 0.15 | 3.60 |
| 502C | 504Q | 0 | 0 | ... | 0 | 43 | 0.78 | 33.54 |
| 502C | 504R | 0 | 0 | ... | 0 | 79 | 0.09 | 7.11 |
| 502C | 504S | 0 | 0 | ... | 0 | 73 | 0.01 | 0.73 |
| 502C | 504T | 0 | 0 | ... | 0 | 9 | 0.37 | 3.33 |
| 502C | 504U | 0 | 0 | ... | 0 | 5 | 0.60 | 3.00 |
| 502C | 504V | 0 | 0 | ... | 0 | 19 | 0.30 | 5.70 |
| 502C | 504W | 0 | 0 | ... | 0 | 22 | 0.29 | 6.38 |
| 1 | 2 | 3 | 4 | 5 | 6 | 7 | 8 | 9 |

550

| Evaluation Entities 502 | Predictive risk-based opportunity score 322 |
|---|---|
| 502A | 151.71 |
| 502B | 181.97 |
| 502C | 59.79 |
| 1 | 2 |

322A

322B

322C

| Evaluation Entities 502 | Predictive risk-based opportunity score 322 | Predictive impact score 326 | Gap closure rate 328 | Causal gap closure score 330 | Causal risk opportunity score 332 | Predictive improvement measure 334 | Causal risk-based impact score 336 |
|---|---|---|---|---|---|---|---|
| 502A | 151.71 | 0.06 | 0.99 | 0.0594 | 9.0116 | £2000 | £18,023.20 |
| 502B | 181.97 | 0.02 | 0.97 | 0.0194 | 3.5302 | £2000 | £7,060.40 |
| 502C | 59.79 | 0.09 | 0.98 | 0.0882 | 5.2735 | £2000 | £10,547.00 |
| 1 | 2 | 3 | 4 | 5 | 6 | 7 | 8 |

800

| Evaluation Entities 502 | Predictive quality performance measures 802 | Total Quality Gaps 804 | Predicted closed quality gaps 806 | Metric-specific categorical threshold 808 | Improvement required for satisfying the metric-specific categorical threshold 810 |
|---|---|---|---|---|---|
| 502A | 0.78 | 25 | 19.50 | | |
| 502B | 0.57 | 17 | 9.69 | | |
| 502C | 0.62 | 36 | 22.32 | | |
| Total | 0.66 | 78 | 51.51 | 0.70 | 0.04 |

| Evaluation Entities 502 | Predictive quality performance measures 802 | Metric-specific predictive impact measures 902 | Modified quality performance measures 904 | Total Quality Gaps 804 | Causal Total Closed Quality Gaps 906 | Metric-specific categorical threshold 808 | Metric-level categorical improvement prediction 908 |
|---|---|---|---|---|---|---|---|
| 502A | 0.78 | 0.05 | 0.83 | 25 | 20.25 | | |
| 502B | 0.57 | 0.08 | 0.65 | 17 | 10.71 | | |
| 502C | 0.62 | 0.02 | 0.64 | 36 | 23.04 | | |
| Total | 0.66 | | 0.70 | 78 | 54.84 | 0.70 | Yes |

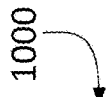

1000

| Evaluation Entities 502 | Predictive Entities 504 | Eligibility predictions 1002 | Engagement Scores 1004 | Survey Response Likelihoods 1006 | Predicted Scores 1008 | Maximum Potential Scores 1010 |
|---|---|---|---|---|---|---|
| 502A | 504A | Yes | 0.28 | Sometimes (0.33) | 0.09 | 0.28 |
| 502A | 504B | No | 0.66 | - | - | - |
| 502A | 504C | Yes | 0.33 | Usually (0.66) | 0.22 | 0.33 |
| 502A | 504D | Yes | 0.34 | Always (1.00) | 0.34 | 0.34 |
| 502A | 504E | Yes | 0.01 | Always (1.00) | 0.01 | 0.01 |
| 502A | 504F | No | 0.40 | - | - | - |
| 502A | 504G | Yes | 0.33 | Usually (0.66) | 0.22 | 0.33 |
| 502A | 504H | No | 0.72 | - | - | - |
| 502B | 504I | No | 0.15 | - | - | - |
| 502B | 504J | Yes | 0.05 | Usually (0.66) | 0.03 | 0.05 |
| 502B | 504K | No | 0.29 | - | - | - |
| 502B | 504L | No | 0.47 | - | - | - |
| 502B | 504M | No | 0.45 | - | - | - |
| 502B | 504N | Yes | 0.96 | Always (1.00) | 0.96 | 0.96 |
| 502B | 504O | No | 0.87 | - | - | - |
| 502B | 504P | Yes | 0.15 | Always (1.00) | 0.15 | 0.15 |
| 502C | 504Q | Yes | 0.78 | Always (1.00) | 0.78 | 0.78 |
| 502C | 504R | Yes | 0.09 | Sometimes (0.33) | 0.03 | 0.09 |
| 502C | 504S | Yes | 0.01 | Always (1.00) | 0.01 | 0.01 |
| 502C | 504T | Yes | 0.37 | Sometimes (0.33) | 0.12 | 0.37 |
| 502C | 504U | No | 0.60 | - | - | - |
| 502C | 504V | Yes | 0.30 | Usually (0.66) | 0.20 | 0.30 |
| 502C | 504W | Yes | 0.29 | Always (1.00) | 0.29 | 0.29 |

| Evaluation Entities 502 | Predictive quality performance measures 1102 | Predicted Scores 1104 | Maximum Potential Scores 1106 | Metric-specific categorical threshold 1108 | Improvement required for the metric-specific categorical threshold 1110 |
|---|---|---|---|---|---|
| 502A | 0.68 | 0.88 | 1.29 | | |
| 502B | 0.98 | 1.14 | 1.16 | | |
| 502C | 0.78 | 1.43 | 1.84 | | |
| Total | 0.80 | 3.45 | 4.29 | 0.88 | 0.08 |

| Evaluation Entities 502 | Predictive quality performance measures 1102 | Metric-specific predictive impact measures 1202 | Modified quality performance measures 1204 | Maximum Potential Scores 1106 | Causal predicted scores 1206 | Metric-specific categorical threshold 1108 | Metric-level categorical improvement prediction 1208 |
|---|---|---|---|---|---|---|---|
| 502A | 0.68 | 0.07 | 0.75 | 1.29 | 0.97 | | |
| 502B | 0.98 | 0.01 | 0.99 | 1.16 | 1.15 | | |
| 502C | 0.78 | 0.05 | 0.83 | 1.84 | 1.53 | | |
| Total | 0.80 | | 0.85 | 4.29 | 3.64 | 0.88 | No |

| Quality metric type 1302 | Quality metrics 1304 | Predictive quality performance measures 1306 | Modified quality performance measures 1308 | Current improvement levels 1310 | Next improvement levels 1312 | Next improvement thresholds 1314 | Threshold reached 1316 |
|---|---|---|---|---|---|---|---|
| HEDIS | A | 0.66 | 0.7 | 0 | 1 | 0.69 | Yes |
| HEDIS | B | 0.85 | 0.88 | 1 | NA | NA | NA |
| CAHPS | K | 0.8 | 0.85 | -1 | 0 | 0.87 | No |

| Quality metrics 1304 | Quality metric type 1302 | Improvement levels without enrollment 1406 | Improvement levels with enrollment 1408 | Measure weights 1410 |
|---|---|---|---|---|
| A | HEDIS | 0 | 1 | 1 |
| B | HEDIS | 1 | 1 | 1 |
| C | HEDIS | -1 | 0 | 1 |
| D | HEDIS | 0 | 0 | 1 |
| I | CAHPS | 0 | 1 | 3 |
| J | HOS | 1 | 1 | 1 |
| K | CAHPS | -1 | 0 | 3 |
| L | CAHPS | 0 | 0 | 3 |
| M | HOS | 0 | 1 | 1 |
| N | CAHPS | 1 | 1 | 3 |
| Q | Operational | -1 | -1 | 2 |
| R | Operational | 0 | 0 | 2 |
| S | Operational | 0 | 1 | 2 |
| T | Operational | 1 | 1 | 2 |
| U | Operational | -1 | -1 | 2 |

| IMPR_C | Total Score ($l_R$) | -0.036 | 0.36 |
|---|---|---|---|
| IMPR_C | Total Star | 3 | 4 |

| Quality metrics 1304 | Quality metric type 1302 | Rank levels without enrollment 1506 | Rank levels with enrollment 1508 | Measure weights 1510 |
|---|---|---|---|---|
| A | HEDIS | 3 | 3 | 1 |
| B | HEDIS | 4 | 5 | 1 |
| C | HEDIS | 2 | 3 | 1 |
| D | HEDIS | 3 | 3 | 1 |
| I | CAHPS | 2 | 4 | 3 |
| J | HOS | 4 | 4 | 1 |
| K | CAHPS | 2 | 3 | 3 |
| L | CAHPS | 2 | 2 | 3 |
| M | HOS | 4 | 4 | 1 |
| N | CAHPS | 3 | 3 | 3 |
| Q | Operational | 1 | 2 | 2 |
| R | Operational | 4 | 4 | 2 |
| S | Operational | 1 | 2 | 2 |
| T | Operational | 2 | 3 | 2 |
| U | Operational | 3 | 3 | 2 |
| IMPR_C | Improvement | 2 | 3 | 5 |
| IMPR_D | Improvement | 2 | 3 | 5 |
| Total | Health Plan | 2 | 3 | |

1802
GENERATE PREDICTIVE RISK-BASED
OPPORTUNITY SCORE

1804
GENERATE PREDICTIVE IMPACT
SCORE

1806
GENERATE CAUSAL GAP CLOSURE
SCORE

1808
GENERATE CAUSAL RISK
OPPORTUNITY SCORE

1810
GENERATE CAUSAL RISK-BASED
IMPACT SCORE

1812
PROVIDE RECOMMENDATION DATA
OBJECT

1900

1902

GENERATE PREDICTIVE QUALITY
PERFORMANCE MEASURE

1904

GENERATE METRIC-SPECIFIC
PREDICTIVE IMPACT MEASURE

1906

GENERATE METRIC-LEVEL
CATEGORICAL IMPROVEMENT
PREDICTION

1908

GENERATE CATEGORICAL
IMPROVEMENT PREDICTION

1910

INITIATE PERFORMANCE OF
PREDICTION-BASED ACTION

2000

2002
RECEIVE CANDIDATE PREDICTION-BASED ACTIONS

2004
GENERATE CAUSAL RISK-BASED IMPACT SCORES

2006
GENERATE CAUSAL QUALITY-BASED IMPACT SCORES

2008
GENERATE CAUSAL NET IMPACT SCORE

2010
GENERATE SEQUENCE RANKING

2012
INITIATE PRESENTATION OF INTERACTIVE USER INTERFACE

MACHINE LEARNING, CAUSAL INFERENCE, AND PROBABILISTIC COMBINATORIAL TECHNIQUES FOR FORECASTING AND RANKING PREDICTION-BASED ACTIONS

CROSS-REFERENCE TO RELATED APPLICATIONS

This application claims the benefit of U.S. Provisional Application No. 63/591,559, entitled "Provider Training Program Enrollment Optimization Based on the Causal Improvement in Risk and Quality Gap Closures," and filed Oct. 19, 2023, the entire contents of which are herein incorporated by reference.

BACKGROUND

Various embodiments of the present disclosure address technical challenges related to impact forecasting generally and, more specifically, to simulation techniques for forecasting and ranking actions based on their causal impact within a prediction domain. Traditional impact forecasting techniques may leverage various machine learning or causal inference models in an attempt to predict a future impact of an action with respect to a target variable. The performance of such techniques is traditionally limited by the number of features that are predictive of a target variable making them inappropriate for complex multi-actor, multi-metric domains, such as healthcare plans in which the success of the healthcare plan is dependent on the performance of a plurality of individual providers with respect to a vast number of different performance metrics. Impact forecasting techniques, whether by machine learning, causal inference modeling, etc., are traditionally limited to a single type of metric, which limits their efficacy for actions that are evaluated according to complex sequences of metrics. Significant technical challenges arise when simulating the performance of multiple disparate metrics, including an inability to directly compare or combine predictive insights from the different metrics to collectively rank actions with respect to a plurality of disparate, interrelated predictions.

Various embodiments of the present disclosure make important contributions to traditional impact forecasting techniques by addressing each of these technical challenges.

BRIEF SUMMARY

Various embodiments of the present disclosure provide improved impact forecasting techniques for optimizing prediction-based actions in a complex, multi-actor, multi-metric prediction domain. Using some of the techniques of the present disclosure, a sequence of connected machine learning, causal inference, and probabilistic combinatorial techniques may be leveraged to generate predictive insights with respect to disparate performance metrics that are directly comparable. By doing so, a future impact of multiple candidate actions may be simulated and evaluated with respect to a plurality of different performance metrics. These performance metrics may be aggregated to create holistic, multi-metric impact scores that may be used to rank a plurality of candidate actions based on their overall future impact within a complex system. This, in turn, enables an interactive user interface that may provide interpretable ranked sequences of actions that may be dynamically updated to provide a live representation of a simulated impact of a plurality of actions. As described herein, the interactive user interface may enable interactions with a user to initiate prediction-based actions in real time that, once initiated, are accounted for by a live representation of ranked action sequences. In this manner, some of the techniques of the present disclosure provide improved machine learning, causal inference, and probabilistic combinatorial frameworks that may power improved user interfaces for optimizing prediction-based actions based on complex impact forecasting insights.

In some embodiments, a computer-implemented method includes receiving, by one or more processors, one or more candidate prediction-based actions for a plurality of evaluation entities within an entity group; generating, by the one or more processors, a plurality of causal risk-based impact scores for the plurality of evaluation entities with respect to a candidate prediction-based action of the one or more candidate prediction-based actions; generating, by the one or more processors, a plurality of causal quality-based impact scores for the plurality of evaluation entities and an action sequence for the plurality of evaluation entities with respect to the candidate prediction-based action; generating, by the one or more processors, a causal net impact score for the action sequence based on (i) an aggregation of the plurality of causal risk-based impact scores and the plurality of causal quality-based impact scores and (ii) a sequence impact metric corresponding to the action sequence; generating, by the one or more processors, a sequence ranking for the action sequence based on a comparison between the causal net impact score and one or more causal net impact scores associated with one or more other action sequences for the plurality of evaluation entities with respect to the one or more candidate prediction-based actions; and initiating, by the one or more processors, a presentation of an interactive user interface reflective of the action sequence and the sequence ranking.

In some embodiments, a computing system comprises memory and one or more processors communicatively coupled to the memory, the one or more processors are configured to receive one or more candidate prediction-based actions for a plurality of evaluation entities within an entity group; generate a plurality of causal risk-based impact scores for the plurality of evaluation entities with respect to a candidate prediction-based action of the one or more candidate prediction-based actions; generate a plurality of causal quality-based impact scores for the plurality of evaluation entities and an action sequence for the plurality of evaluation entities with respect to the candidate prediction-based action; generate a causal net impact score for the action sequence based on (i) an aggregation of the plurality of causal risk-based impact scores and the plurality of causal quality-based impact scores and (ii) a sequence impact metric corresponding to the action sequence; generate a sequence ranking for the action sequence based on a comparison between the causal net impact score and one or more causal net impact scores associated with one or more other action sequences for the plurality of evaluation entities with respect to the one or more candidate prediction-based actions; and initiate a presentation of an interactive user interface reflective of the action sequence and the sequence ranking.

In some embodiments, one or more non-transitory computer-readable storage media includes instructions that, when executed by one or more processors, cause the one or more processors to receive one or more candidate prediction-based actions for a plurality of evaluation entities within an entity group; generate a plurality of causal risk-based impact scores for the plurality of evaluation entities with respect to a candidate prediction-based action of the one or more candidate prediction-based actions; generate a plurality of causal quality-based impact scores for the plurality of evaluation entities and an action sequence for the plurality of evaluation entities with respect to the candidate prediction-based action; generate a causal net impact score for the action sequence based on (i) an aggregation of the plurality of causal risk-based impact scores and the plurality of causal quality-based impact scores and (ii) a sequence impact metric corresponding to the action sequence; generate a sequence ranking for the action sequence based on a comparison between the causal net impact score and one or more causal net impact scores associated with one or more other action sequences for the plurality of evaluation entities with respect to the one or more candidate prediction-based actions; and initiate a presentation of an interactive user interface reflective of the action sequence and the sequence ranking.

BRIEF DESCRIPTION OF DRAWINGS

FIG. 1 provides an example overview of an architecture 100 in accordance with some embodiments of the present disclosure.

FIG. 8 is an operational example of a quality-based predictive data structure of a plurality of quality-based predictive features in accordance with some embodiments discussed herein.

FIG. 9 is an operational example of a quality-based predictive data structure 900 of a plurality of quality-based predictive features in accordance with some embodiments discussed herein.

FIG. 10 is an operational example of a quality-based predictive data structure of a plurality of quality-based predictive features in accordance with some embodiments discussed herein.

FIG. 11 is an operational example of a quality-based predictive data structure of a plurality of quality-based predictive features in accordance with some embodiments discussed herein.

FIG. 12 is an operational example of a quality-based predictive data structure of a plurality of quality-based predictive features in accordance with some embodiments discussed herein.

FIG. 13 is an operational example of a quality-based predictive data structure of a plurality of quality-based predictive features in accordance with some embodiments discussed herein.

FIG. 14 is an operational example of a quality-based predictive data structure of a plurality of quality-based predictive features in accordance with some embodiments discussed herein.

FIG. 15 is an operational example of a quality-based predictive data structure of a plurality of quality-based predictive features in accordance with some embodiments discussed herein.

DETAILED DESCRIPTION

Figure 2A:
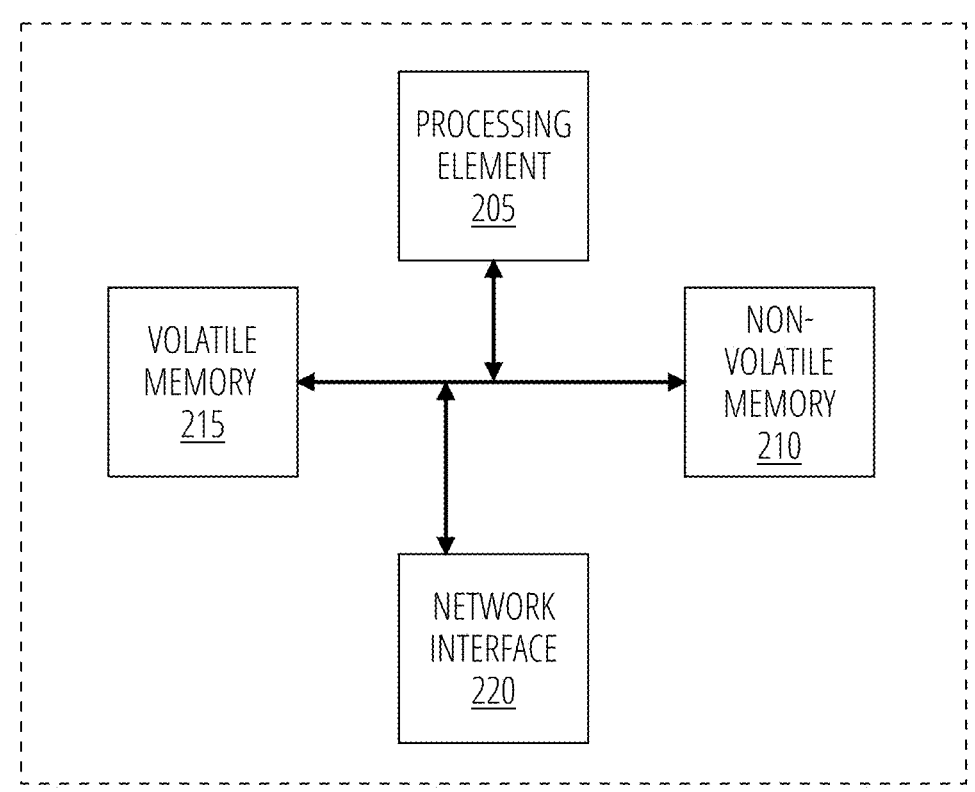
FIG. 2A provides an example computing entity 200 in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 provides an example overview of an architecture 100 in accordance with some embodiments of the present disclosure. The architecture 100 includes a computing system 101 configured to generate a plurality of predictive measures (e.g., in response to request from client computing entities 102), process the predictive measures to generate impact predictions for a plurality of prediction-based actions, and facilitate improved user interfaces (and/or information for the user interface) based on the impact predictions for the client computing entities 102. The example architecture 100 may be used in a plurality of domains and not limited to any specific application as disclosed herewith. The plurality of domains may include banking, healthcare, industrial, manufacturing, education, retail, to name a few.

In accordance with various embodiments of the present disclosure, a predictive machine learning pipeline may include a sequence of models that may be trained to generate one or more of the impact predictions described herein. By doing so, one or more impact predictions may be generated and aggregated from a plurality of disparate metrics. By doing so, the techniques of the present disclosure may lead to higher accuracy of performing predictive operations as needed on data constrained by a plurality of performance measures.

In some embodiments, the computing system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The computing system 101 may include a predictive computing entity 106 and one or more external computing entities 108. The predictive computing entity 106 and/or one or more external computing entities 108 may be individually and/or collectively configured to receive requests from client computing entities 102, process the requests to generate predictions and/or provide user interface data based on the generated predictions, and provide the generated predictions to the client computing entities 102.

For example, as discussed in further detail herein, the predictive computing entity 106 and/or one or more external computing entities 108 comprise storage subsystems that may be configured to store input data, training data, and/or the like that may be used by the respective computing entities to perform predictive data analysis and/or training operations of the present disclosure. In addition, the storage subsystems may be configured to store model definition data used by the respective computing entities to perform various predictive data analysis and/or training tasks. The storage subsystem may include one or more storage units, such as multiple distributed storage units that are connected through a computer network. Each storage unit in the respective computing entities may store at least one of one or more data assets and/or one or more data about the computed properties of one or more data assets. Moreover, each storage unit in the storage systems may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the predictive computing entity 106 and/or one or more external computing entities 108 are communicatively coupled using one or more wired and/or wireless communication techniques. The respective computing entities may be specially configured to perform one or more steps/operations of one or more techniques described herein. By way of example, the predictive computing entity 106 may be configured to train, implement, use, update, and evaluate machine learning models in accordance with one or more training and/or prediction operations of the present disclosure. In some examples, the external computing entities 108 may be configured to train, implement, use, update, and evaluate machine learning models in accordance with one or more training and/or prediction operations of the present disclosure.

In some example embodiments, the predictive computing entity 106 may be configured to receive and/or transmit one or more datasets, objects, and/or the like from and/or to the external computing entities 108 to perform one or more steps/operations of one or more techniques (e.g., machine learning, causal inference, and probabilistic combinatorial techniques, and/or the like) described herein. The external computing entities 108, for example, may include and/or be associated with one or more entities that may be configured to receive, transmit, store, manage, and/or facilitate datasets, such as a dataset including a plurality of metric requirements, historical interaction data objects, predictive entity data, evaluation entity data, entity group data, and/or the like. The external computing entities 108, for example, may include data sources that may provide such datasets, and/or the like to the predictive computing entity 106 which may leverage the datasets to perform one or more steps/operations of the present disclosure, as described herein. In some examples, the datasets may include an aggregation of data from across a plurality of external computing entities 108 into one or more aggregated datasets. The external computing entities 108, for example, may be associated with one or more data repositories, cloud platforms, compute nodes, organizations, and/or the like, which may be individually and/or collectively leveraged by the predictive computing entity 106 to obtain and aggregate data for a prediction domain.

In some example embodiments, the predictive computing entity 106 may be configured to receive a trained machine learning model trained and subsequently provided by the one or more external computing entities 108. For example, the one or more external computing entities 108 may be configured to perform one or more training steps/operations of the present disclosure to train a machine learning model, as described herein. In such a case, the trained machine learning model may be provided to the predictive computing entity 106, which may leverage the trained machine learning model to perform one or more prediction steps/operations of the present disclosure. In some examples, feedback (e.g., evaluation data, ground truth data, etc.) from the use the of the machine learning model may be recorded by the predictive computing entity 106. In some examples, the feedback may be provided to the one or more external computing entities 108 to continuously train the machine learning model over time. In some examples, the feedback may be leveraged by the predictive computing entity 106 to continuously train the machine learning model over time. In this manner, the computing system 101 may perform, via one or more combinations of computing entities, one or more prediction, training, and/or any other machine learning-based techniques of the present disclosure.

A. Example Computing Entity

FIG. 2A provides an example computing entity 200 in accordance with some embodiments of the present disclosure. The computing entity 200 is an example of the predictive computing entity 106 and/or external computing entities 108 of FIG. 1. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, training one or more machine learning models, monitoring, evaluating, comparing, and/or similar terms used herein interchangeably. In some embodiments, these functions, operations, and/or processes may be performed on data, content, information, and/or similar terms used herein interchangeably. In some embodiments, the one computing entity (e.g., predictive computing entity 106, etc.) may train and use one or more machine learning models described herein. In other embodiments, a first computing entity (e.g., predictive computing entity 106, etc.) may use one or more machine learning models that may be trained by a second computing entity (e.g., external computing entity 108) communicatively coupled to the first computing entity. The second computing entity, for example, may train one or more of the machine learning model(s) described herein, and subsequently provide the trained machine learning model(s) (e.g., optimized weights, code sets, etc.) to the first computing entity over a network.

As shown in FIG. 2A, in some embodiments, the computing entity 200 may include, or be in communication with, one or more processing elements 205 (also referred to as processors, processing circuitry, and/or similar terms used herein interchangeably) that communicate with other elements within the computing entity 200 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the computing entity 200 may further include, or be in communication with, non-volatile media (also referred to as non-volatile storage, memory, memory storage, memory circuitry, and/or similar terms used herein interchangeably). In some embodiments, the non-volatile media may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile media may store databases, database instances, database management systems, data, applications, programs, program modules, scripts, code (e.g., source code, object code, byte code, compiled code, interpreted code, machine code, etc.) that embodies one or more machine learning models or other computer functions described herein, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the computing entity 200 may further include, or be in communication with, volatile media (also referred to as volatile storage, memory, memory storage, memory circuitry, and/or similar terms used herein interchangeably). In some embodiments, the volatile media may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, code (source code, object code, byte code, compiled code, interpreted code, machine code) that embodies one or more machine learning models or other computer functions described herein, executable instructions, and/or the like being executed by, for example, the processing element 205. Thus, the databases, database instances, database management systems, data, applications, programs, program modules, code (source code, object code, byte code, compiled code, interpreted code, machine code) that embodies one or more machine learning models or other computer functions described herein, executable instructions, and/or the like may be used to control certain aspects of the operation of the computing entity 200 with the assistance of the processing element 205 and operating system.

As indicated, in some embodiments, the computing entity 200 may also include one or more network interfaces 220 for communicating with various computing entities (e.g., the client computing entity 102, external computing entities, etc.), such as by communicating data, code, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In some embodiments, the computing entity 200 communicates with another computing entity for uploading or downloading data or code (e.g., data or code that embodies or is otherwise associated with one or more machine learning models). Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing entity 200 may include, or be in communication with, one or more input elements, such as a keyboard input, a mouse input, a touch screen/display input, motion input, movement input, audio input, pointing device input, joystick input, keypad input, and/or the like. The computing entity 200 may also include, or be in communication with, one or more output elements (not shown), such as audio output, video output, screen/display output, motion output, movement output, and/or the like.

B. Example Client Computing Entity

Figure 2B:
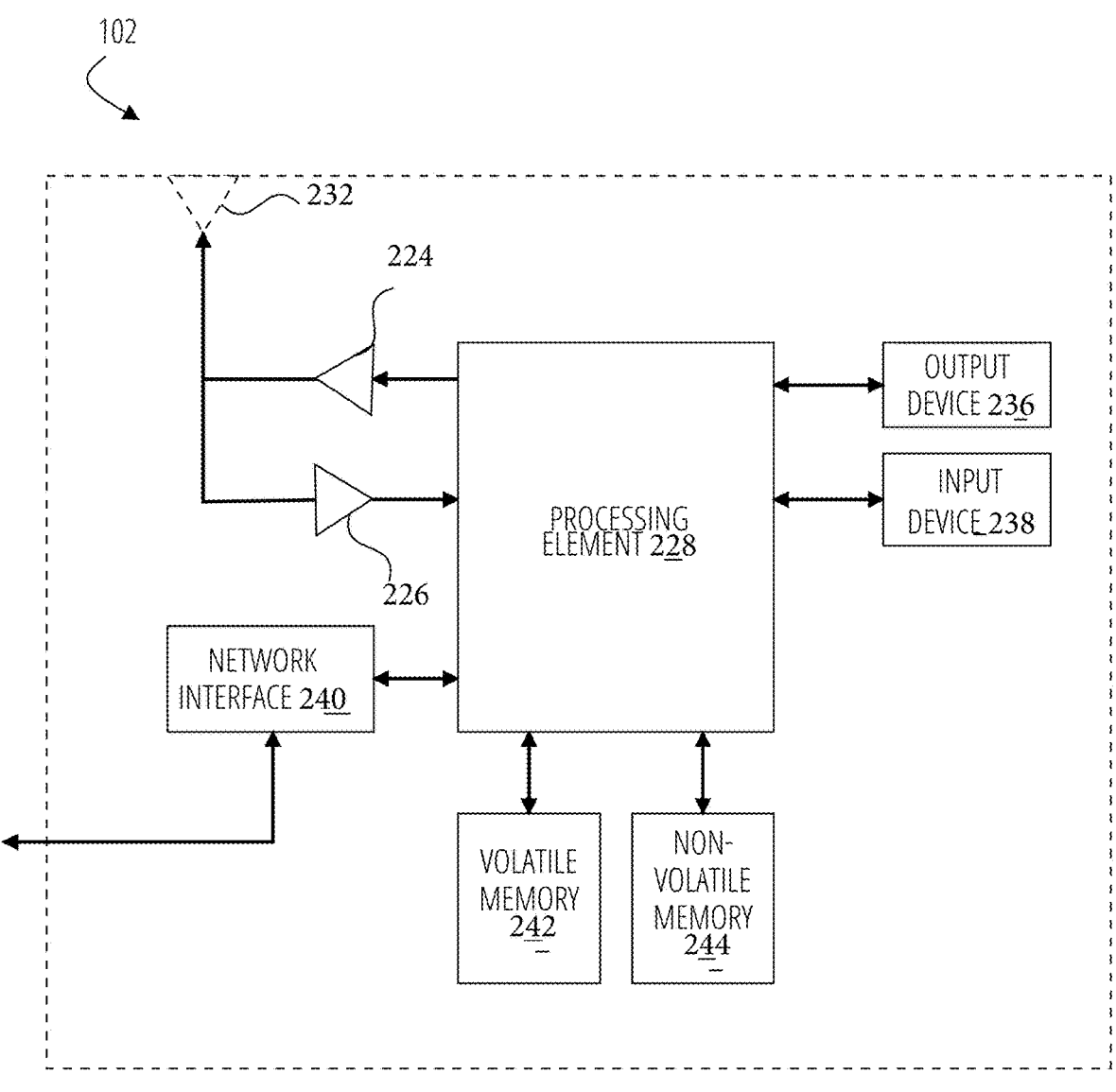
FIG. 2B provides an example client computing entity in accordance with some embodiments of the present disclosure.

FIG. 2B provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 2B, the client computing entity 102 may include an antenna 232, a transmitter 224 (e.g., radio), a receiver 246 (e.g., radio), and a processing element 228 (e.g., CPLDs, microprocessors, multi-core processors, coprocessing entities, ASIPs, microcontrollers, and/or controllers) that provides signals to and receives signals from the transmitter 224 and receiver 226, correspondingly.

The signals provided to and received from the transmitter 224 and the receiver 226, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the computing entity 200. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the computing entity 200 via a network interface 240.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download code, changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include an output device 236 (e.g., display, speaker, tactile instrument, etc.) coupled to a processing element 228) and/or a user input interface (coupled to a processing element 228). For example, the user interface may be a user application, browser, user interface, and/or similar words used herein interchangeably executing on and/or accessible via the client computing entity 102 to interact with and/or cause display of information/data from the computing entity 200, as described herein. The user input interface may comprise any of a plurality of input devices 238 (or interfaces) allowing the client computing entity 102 to receive code and/or data, such as a keypad (hard or soft), a touch display, voice/speech or motion interfaces, or other input device. In some embodiments including a keypad, the keypad may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 242 and/or non-volatile memory 244, which may be embedded and/or may be removable. For example, the non-volatile memory 244 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 242 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, code (source code, object code, byte code, compiled code, interpreted code, machine code, etc.) that embodies one or more machine learning models or other computer functions described herein, executable instructions, and/or the like to implement the functions of the client computing entity 102. As indicated, this may include a user application that is resident on the client computing entity 102 or accessible through a browser or other user interface for communicating with the computing entity 200 and/or various other computing entities.

In another embodiment, the client computing entity 102 may include one or more components or functionalities that are the same or similar to those of the computing entity 200, as described in greater detail above. In one such embodiment, the client computing entity 102 downloads, e.g., via network interface 240, code embodying machine learning model(s) from the computing entity 200 so that the client computing entity 102 may run a local instance of the machine learning model(s). As will be recognized, these architectures and descriptions are provided for example purposes only and are not limited to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "predictive risk-based opportunity score" refers to a data entity that describes a predicted prospect for an evaluation entity. For example, a predictive risk-based opportunity score may indicate a measure of opportunity with respect to a given metric associated with the evaluation entity for a future time interval. In some examples, a predictive risk-based opportunity score may be based on a plurality of engagement scores and/or predictive risk scores respectively associated with predictive entities associated with an evaluation entity. For instance, an evaluation entity may be associated with an entity cohort that include a group of predictive entities. In some examples, a predictive risk-based opportunity score may be aggregated (e.g., through linear summation, etc.) from a plurality of entity-specific engagement risk scores. In this manner, the predictive risk-based opportunity score may include a single value that describes a predicted prospect across a plurality of predictive entities associated with an evaluation entity.

In some embodiments a predictive risk-based opportunity score is a static and/or dynamic value, range of values, percentage, real number, ratio, numeric, and/or the like. By way of example, a predictive risk-based opportunity score may be a real value such as 0.28, 6.27, 46.20, or any other value, type of value, or representation.

In some embodiments, the term "entity-specific engagement-risk score" refers to a component of a predictive risk-based opportunity score. In some examples, an entity-specific engagement-risk score may correspond to a particular predictive entity and a predictive risk-based opportunity score may be aggregation of a plurality of entity-specific engagement risk-scores for a cohort of entities associated with an evaluation entity. An entity-specific engagement-risk score may be based on one or more metrics corresponding to a respective predictive entity. For instance, an entity-specific engagement-risk score may be based on an engagement score and/or predictive risk score for a predictive entity. For example, the entity-specific engagement-risk score may be a product of an engagement score and predictive risk score for a particular predictive entity. By way of example, an entity-specific engagement-risk score may be computed by multiplying an engagement score by a predictive risk score.

In some embodiments, the term "engagement score" refers to a data entity that describes an interactivity of a predictive entity. For instance, an engagement score may identify a likelihood that a predictive entity will interact with an evaluation entity through at least one of one or more different interaction channels. In some examples, an engagement score may be selected and/or derived from a plurality of channel-specific engagement scores. For instance, an engagement score may include a minimum, maximum, average, and/or the like score from a plurality of channel-specific engagement scores. By way of example, for a given predictive entity, a channel-specific engagement score may be generated for a plurality of different potential channels for engagement, the greatest (and/or lowest, average, etc.) of which may be selected as an engagement score for the predictive entity.

In some embodiments, the term "channel-specific engagement score" refers to a data entity that describes a likelihood of a predictive entity to interact with an evaluation entity through a particular channel. A channel-specific engagement score, for example, may include an individual score that corresponds to a channel and a predictive entity. The individual score may include real value, a percentage, ratio, and/or any other value, type of value, or representation of a likelihood that a predictive entity may leverage a particular channel to interact with an evaluation entity within a particular time interval.

In some embodiments, a channel-specific engagement score is generated using a channel-specific model. A channel-specific model, for example, may be trained on historic interaction data associated with a predictive entity and/or a particular channel. In some examples, a different channel-specific model may be applied to a predictive entity's historic interaction data to generate an engagement score for each of the potential channels of engagement available for the predictive entity. For example, one machine learning model may be applied to generate a channel-specific engagement score associated with a first channel (e.g., an in-person meeting, etc.) while another machine learning model may be applied to generate a channel-specific engagement score associated with a second channel (e.g., a virtual meeting, etc.), and so on.

In some embodiments, the term "channel" refers to a data entity that describes an engagement mechanism for facilitating an interaction between a predictive entity and an evaluation entity. A channel may include any means for communicating between the two entities. By way of example, a channel may include a virtual channel (e.g., a virtual meeting, etc.), a physical channel (e.g., an in-person meeting, etc.), an audio channel (e.g., a telephone call, etc.), a visitation channel (e.g., a home visit, etc.), a survey channel (e.g., a distributed survey), and/or the like. In some examples, a channel may depend on a prediction domain. For instance, for a clinical domain, a channel may include a virtual screening, an office visit, an emergency call line, an at home visit, a clinical survey, and/or the like.

In some embodiments, the term "channel-specific model" refers to a data entity that describes parameters, hyperparameters, and/or defined operations of a rules-based and/or machine learning model (e.g., model including at least one of one or more rule-based layers, one or more layers that depend on trained parameters, coefficients, and/or the like). A channel-specific model may include one or more machine learning models configured, trained (e.g., jointly, separately, etc.), and/or the like to generate a channel-specific engagement score for a predictive entity. A channel-specific model may include one or more of any type of machine learning model including one or more supervised, unsupervised, semi-supervised, reinforcement learning models, and/or the like. In some examples, a channel-specific model may include multiple models configured to perform one or more different stages of a prediction process.

In some embodiments, a channel-specific model is trained using one or more supervised training techniques. In some examples, a channel-specific model may be trained, using the supervised training techniques, to generate a channel-specific engagement score based on one or more historical interaction data objects associated with a predictive entity. By way of example a channel-specific model may be trained using labeled historical interaction data description of a plurality of historical interaction data objects and one or more labels indicative of an occurrence of an interaction through a particular channel. By way of example, a channel-specific model may include a supervised machine learning regression model, such as a linear regression, logistic regression, and/or the like, that is previously trained (and/or continuously trained) to generate a channel-specific engagement score for a predictive entity based on one or more historical interaction data objects.

In some embodiments, the term "historical interaction data object" refers to a data entity that describes a previous interaction between a predictive entity and one or more evaluation entities, A historical interaction data object, for example, may include a data record that is descriptive of a virtual meeting, a physical channel, an audio channel, a visitation channel, and/or the like.

In some embodiments, the term "predictive risk score" refers to a data entity that describes an undocumented risk gap for a predictive entity. For example, a predictive risk score may describe a potential gap in a predictive entity's documentation based on a predictive entity's likelihood of being associated with one or more of a plurality of conditions. The plurality of conditions may depend on a prediction domain. For example, in a clinical circumstance, the plurality of conditions may be defined by a set of hierarchical condition category (HCC) codes.

In some embodiments, a predictive risk score may include an aggregate of a plurality of entity-specific sub-risk scores respectively corresponding to each of a plurality of defined conditions within a prediction domain. For instance, a predictive risk score may include summation of the plurality of entity-specific sub-risk scores. In some embodiments, a predictive risk score is a static and/or dynamic value, range of values, percentage, real number, ratio, numeric, and/or the like. In some examples, a risk score may be a binary indicator such as 1 or 0, true or false, or the like corresponding to an HCC code. By way of example, a predictive risk score may be 0, 1, 10, 99, or any other value.

In some embodiments, the term "entity-specific sub-risk score" refers to a component of a predictive risk score. For example, an entity-specific sub-risk score may describe a likelihood that a particular predictive entity is associated with a particular condition. For example, in a clinical context, an entity-specific sub-risk score may be an indicator that a predictive entity meets clinical criterial set by a clinical professional, that either define the requirements for diagnosis or strongly suggest the presence of a disease within a Hierarchical Condition Category (HCC). An entity-specific sub-risk score may include a percentage, ratio, and/or the like. In addition, or alternatively, an entity-specific sub-risk score may include a binary indicator.

In some embodiments, the term "hierarchical condition set" refers to a defined set of conditions for a prediction domain. A hierarchical condition set may include any of a number of different conditions defined for a particular prediction domain. As one example, a hierarchical condition set may include an HCC dataset.

In some embodiments, the term "causal risk-based impact score" refers to a data entity that describes a predicted impact of a prediction-based action on an evaluation entity. A causal risk-based impact score, for example, may correspond to one of a plurality of potential prediction-based actions for an evaluation entity. In some examples, the causal risk-based impact score may measure a predicted impact of a prediction-based action in one or more action-agnostic units of measurement. In this manner, a causal risk-based impact score for a particular prediction-based action may be directly compared against causal risk-based impact scores for each of plurality of different causal risk-based impact scores. The action-agnostic unit of measurement may depend on the prediction domain. In some examples, in a clinical context, the causal risk-based impact score measure a predicted impact of a prediction-based action in terms of a predicted change in revenue.

In some embodiments, a causal risk-based impact score is generated based on a comparison between a causal risk opportunity score and a predictive improvement measure. A causal risk-based impact score may be a static and/or dynamic value, range of values, percentage, real number, ratio, numeric, and/or the like. By way of example, a causal risk-based impact score may be a value such as 7,060.40, 10,547.00 18,023.00, or any other value.

In some embodiments, the term "prediction-based action" refers to an action that may be selected for performance response to one or more predictions. A prediction-based action, for example, may be intelligently selected, using some of the techniques of the present disclosure, to achieve a predictive impact score (and/or a measure thereof). A prediction-based action may depend on the prediction domain. For example, in a clinical context, a prediction-based action may be an enrollment in a clinical program designed to improve a detection of conditions within a population of members. By way of example, in response to the selection of a prediction-based action, an evaluation entity, such as a healthcare provider, may be enrolled in a clinical program to improve the detection of one or more conditions. In some examples, a predictive impact score may identify a positive impact of a healthcare provider being enrolled in a clinical program and/or a negative impact of a healthcare provider not being enrolled in the clinical program.

In some embodiments, the term "causal risk opportunity score" refers to a data entity that describes a predicted impact to a predictive risk score with respect to an evaluation entity in response to a prediction-based action. A causal risk opportunity score, for example, may identify a causal impact of a prediction-based action on a risk gap within an entity cohort associated with an evaluation entity. As an example, in a clinical context, a causal risk opportunity score may identify a predicted change in number of diagnosed conditions by an evaluation entity.

In some embodiments, a causal risk opportunity score is based on a comparison between a causal gap closure score and a predictive risk-based opportunity score for an evaluation entity. A causal risk opportunity score may be a static and/or dynamic value, range of values, percentage, real number, ratio, numeric, and/or the like. By way of example, a causal risk opportunity score may be a value such as 3.5302, 5.2735, 9.0116, or any other value.

In some embodiments, the term "causal gap closure score" refers to a data entity that describes a predicted rate of change of a predictive risk score with respect to an evaluation entity in response to a prediction-based action. A causal gap closure score, for example, may identify a causal rate of change, in response to a prediction-based action, to a risk gap within an entity cohort associated with an evaluation entity. As an example, in a clinical context, a causal gap closure score may identify a causal change in a rate of diagnosed conditions by an evaluation entity.

In some embodiments, a causal gap closure score is based on a predictive impact score and a gap closure rate associated with an evaluation entity. A causal gap closure score may be a static and/or dynamic value, range of values, percentage, real number, ratio, numeric, and/or the like. By way of example, a causal gap closure score may be a value, such as 0.0882, 0.0194, 0.0594, or any other value.

In some embodiments, the term "gap closure rate" refers to a data entity that describes a condition identification rate of an evaluation entity. For example, in a clinical context, a gap closure rate may be an evaluation entity's diagnosis rate. In some examples, the gap closure rate may be determined based on historic entity interaction data, such as a plurality of historical interaction data objects corresponding to an evaluation entity. In addition, or alternatively, a gap closure rate may be imputed for an evaluation entity based one or more entity attributes, one or more entity cohort characteristics, one or more related evaluation entities, and/or the like using one or more imputation models. By way of example, in the event that an evaluation entity is not associated with a threshold number of historic entity interaction data objects, a mean, median, and/or the like gap closure rate for a plurality of evaluation entities may be imputed as the evaluation entity's gap closure rate.

In some embodiments, a gap closure rate is a static and/or dynamic value, range of values, percentage, real number, ratio, numeric, and/or the like. By way of example, a gap closure rate may be a value such as 0.97, 0.98, 0.99, or any other value.

In some embodiments, the term "predictive impact score" refers to a data entity that describes a causal impact of a prediction-based action on a gap closure rate. In some examples, a predictive impact score may include a predictive output from an action-specific causal inference model. For example, a predictive impact score may be a causal change in assessed conditions per risk gap. In some examples, the predictive impact score may be used in combination with a gap closure rate to compute a causal gap closure score. For example, in a clinical context, the predictive impact score may represent a causal change in assessed conditions per gap which may be used with a provider diagnosis rate to compute a causal change in diagnosed conditions per gap.

In some embodiments, a predictive impact score is a static and/or dynamic value, range of values, percentage, real number, ratio, numeric, and/or the like. By way of example, a predictive impact score may be value such as 0.02, 0.06, 0.09, or any other value.

In some embodiments, the term "action-specific causal inference model" refers to a predictive model constructed to compute a causal change in a metric associated with an evaluation entity attributable to a given action. For example, in a clinical context, the evaluation entity related metric may be a change in assessed medical conditions per risk gap in response to a given entity being enrolled in a program. In some examples, an action-specific causal inference model may be configured to predict by how much an evaluation entity may change its ability to assess health conditions associated with predictive entities as a result of enrolling in a training program.

In some embodiments, an action-specific causal inference model includes a directed acyclic graph with a plurality of nodes and edges defining a plurality of factors and their relationships to a diagnosis of a condition. For example, a directed acyclic graph 1 may be constructed using one or more subject matter experts based on one or more causal relationships expressed in a prediction domain. In some examples, a directed acyclic graph may include nodes that represent factors with an historical, observed, and/or predicted impact on a metric and unidirectional edges between nodes representative of causal relationships between factors. In some examples, a prediction-based action may be represented within a directed acyclic graph by a Boolean node. By way of example, in a clinical context, the Boolean node may be switched on to represent an enrollment in a clinical program and switched off to represent an unenrollment in the clinical program.

In some embodiments, the term "predictive improvement measure" refers to an action-agnostic measure of impact with respect to an evaluation entity. A predictive improvement measure, for example, may include a unit of measurement that is agnostic to a prediction-based action. The predictive improvement measure may be leveraged to transform an action-based measures of impact to comparable units of measurements across different potential prediction-based actions within a prediction domain. By way of example, in a clinical context, a predictive improvement measure may include an average revenue per diagnosis for a provider. In such a case, a predictive improvement measure may be a predicted revenue amount that a provider receives in response to making a new diagnosis associated with a health condition of a client. The predictive improvement measure may be used in combination with a causal risk opportunity score to generate a causal risk-based impact score based on a prediction-based action that may be comparable across each of a plurality of different, interrelated prediction-based actions within a prediction domain. For example, in a clinical context, a predictive improvement measure may be an average revenue per diagnosis which may be used in combination with a causal opportunity score to generate a causal risk revenue change associated with a particular enrollment status of an evaluation entity in a clinical program.

In some embodiments, a predictive improvement measure is a static and/or dynamic value, range of values, percentage, real number, ratio, numeric, and/or the like. By way of example, a predictive improvement measure may be a value such as 2000, 1000, 500, or any other value.

In some embodiments, the term "recommendation data object" refers to a data entity that describes one or more prediction-based action tailored to a goal of a user. For example, a recommendation data object may be indicative (e.g., include a context identifier, textual description, graphical elements, etc.) of a context-specific data entity that is associated with one or more actions a user may take. By way of example, a recommendation data object may include one or more recommendation rank scores, causal net impact scores, causal risk-based impact scores, causal quality-based impact scores, data descriptive of prediction-based actions, evaluation entities, programs, or the like usable by a user (e.g., a training program enrollment team in a clinical context). In one example, in a clinical context, a recommendation data object may be directed to a healthcare program (e.g., a health insurance plan, a Medicare plan, etc.). In some examples, a recommendation data object may correspond to a particular program recommendation (e.g., insurance training program, healthcare plan recommendation, health insurance plan recommendation, Medicare plan recommendation, etc.). In some examples, a recommendation data object may correspond to descriptive data associated with one or more evaluation entities (e.g., healthcare providers) related to a particular program recommendation.

In some embodiments, the term "evaluation entity" refers to an entity for which one or more evaluations, assessments, analyses, or the like are made. For example, in a clinical context, an evaluation entity may be a provider or healthcare provider. According to various embodiments of the present disclosure, the evaluation entity may be associated with one or more evaluations, assessments, analyses, or the like. For example, an evaluation entity may be assessed to determine various outcomes or impacts of enrolling the evaluation entity in a program. In one example, an evaluation entity is assessed to determine the change in revenue causally related to enrollment of the evaluation entity in a program. In another example, an evaluation entity is evaluated to determine a star change of a health plan causally related to the enrollment status of the evaluation entity with respect to a program. In yet another example, a plurality of evaluation entities is evaluated to determine the financial impact causally related to enrollment of the plurality of evaluation entities in a program.

In some embodiments, the term "predictive entity" refers to an entity for which one or more predictions, insights, or the like are derived. For example, in a clinical context, a predictive entity may be a member, client, or the like of a healthcare provider. According to various embodiments of the present disclosure, a predictive entity may be associated with one or more predictions, insights, forecasts, or the like. For example, one or more generated engagement scores, predictive risk scores, predictive risk-based opportunity scores, or the like may be derived from a predictive entity.

In some embodiments, the term "entity cohort" refers to a plurality of associated predictive entities. For example, in a clinical context, an entity cohort may include a plurality of members, clients, or the like that are associated by common membership within an evaluation entity (e.g., healthcare provider).

In some embodiments, the term "categorical ranking scheme" refers to a rule-based ranking scheme for evaluating an entity group. A categorical ranking scheme may define a plurality of ranked categories. A specific ranked category may be assigned to an entity group based on the entity group's performance with respect to a plurality of metrics. For example, a specific ranked category may be assigned to an entity group based on one or more quality metrics associated with the entity group. In some examples, the ranked categories defined by a categorical ranking scheme may be a set of discrete categories. By way of example, in a clinical context, the categorical ranking scheme may be a Five-Star Quality Rating System defined by the Centers for Medicare & Medicaid Services (CMS). In such a case, the specific ranked categories may be one of the star levels defined by the Five-Star Quality Rating System. By way of example, an entity group, such as a health plan in a clinical example, may be assigned to a categorical quality-based star rating from one to five stars, with higher levels of reimbursement awarded for each incremental star (e.g., ranked category). In some examples, ranked category, such as a quality-based star rating of a health plan, may be determined by an entity group's aggregated performance on a set number of discrete quality measures. For example, following on from the clinical example, the 2025 Star Ratings are currently expected to consider forty different quality metrics.

In some examples, a specific ranked category may be assigned to an entity group with respect to a time interval. For example, an entity group may be assigned one specific ranked category for one time interval (e.g., a current year) and another specific ranked category for another time interval (e.g., a future year). In some examples, a change in the assigned specific ranked category associated with an entity group (e.g., across two consecutive time intervals) may be associated with one or more impacts (e.g., higher levels of reimbursement, etc.). Using some of the techniques of the present disclosure, these impacts may be forecasted based on a plurality of plurality of predictive quality measures corresponding to each of a plurality of quality metrics considered by a categorical ranking system. By way of example, impacts, such as metric-level impact scores, causal metric-level impact scores, causal quality-based impact scores, or the like may be generated based on a change in an assigned specific ranked category associated with an entity group due to a prediction-based action.

In some embodiments, the term "quality metric" refers to a type of quality for evaluating an entity group. For example, a categorical ranking scheme may define a plurality of quality metrics that each evaluate a particular aspect of an entity group. The plurality of quality metrics may be collectively used, in accordance with the categorical ranking scheme, to assign a specific categorical ranking to an entity group. A particular quality metric may include a member-based quality metric and/or a survey-based quality metric.

In some embodiments, the term "member-based quality metric" refers to a type of quality metric for evaluating an interaction between one or more predictive entities and an associated evaluation entity. By way of example, in a clinical context, a member-based quality metric may be colorectal cancer screening, diabetes care, eye exam care, cardiovascular care, cholesterol screening, or the like. Each predictive entity associated with an evaluation entity may be categorized as noneligible, compliant, or noncompliant for each member-based quality metric. For example, in a clinical context, with respect to a member-based quality metric (e.g., diabetes care), a member of a healthcare provider may be noneligible for consideration, compliant (e.g., the member has received the respective recommended care), or noncompliant (e.g., the member has not received the respective recommended care). In some examples, a member-based quality metric may be a Healthcare Effectiveness Data and Information Set (HEDIS) quality metric (e.g., Colorectal Cancer Screening, Diabetes Care-Eye Exam, Cardiovascular Care-Cholesterol Screening, etc.), Pharmacy quality metric (e.g., Medical Adherence for Diabetics and Medical Adherence for Hypertonics), or the like as defined by CMS. In some examples, various operations and mathematical logic associated with HEDIS and Pharmacy quality metrics may be similar such that the terms may be used interchangeably herein.

In some embodiments, the term "survey-based quality metric" refers to a type of quality derived from a survey for evaluating an interaction between one or more predictive entities and an associated evaluation entity. By way of example, in a clinical context, a survey-based quality metric may be derived from a survey administered by CMS to assess one or more predictive entities' experiences with an evaluation entity. Examples of such quality metrics include Annual Flu Vaccine, Rating of Drug Plan and Getting Appointments and Care Quickly, as defined by CMS. In some examples, a survey-based quality metric may be derived from Consumer Assessment of Healthcare Providers and Systems (CAHPS) or Health Outcomes Survey (HOS).

In some embodiments, a survey-based quality metric may be based on a plurality of sub-questions. In such a case, various operations with respect to a survey-based quality metric described herein may be replicated for each sub-question where the quality metric is based on the plurality of sub-questions. For example, a survey-based quality metric may be the mean of a plurality of sub-questions.

In some embodiments, the term "predictive quality performance measure" refers to a predictive measure of an evaluation entity's performance with respect to a quality metric. A predictive quality performance measure, for example, may represent an expected, unmodified performance of an evaluation entity with respect to a quality metric without the performance of a prediction-based action. By way of example, in a clinical domain, a predictive quality performance measure may include a predicted quality gap closure fraction representing a predicted percentage of quality gaps accounted for by a quality metric that are expected to be closed by an evaluation entity over a clinical year. A predictive quality performance measure may be generated for any type of quality metric using a metric-specific predictive model tailored to the particular quality metric.

In some embodiments, a predictive quality performance measure is a static and/or dynamic value, range of values, percentage, real number, ratio, numeric, and/or the like. By way of example, a predictive quality performance measure may be a value such as 0.68, 0.98, 0.78, or any other value.

In some embodiments, the term "metric-specific predictive model" refers to a predictive model configured to forecast a predictive quality performance measure for a particular quality metric given. A metric-specific predictive model may be tailored to the particular metric. For example, a different metric-specific predictive model may be accessed, trained, and/or leveraged to generate a predictive quality performance measure for each of a plurality of quality metrics.

In some examples, a metric-specific predictive model may include one of a plurality of model types. A first model type, for example, may include a metric-specific performance forecasting model that is configured to generate a predictive quality performance measure for a member-based quality metric. A second model type may include a metric-specific performance simulation model that is configured to generate a predictive quality performance measure for a survey-based quality metric.

In some embodiments, the term "metric-specific performance forecasting model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A metric-specific performance forecasting model, for example, may include one or more machine learning models configured, trained (e.g., jointly, separately, etc.) to forecast a member-based quality metric. A metric-specific performance forecasting model may include one or more of any type of machine learning model including one or more supervised, unsupervised, semi-supervised, reinforcement learning models, and/or the like. In some examples, a metric-specific performance forecasting model may include multiple models configured to perform one or more different stages of a prediction process.

In some embodiments, a metric-specific performance forecasting model is a time-series neural network, such as one or more autoregressive neural networks, and/or the like. By way of example, in a clinical context, a metric-specific performance forecasting model may be a time-series neural network model trained to predict the fraction of an evaluation entity's total quality gaps that will be closed in a given clinical year for a particular quality metric. A metric-specific performance forecasting model, for example, may be trained, using one or more supervised training techniques (e.g., standard gradient descent, backpropagation of errors, etc.) based on a plurality of historical interaction data objects and historical quality measures associated with a plurality of evaluation entities. In some examples, the training data for each of a plurality of metric-specific performance forecasting models may be tailored to a specific quality metric. For instance, the training data for a metric-specific performance forecasting model corresponding to a particular quality metric may include a plurality of historical interaction data objects and a plurality of historical quality measures (e.g., ground truths) for the particular quality metric.

In some embodiments, the term "metric-specific performance simulation model" refers to a hybrid model configured to forecast a survey-based quality metric. A metric-specific performance simulation model, for example, may include one or more of a proxy survey, eligibility prediction sub-model, response likelihood prediction sub-model, and/or response prediction sub-model. By way of example, a metric-specific performance simulation model may predict a survey-based quality metric for an evaluation entity with respect to a time interval (e.g., over a clinical year).

In some embodiments, the term "proxy survey" refers to a survey configured to replicate a target survey. In some examples, a proxy survey (e.g., Starmaker, etc.), may be used in combination with a metric-specific performance simulation model where the proxy survey is configured to simulate the constituent questions of a target survey associated with a survey-based quality metric (e.g., CAHPS, HOS, etc.). In some examples, the proxy survey may be distributed to a plurality of predictive entities associated with an entity group. The responses to the proxy survey may be used in combination with historic interaction data objects associated with the predictive entities to simulate the outcome of the target surveys (e.g., CAHPS, HOS, etc.) being answered by the same predictive entities.

In some embodiments, the term "eligibility prediction sub-model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). An eligibility prediction sub-model, for example, may be a rules-based logic model configured to define whether a predictive entity is eligible for a respective topic/condition outlined by a survey question (e.g., a proxy survey question). In some examples, an eligibility prediction sub-model may generate a static and/or dynamic value, range of values, percentage, real number, ratio, numeric, categorical variable, binary indicator such as 1 or 0, true or false, yes or no, and/or the like.

In some embodiments, the term "response likelihood prediction sub-model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A response likelihood prediction sub-model, for example, may include one or more machine learning models configured, trained (e.g., jointly, separately, etc.) to forecast a likelihood that an evaluation entity will complete a survey. A response likelihood prediction sub-model may include one or more of any type of machine learning model including one or more supervised, unsupervised, semi-supervised, reinforcement learning models, and/or the like. In some examples, a response likelihood prediction sub-model may include multiple models configured to perform one or more different stages of a prediction process.

In some embodiments, a response likelihood prediction sub-model is trained using one or more supervised training techniques. In some examples, response likelihood prediction sub-model may be trained, using the supervised training techniques, to generate a predictive entity's survey response likelihood given a question of a survey (e.g., CAHPS, HOS, etc.) based on one or more historical interaction data objects associated with a predictive entity. By way of example, a response likelihood prediction sub-model may be trained using labeled predictive entity data descriptive of a plurality of predictive entities and one or more labels each indicative of an occurrence of an interaction with a historical survey question. By way of example, a response likelihood prediction sub-model may include a supervised machine learning regression model, such as a linear regression, logistic regression, and/or the like, that is previously trained (and/or continuously trained) to generate a response likelihood prediction for a predictive entity based on one or more features (e.g., extracted from health records in a clinical context) of the predictive entity.

In some embodiments, the term "survey response likelihood" refers to a data entity that describes a forecasted probability that a predictive entity will respond to a given question of a survey. In some examples, a survey response likelihood is used in combination with an engagement score to generate a predictive quality performance measure. In some embodiments, a survey response likelihood may be a static and/or dynamic value, range of values, percentage, real number, ratio, numeric, binary indicator, categorical variable, and/or the like. By way of example, a survey response likelihood may be 0.33, 0.66, 1, or any other value.

In some embodiments, the term "response prediction sub-model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A response prediction sub-model, for example, may include one or more rule-based or machine learning models configured, trained (e.g., jointly, separately, etc.) to generate a predicted survey response for a predictive entity given a survey question. A response prediction sub-model may include one or more of any type of machine learning model including one or more supervised, unsupervised, semi-supervised, reinforcement learning models, and/or the like. In some examples, a response prediction sub-model may include multiple models configured to perform one or more different stages of a prediction process.

In some embodiments, a response prediction sub-model is trained using one or more supervised training techniques. In some examples, response prediction sub-model may be trained, using the supervised training techniques, to generate a predicted survey response given a question of a survey (e.g., CAHPS, HOS, etc.) based on one or more historical interaction data objects associated with a predictive entity. By way of example, a response prediction sub-model may be trained using labeled predictive entity data descriptive of a plurality of predictive entities and one or more labels each indicative of a historical response to a historical survey question. By way of example, a response prediction sub-model may include a supervised machine learning regression model, such as a linear regression, logistic regression, and/or the like, that is previously trained (and/or continuously trained) to generate a response prediction for a predictive entity based on one or more features (e.g., extracted from health records in a clinical context) of the predictive entity. In some examples, the response prediction sub-model may be trained using one or more proxy survey responses to explicitly predict what the survey response would be if a particular predictive entity was contacted and responded.

In some embodiments, the term "metric-specific predictive impact measure" refers to a data entity that describes a change in a predictive quality performance measure with respect to a particular prediction-based action. By way of example, in a clinical context, a metric-specific predictive impact measure may correspond to a causal increase in a quality gap closure fraction with respect to a particular prediction-based action (e.g., enrolment of an evaluation entity in a program). The metric-specific predictive impact measure may be used in combination with a respective predictive quality performance measure to generate a modified quality performance measure for an evaluation entity.

In some embodiments, a metric-specific predictive impact measure may be generated by a causal inference model. A metric-specific predictive impact measure may be a static and/or dynamic value, range of values, percentage, real number, ratio, numeric, and/or the like. By way of example, a metric-specific predictive impact measure may be a value such as 0.07, 0.01, 0.05, or any other value.

In some embodiments, the term "modified quality performance measure" refers to a predictive quality performance measure modified by a metric-specific predictive impact measure. A modified quality performance measure, for example, may represent an expected, modified performance of an evaluation entity with respect to a quality metric given the performance of a prediction-based action. By way of example, in a clinical context, a modified quality performance measure may include a causal quality gap closure fraction representing a predicted percentage of quality gaps accounted for by a quality metric that are expected to be closed by an evaluation entity over a clinical year given performance of a prediction-based action.

In some embodiments, a modified quality performance measure may be based on a predictive quality performance measure and metric-specific predictive impact measure. A modified quality performance measure may be a static and/or dynamic value, range of values, percentage, real number, ratio, numeric, and/or the like. By way of example, a modified quality performance measure may be a value such as 0.75, 0.99, 0.83, or any other value.

In some embodiments, the term "modified group quality performance measure" refers to a measure that is based on a plurality of modified quality performance measures. For example, a modified group quality performance measure may be an average, median, aggregate, range, or the like based on a plurality of modified quality performance measures associated with an entity group.

In some embodiments, a modified group quality performance measure may be a static and/or dynamic value, range of values, percentage, real number, ratio, numeric, and/or the like. By way of example, a modified group quality performance measure may be a value such as 0.85, 0.83, 0.94, or any other value.

In some embodiments, the term "metric specific categorical threshold" refers to a data entity that describes a threshold between categories of a categorical ranking scheme. A categorical ranking scheme may include a plurality of specific ranked categories where each specific ranked category is associated with a range of values corresponding to a specific metric. By way of example, in a clinical context, a metric specific categorical threshold may be a value that defines a threshold associated with a modified group quality performance measure. For example, a modified group quality performance measure of a first value (e.g., 0.80) may correspond to an entity group being assigned a first specific ranked category (e.g., 4 stars) while a modified group quality performance measure of a second value (e.g., 0.88) that satisfies a metric specific categorical threshold (e.g., 0.85) may correspond to the entity group being assigned a second specific ranked category (e.g., 5 stars).

In some embodiments, the term "metric-level categorical improvement prediction" refers to a data entity that describes a prediction of whether an entity group will be assigned an improved specific ranked category within a categorical ranking scheme with respect to a particular quality metric. In some examples, a metric-level categorical improvement prediction may be based on a comparison between a modified group quality performance measure and a metric-specific categorical threshold. For example, a metric-level categorical improvement prediction may indicate that an improved Star Rating will not be assigned to an entity group in response to a modified group quality performance measure (e.g., 0.85) failing to satisfy a metric-specific categorical threshold (e.g., 0.88). In another example, a metric-level categorical improvement prediction may indicate that an improved Star Rating will be assigned to an entity group in response to a modified group quality performance measure (e.g., 0.90) satisfying a metric-specific categorical threshold (e.g., 0.88). In some examples, a metric-level categorical improvement prediction may be a static and/or dynamic value, range of values, percentage, real number, ratio, numeric, categorical variable, binary indicator such as 1 or 0, true or false, yes or no, and/or the like.

In some embodiments, the term "operational quality measure" refers to a type of quality for evaluating an optimization entity. By way of example, in a clinical context, an operation quality measure may include information describing complaints about a drug plan or if a plan makes timely decisions about appeals and reviewing appeals decisions. In some examples, an operational quality measure may be associated with or impact a specific ranked category assigned to an entity group. In some examples, a model may be configured to predict a specific ranked category associated with an operational quality measure assigned to an entity group for a particular time interval. For example, a machine learning operation forecasting model may be configured to predict a star rating of one or more operational quality measures for an entity group over a clinical year.

In some embodiments, the term "machine learning operation forecasting model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A machine learning operation forecasting model, for example, may include one or more rule-based or machine learning models configured, trained (e.g., jointly, separately, etc.) to predict an operational quality measure. A machine learning operation forecasting model may include one or more of any type of machine learning model including one or more supervised, unsupervised, semi-supervised, reinforcement learning models, and/or the like. In some examples, a machine learning operation forecasting model may include multiple models configured to perform one or more different stages of a prediction process.

In some embodiments, a machine learning operation forecasting model is trained using one or more supervised training techniques. In some examples, machine learning operation forecasting model may be trained, using the supervised training techniques, to generate an operational quality measure for a quality metric based on one or more evaluation entity attributes and one or more ground truth operational quality measures. By way of example, a machine learning operation forecasting model may include a supervised machine learning regression model, such as a linear regression, logistic regression, and/or the like, that is previously trained (and/or continuously trained) to generate an operational quality measure for an evaluation entity based on one or more features (e.g., extracted from health records in a clinical context) of the evaluation entity.

In some embodiments, the term "scheme-based quality improvement measure" refers to a type of quality for evaluating the improvement of one or more quality metrics. By way of example, in a clinical context, a scheme-based quality improvement measure may evaluate whether a quality metric (e.g., HEDIS, CAHPS, HOS, etc.) for a particular entity group has significantly improved, declined, or not changed between two consecutive clinical years. In some examples, a scheme-based quality improvement measure may be associated with or impact a specific ranked category assigned to an entity group. In some examples, a scheme-based quality improvement measure may be a function of the performance of one or more quality measures (e.g., eligible quality measures within the CMS Star Ratings). In some examples, a scheme-based quality improvement measure is determined by a scheme-specific rule-based model. In some examples, a scheme-based quality improvement measure may be a static and/or dynamic value, range of values, percentage, real number, ratio, numeric, categorical variable, binary indicator, or the like. By way of example, a scheme-based quality improvement measure may be $-0.036$, $0.36$, $0.15$, or any other value.

In some embodiments, the term "scheme-specific rule-based model" refers to a model configured to forecast a scheme-based quality improvement measure. In some examples, a scheme-specific rule-based model includes a paired t-test at a specific significance level (e.g., 5% significance level) that determines if a specific quality metric has significantly improved, declined, or not changed between different time intervals. By way of example, in a clinical context, a scheme-specific rule-based model may include a t-test (e.g., a paired t-test described by CMS) from which minimum values may be derived that define significant improvement or decline for a scheme-based quality improvement measure. By way of example, for a CMS categorical ranking scheme, examples may be extracted from CMS documentation and summarized to generate a scheme-specific rule-based model, including the following series of equations:

$$\text{Diffrence } (diff) = \text{score}_2 - \text{score}_1$$

$$\text{correlation (corr)} = \text{Table } 1 - 1 \text{ Star Rating Technical Notes}$$

$$\text{Standard Error } (SE) = \sqrt{\frac{\text{score} * (100 - \text{score})}{\text{denominator}}}$$

$$\text{Covariance (cov)} = SE_1 * SE_2 * \text{corr}$$

$$SE(diff) = \sqrt{SE_1^2 + SE_2^2 - 2 * \text{cov}}$$

$$\text{Test Statistic} = \frac{diff}{SE(diff)}$$

$$IMPR \text{ Result} = \text{If } t > +1.96 \text{ then significant improvement}$$

$$\text{If } t < -1.96 \text{ then Significant Decline}$$

$$\text{Else No Significant Change}$$

Using the above series of equations, minimum values such that significant improvement or decline of a quality metric is achieved may be derived as follows by let $\hat{r}_2 \in [0,1]$ be the prior year quality metric score, letting $\text{den} x \in \mathbb{N}+$ be the current year quality metric's denominator (e.g., number of eligible predictive entities for the given quality metric), letting $\rho \in [0,1]$ be the year-on-year quality metric correlation, and letting $SE \in \mathbb{R}$ be the prior year's standard error. The thresholds for achieving significant improvement/decline are given by $x \in [0,1]$ such that:

$$\frac{x - \hat{r}_2}{\sqrt{\frac{x(1-x)}{den_x} + SE^2 - 2\rho SE \sqrt{\frac{x(1-x)}{Den_x}}}} \pm 1.96 = 0$$

Since the above function is continuous and differentiable on the domain of the function, Newton's method may be applied to approximate the aforementioned thresholds. Note, in some examples, there are instances where no value for x exists that satisfies the expression. In such examples, the solution does not exist in the domain of the function and significant improvement/decline is impossible for the respective quality metric (e.g., a quality metric whose prior year score is close to the boundary of the domain).

Using the outputs from one or more models for one or more respective other quality measures, a plurality of metric-level categorical improvement prediction may be made. The following equation generalizes the total scheme-based quality improvement measure. In some examples, there may be one or more distinct scheme-based quality improvement measures (e.g., CMS part C and CMS part D) and the following equation generalized to both:

$$I_R = \left| \frac{\sum_{j=1}^{j=M} w_j i_R^j}{\sum_{j=1}^{j=M} w_j} \right|,$$

where $I_R$ denotes the total scheme-based quality improvement measure, $w_j$ denotes the metric-specific weight and $$i_R^j \in \{-1, 0, 1\}$$

denotes the scheme-based quality improvement measure for quality metric j. In some examples, it may be assumed that there are M discrete quality metrics that are eligible for the scheme-based quality improvement measures calculation. $I_R$ may be compared to a metric-specific categorical threshold to determine a metric-level categorical improvement prediction.

In some embodiments, the term "categorical improvement prediction" refers to a prediction of a whether an improved specific ranked category will be assigned to an entity group based on a prediction-based action. A categorical improvement prediction, for example, may be based on a first group-based action-specific rank (e.g., 2 Stars) without the performance of a prediction-based action (e.g., enrollment in a program) and a second group-based action-specific rank (e.g., 3 Stars) with the performance of a prediction-based action (e.g., enrollment in a program). In such an example, a categorical improvement prediction may indicate that the prediction-based action resulted in an improved specific rank category assigned to the entity group.

In some embodiments, the term "group-based action-specific rank" refers to a predicted assigned specific ranked category for an entity group with respect to a prediction-based action. A group-based action-specific rank, for example, may be determined by:

$$S_R = \left| \frac{\sum_{i=1}^{i=N} w_i s_R^j}{\sum_{i=1}^{i=N} w_i} \right|,$$

where $S_R$ denotes the group-based action-specific rank, $w_i$ denotes a metric-specific weight, and $$s_R^i$$

denotes a metric-specific action-specific rank of quality metric i. In some examples, it is assumed that there are N impact score is used in combination with a metric-specific predictive impact measure to generate a causal metric-level impact score.

In some embodiments, a metric-level impact score is a static and/or dynamic value, range of values, percentage, real number, ratio, numeric, and/or the like. By way of example, a metric-level impact score may be 100, 500, 1800, or any other value. By way of example, a metric-level impact score may be generated using the following equation:

$$DR_i = \frac{w_i\left[\langle s_R^i|\text{enrolled}\rangle - \langle s_R^i|\text{not enrolled}\rangle\right]\left[\langle R_{HP}|\text{enrolled}\rangle - \langle R_{HP}|\text{not enrolled}\rangle\right]}{\sum_{i=1}^{i=N} w_i\left[\langle s_R^i|\text{enrolled}\rangle - \langle s_R^i|\text{not enrolled}\rangle\right]},$$

discrete relevant quality metrics, and that disaster mitigation occurrences may be accounted for the model.

In some embodiments, the term "metric-specific action-specific rank" refers to a predicted assigned specific ranked category of a categorical ranking scheme for an entity group based on a specific quality metric and prediction-based action. For example, a plurality of metric-specific action-specific ranks may be predicted for an entity group where each metric-specific action-specific rank corresponds to a specific quality metric (e.g., HEDIS, CAHPS, HOS, etc.) and a specific prediction-based action (e.g., enrollment in a program, no enrollment in a program). In one example, a metric-specific action-specific rank may correspond to a HEDIS quality measure given no enrollment in a program. In another example, a metric-specific action-specific rank may correspond to a CAHPS quality measure given enrollment in a program.

In some embodiments, the term "metric-specific weight" refers to a data entity that describes a predetermined variable used to modify the value of another variable. A metric-specific weight, for example, may be a value associated with a specific quality metric that is used to scale a metric-specific action-specific rank and/or scheme. In some examples, a metric-specific weight is defined by CMS.

In some embodiments, the term "quality impact score" refers to a data entity representative of an impact associated with a prediction-based action. For example, in a clinical context, a quality impact score may be a revenue related to a health plan. In some examples, a quality impact score is conditional on a prediction-based action. For example, in a case where the quality impact score is a revenue related to a health plan, the revenue may be conditional on an enrollment status of one or more evaluation entities associated with the health plan (i.e., entity group). In some examples, a quality impact score may be used in combination with a group-based action-specific rank to generate a metric-level impact score.

In some embodiments, a quality impact score is a static and/or dynamic value, range of values, percentage, real number, ratio, numeric, and/or the like. By way of example, a quality impact score may be a value such as 2000, 1000, 500, or any other value.

In some embodiments, the term "metric-level impact score" refers to a data entity representative of a change in a metric associated with a quality metric. By way of example, in a clinical context, a metric-level impact score may be a revenue change that may be substantively causally related to a given quality metric. In some examples, a metric-level impact score is based on an impact score and a group-based action-specific rank. In some examples, a metric-level where $DR_i$ denotes the metric-level impact score of quality metric i, $$\langle s_R^i \mid \text{enrolled} \rangle \text{ and } \langle s_R^i \mid \text{not enrolled} \rangle$$

denotes the group-based action-specific rank and $\langle R_{HP}|\text{enrolled}\rangle$ $\langle R_{HP}|\text{not enrolled}\rangle$ denotes the quality impact score.

In some embodiments, the term "causal metric-level impact score" refers to a data entity representative of an impact associated with a given quality metric and evaluation entity. For example, in a clinical context, a causal metric-level impact score may be a revenue generated with respect to a given quality metric and a given evaluation entity. In some examples, a causal metric-level impact score is based on a metric-specific predictive impact measure and metric-level impact score. In some examples, a plurality of causal metric-level impact scores is generated with respect to each of a plurality of quality metrics and evaluation entities such that the revenue generated for a given evaluation entity may be generated by aggregating the causal metric-level impact scores across all quality metrics associated with the given evaluation entity. Similarly, a causal metric-level impact score for an entity group may be generated by aggregating the causal metric-level impact scores across all evaluation entities for the entity group.

In some embodiments, a causal metric-level impact score is a static and/or dynamic value, range of values, percentage, real number, ratio, numeric, and/or the like. By way of example, a causal metric-level impact score may be a value such as 100, 500, 2000, or any other value. By way of example, a causal metric-level impact score may be generated using the following equation:

$$p_{ij} = \frac{c_{ij}DR_i}{\sum_{j=1}^{j=3} c_{ij}}.$$

where $p_{ij}$ denotes the causal metric-level impact score of quality metric i and evaluation entity j, $DR_i$ denotes the metric-level impact score of quality metric i, and $c_{ij}$ denotes the metric-specific predictive impact measure of quality measure i and evaluation entity j.

Next, we may compute the extra quality revenue generated by provider j related to its causal increase in quality gap closure fraction for quality measure i. Specifically, $$p_{ij} = \frac{c_{ij}DR_i}{\sum_{j=1}^{j=3} c_{ij}}.$$

Here, $c_{ij}$ denotes the causal increase in quality gap closure fraction.

In some embodiments, the term "causal quality-based impact score" refers to a data entity representative of an impact associated with a given evaluation entity for a plurality of quality metrics. For example, in a clinical context, a causal quality-based impact score may be a revenue generated with respect to a given evaluation entity for a plurality of quality metrics. In some examples, a causal quality-based impact score is based on a plurality of causal metric-level impact scores. For example, a plurality of causal metric-level impact scores associated with an evaluation entity may be used in combination (e.g., aggregated) to generate a causal quality-based impact score. By way of example, a causal quality-based impact score may be generated using the following equation:

$$p_j = \sum_{i=1}^{i=N} p_{ij}.$$

where $p_j$ denotes the causal quality-based impact score of evaluation entity j and $p_{ij}$ denotes the causal metric-level impact score of quality metric i and evaluation entity j Finally, the causal quality revenue per provider may be written as:

$$p_j = \sum_{i=1}^{i=N} p_{ij}.$$

In some embodiments, the term "action sequence" refers to a data entity that is descriptive of an action status for each of one or more evaluation entities within an entity group with respect to a prediction-based action. By way of example, an action sequence may include a sequence of action statuses with respect to a prediction-based action. Each action status in the sequence of action statuses may identify whether a prediction-based action will be performed for a particular evaluation entity. For example, a prediction-based action may include a program in which an evaluation entity may be enrolled, and the action status may identify an enrollment status (e.g., enrolled, not enrolled, etc.) for an evaluation entity. By way of example, in a clinical context, the plurality of prediction-based actions may include a plurality of training programs and the action sequence may identify a particular set of evaluation entities (e.g., providers, etc.) within an entity group (e.g., healthcare plan) that are (and/or are simulated to be) enrolled and/or not enrolled with a particular training program.

In some embodiments, the term "action status" refers to a data entity that is descriptive of an evaluation entity's status with respect to a candidate prediction-based action. For example, in a clinical context, an action status may provide an indication of whether an evaluation entity is enrolled in a training program. An action status may be updated dynamically to reflect the real time or near real time status of an evaluation entity with respect to a prediction-based action. An action status, for example, may be based on one or more of an action sequence, updated action sequence, enrollment response, selectable evaluation entity, and/or the like.

In some embodiments, the term "entity-specific impact metric" refers to a data entity that is descriptive of an impact associated with an evaluation entity and a prediction-based action. By way of example, in a clinical context, an entity-specific impact metric may include a cost to enroll a particular evaluation entity in a training program. In some examples, an entity-specific impact metric may be a static and/or dynamic value, range of values, percentage, real number, ratio, numeric, and/or the like. By way of example, an entity-specific impact metric may be a value such as 24,529.00, 12,971.06, 8,893.55, or any other value.

In some embodiments, the term "sequence impact metric" refers to a data entity that is descriptive of an impact associated with a plurality of evaluation entities and an action sequence for a prediction-based action. A sequence impact metric, for example, may include an aggregation (e.g., a summation, etc.) of each entity-specific impact metric for an action sequence. By way of example, in a clinical context, a sequence impact metric may include an aggregated cost to enroll each of the enrolled evaluation entities of an action sequence. In some examples, a sequence impact metric may be a static and/or dynamic value, range of values, percentage, real number, ratio, numeric, and/or the like. By way of example, a sequence impact metric may be a value such as 62,539.41, 41,721.06, 42,894.71, or any other value.

In some embodiments, the term "causal net impact score" refers to a data entity that is descriptive of a net impact associated with an action sequence. A causal net impact score, for example, may be based on (e.g., an aggregate of) a causal metric-based impact score, causal risk-based impact score, and sequence impact metric. By way of example, the causal net impact score may include a difference between (i) an aggregation of the causal quality-based impact score and the causal risk-based impact score and (ii) a sequence impact metric. For example, in a clinical context, a causal net impact score may include a causal net profit associated with one or more enrollment decisions of an action sequence. The causal net profit may include a revenue calculated from the causal quality-based impact score and the causal risk-based impact score minus the sequence impact metric. In some examples, a causal net impact score may be a static and/or dynamic value, range of values, percentage, real number, ratio, numeric, and/or the like. By way of example, a causal net impact score may be a value such as 20,488.59, 23,283.74, −14,365.52, or any other value.

In some embodiments, the term "sequence ranking" refers to a data entity that is descriptive of a relative significance of an action sequence with respect to one or more alternative action sequences. A sequence ranking, for example, may identify a rank ordering for a plurality of action sequences based on a plurality of respective causal net impact scores. For example, in a clinical context, a sequence ranking may include a prioritized list of a plurality of action sequences with respect to one or more enrollment requests. In this manner, a sequence ranking may be leveraged to automate one or more enrollment requests.

In some embodiments, the term "interactive user interface" refers to a specially configured graphical user interface tailored for optimizing prediction-based actions in accordance with some of the embodiments of the present disclosure. The interactive user interface may be configured to dynamically present, via one or more output devices (e.g., visual displays, audio devices, tactile devices, etc.) ranked action sequences based on one or more of the quality- and/or risk-based measures of the present disclosure. As described herein, the interactive user interface may dynamically update the ranked action sequences in response to one or more inputs, such as time, user input, action responses and/or the like. In this manner, the interactive user interface may present a live representation of ranked action sequences.

In some embodiments, the interactive user interface includes and/or is associated with one or more input mechanisms that enable a user to interact with information, such as a ranked action sequence and/or one or more components thereof, presented by the interactive user interface. The input mechanisms, for example, may include one or more interactive icons displayed by an output device, one or more physical and/or digital buttons, one or more microphones for receiving audio input, and/or the like. By way of example, the ranked action sequences may include a plurality of selectable evaluation entities (and/or selectable components thereof) that enable interacting with one or more of an action sequence, action status, causal metric-based impact score, causal risk-based impact score, sequence impact metric, causal net impact score, sequence ranking, selectable evaluation entity, updated action sequence, updated sequence ranking, enrollment request, enrollment response, denial response, approval response, and/or the like.

As described herein, an interactive user interface may receive user input via one or more input mechanisms and perform a real time action in response to the user input. The real time action, for example, may include updating an action sequence and/or one or more characteristics (e.g., an action status for a particular evaluation entity, etc.) and presenting an updated ranked list based on the updated action sequence. In addition, or alternatively, the real time action may include initiating a prediction-based action for an evaluation entity, providing an enrollment request to an evaluation entity device to enroll in a predictive-based action, and/or the like. In some examples, the interactive user interface may continuously receive action status updates (e.g., through communication with one or more external entities, etc.) from a plurality of evaluation entities and dynamically update the presented ranked action sequences in real time.

In some embodiments, the term "selectable evaluation entity" refers to a component of an interactive user interface representative of an evaluation entity and/or one or more components thereof. A selectable evaluation entity, for example, may include an interactive icon that enables a user to perform one or more operations with respect to an evaluation entity. In some examples, a selectable evaluation entity may be used to interact with information about a respective evaluation entity, such as an action status, updated action sequence, updated sequence ranking, enrollment request, enrollment response, denial response, approval response, or the like. For example, selection of a selectable evaluation entity may cause generation of an enrollment request, enrollment response, an updated action sequence, an updated sequence ranking, information about the evaluation entity such as the enrollment status of the evaluation entity, or the like.

In some embodiments, the term "updated action sequence" refers to an action sequence that has been modified to reflect one or more changes. An updated action sequence, for example, may reflect a new or changed action status for one or more evaluation entities of an entity group. In some examples, an updated action sequence may be generated in response to selection of a selectable evaluation entity, an enrollment response, and/or the like.

In some embodiments, the term "updated sequence ranking" refers to a sequence ranking that has been modified for an updated action sequence. An updated sequence ranking, for example, may reflect a new or changed rank order applied to an action sequence. By way of example, a sequence ranking may be updated in response to a change in one or more of an enrollment request, enrollment response, causal metric-based impact score, casual risk-based impact score, entity-specific cost metric, sequence impact metric, causal net impact score, action status, action sequence, updated action sequence, selectable evaluation entity, and/or the like.

In some embodiments, the term "enrollment request" refers to a network message initiated by an interactive user interface. An enrollment request may include a network message provided from an interactive user interface and to an evaluation entity. An enrollment request may include one or more instructions and/or a request for an evaluation entity to enroll in a prediction-based action. An enrollment request, for example, may be sent to an evaluation entity to prompt the evaluation entity to enroll in a training program. In some examples, an enrollment request may prompt an enrollment response.

In some embodiments, the term "enrollment response" refers to a network message received by an interactive user interface. An enrollment response may include a network message provided to an interactive user interface from an evaluation entity. An enrollment response, for example, may include one or more instructions and/or a response from an evaluation entity with respect to enrolling in a prediction-based action. The response, for example, may be indicative of an acceptance or a refusal to enroll with a prediction-based action. In some examples, an enrollment response may be used to reflect whether an evaluation entity becomes enrolled or not with respect to a prediction-based action. A particular enrollment response may include a denial response and/or an approval response. In some examples, an interactive user interface may automatically update an action sequence and/or sequence ranking in response to an enrollment response.

In some embodiments, the term "denial response" refers to a type of enrollment response to an enrollment request. A denial response, for example, may reflect that an evaluation entity denied or was denied the option to enroll in a prediction-based action. In some examples, a denial response may be automatically generated in response to one or more conditions. For example, if an evaluation entity were to decline an enrollment request, a denial response may be generated in response. In another example, if an evaluation entity associated with a candidate prediction-based action were to decline an enrollment request, a plurality of denial responses may be generated with respect to other evaluation entities associated with the candidate prediction-based action in response.

In some embodiments, the term "approval response" refers to a type of enrollment response to an enrollment request. An approval response may reflect an approval of an evaluation entity to enroll in a prediction-based action. In some examples, an approval response may be automatically generated in response to one or more conditions. For example, if an evaluation entity were to accept an enrollment request, an approval response may be generated in response.

IV. OVERVIEW

Embodiments of the present disclosure present machine learning, causal inference, and probabilistic combinatorial techniques that improve computer-based impact forecasting and enable improved user interfaces for optimizing prediction-based actions. The efficacy of traditional approaches for impact forecasting are limited by a number of variables impacting a target variable and are unable to reliably generate complex, multi-metric, predictions that are interpretable to humans. Through a sequence of machine learning, causal inference, and probabilistic combinatorial techniques, the present disclosure improves upon traditional forecasting approaches by generating holistic impact scores that are interpretable and account for a plurality of disparate metrics over time. By doing so, candidate prediction-based actions may be holistically ranked based on their multi-factored forecasted impact on a target metric. This, in turn, allows for improved user interfaces that may display interpretable results and, based on user input, initiate prediction-based actions while continuously updating rankings to provide a live ranking feed to a user. Ultimately, the computer forecasting techniques of the present disclosure may be practically applied to improve the performance of traditional optimization techniques for optimizing the performance of prediction-based actions in any prediction domain with multiple, disparate performance metrics.

More particularity, some embodiments of the present disclosures provide parallel forecasting pipelines. Each forecasting pipeline may include a specific sequence of machine learning models, causal inference models, and probabilistic combinatorial techniques for generating interpretable outputs with respect to a type of impact measure, such as the risk-based and quality-based impact measures described herein. Each forecasting pipeline may be specially configured to receive metric-specific inputs and, through a series of connected models, generate a measure that is directly comparable with outputs of other forecasting pipelines. By modifying the outputs of each parallel forecasting pipeline, some embodiments of the present disclosure overcome various data integration challenges unique to computers and, more specifically, forecasting techniques with respect to a plurality of disparate, interrelated metrics. For example, without accounting for all interrelated elements, simplistic models ineffectively allocate resources by failing to account for the interactions between different metrics. Some embodiments of the present disclosure, directly address these technical challenges by providing end-to-end parallel pipelines to account for previously unknown risks. These pipelines may be iteratively applied over time (and/or based on user feedback) to provide a live feed of forecasted impacts as actions are taking place to enable the real time facilitation of optimized prediction-based actions.

In some embodiments, the machine learning, causal inference, and probabilistic combinatorial techniques are leveraged to enable improved interactive user interfaces. The improved interactive user interfaces provide a unique arrangement of selectable icons based on a live feed of interpretable forecasted impacts related to a plurality of different prediction-based actions. This, in turn, allows for informed user feedback with respect to the plurality of different prediction-based actions. This feedback may be leveraged by the interactive user interface to continuously update a live feed of ranked prediction-based actions. Moreover, in some embodiments, the feedback may be leveraged to automatically initiate one or more prediction-based actions. By way of example, the interactive user interface may trigger (e.g., by communicating one or more instructions, network messages, etc.) the performance of one or more prediction-based actions in response to user feedback and/or one or more predictive measures of the present disclosure.

Examples of technologically advantageous embodiments of the present disclosure include: (i) forecasting pipelines for generating holistic simulated impact measures with respect to a plurality of different prediction-based actions; (ii) improved user interfaces for presenting interpretable, among others. Other technical improvements and advantages may be realized by one of ordinary skill in the art.

V. EXAMPLE SYSTEM OPERATIONS

As indicated, various embodiments of the present disclosure make important technical contributions to computer forecasting and user interface technologies. In particular, systems and methods are disclosed herein that present parallel forecasting pipelines for generating interrelated predictive measures to improve the predictive accuracy of forecasting techniques in complex prediction domains. Unlike traditional forecasting techniques, the techniques of the present disclosure leverage multiple forecasting pipelines of connected machine learning, causal inference, and probabilistic combinatorial techniques to generate directly comparable prediction measures, which may improve forecasting accuracy in various search domains.

A. Causal Risk-Based Scoring

Figure 3:
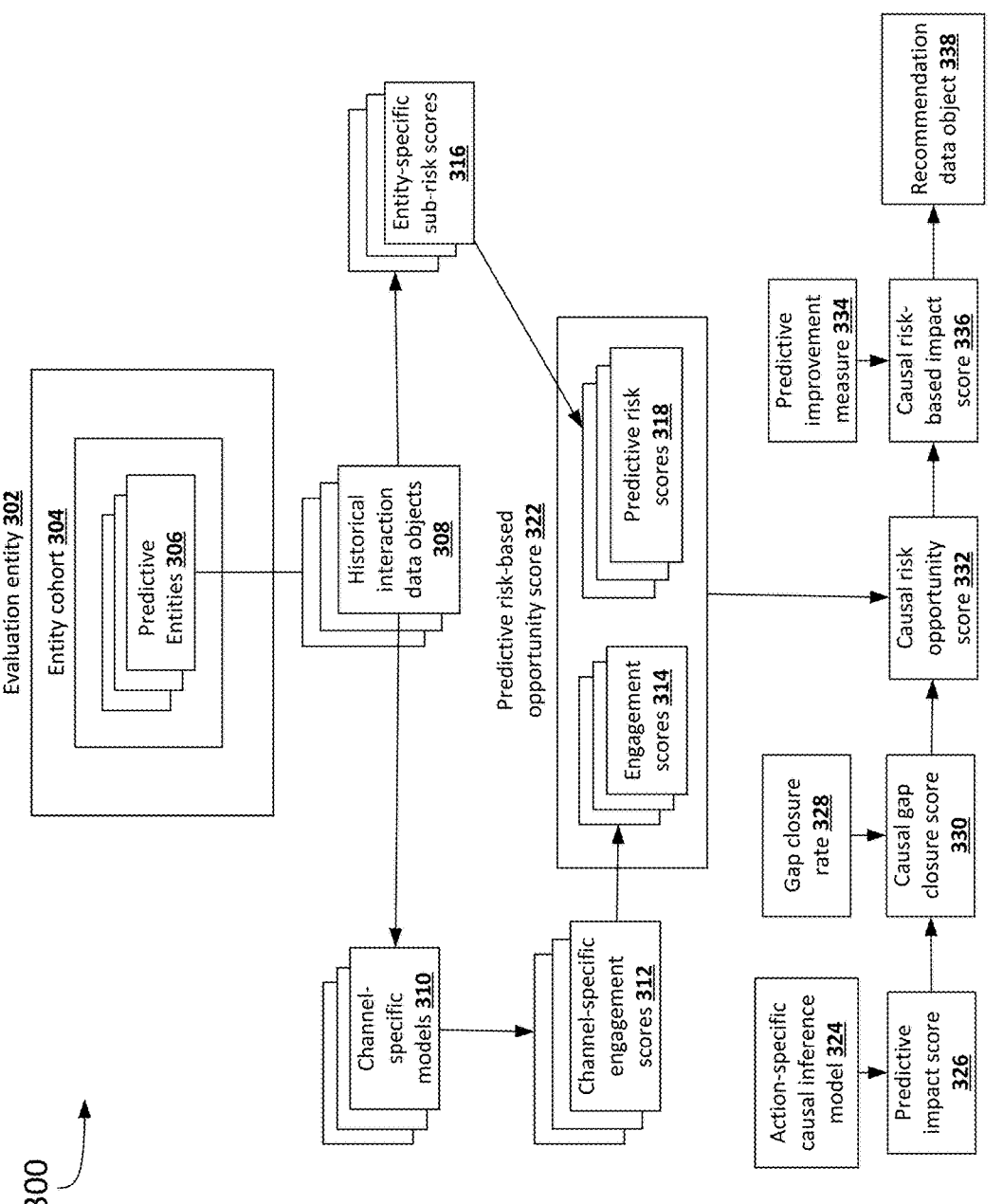
FIG. 3 is a dataflow diagram showing example data structures and modules for forecasting the risk-based opportunity with respect to a plurality of candidate prediction-based actions in accordance with some embodiments discussed herein.

FIG. 3 is a dataflow diagram 300 showing example data structures and modules for forecasting the risk-based opportunity with respect to a plurality of candidate prediction-based actions in accordance with some embodiments discussed herein. The dataflow diagram 300 depicts an intelligent ranking process in which a plurality of prediction-based actions is evaluated based on their predicted causal impact on an evaluation entity. The intelligent ranking process may leverage a plurality of machine learning- and causal modeling-based scores, that collectively account for a plurality of a future circumstances with respect to a prediction-based action, to forecast a future opportunity for each of a plurality of prediction-based actions. By doing so, recommendation data objects 338 for one or more of the plurality of prediction-based actions may be filtered, ranked, and provided to evaluation entities in a targeted manner.

In some embodiments, a predictive risk-based opportunity scores 322 is generated for an evaluation entity 302 based on (i) a plurality of engagement scores 314 and (ii) a plurality of predictive risk scores 318 respectively corresponding to a plurality of predictive entities 306 within an entity cohort 304 associated with the evaluation entity 302. For example, an engagement score of the plurality of engagement scores 314 that corresponds to a predictive entity of the plurality of predictive entities 306 may be selected from one or more channel-specific engagement scores 312 for the predictive entity. In some examples, each channel-specific engagement score of the one or more channel-specific engagement scores 312 corresponds to a channel of a multi-channel domain. For instance, a channel-specific engagement score of one or more channel-specific engagement scores 312 for a particular channel may be received from a channel-specific model based on a plurality of historical interaction data objects 308 corresponding to the predictive entity.

In some embodiments, an entity-specific engagement-risk score is generated for a predictive entity of the plurality of predictive entities 306 based on an engagement score and a predictive risk score corresponding to the predictive entity. The predictive risk-based opportunity scores 322 may be generated based on an aggregation of a plurality of entity-specific engagement-risk scores respectively corresponding to the plurality of predictive entities 306 within the entity cohort 304 associated with the evaluation entity 302.

In some embodiments, an entity-specific engagement-risk score is a component of a predictive risk-based opportunity score 322. In some examples, an entity-specific engagement-risk score may correspond to a particular predictive entity of the plurality of predictive entities 306 and a predictive risk-based opportunity score 322 may be an aggregation of a plurality of entity-specific engagement risk-scores for a cohort of entities associated with an evaluation entity 302. An entity-specific engagement-risk score may be based on one or more metrics corresponding to a respective predictive entity. For instance, an entity-specific engagement-risk score may be based on an engagement score of the plurality of engagement scores 314 and/or a predictive risk score of the plurality of predictive risk scores 318 for a predictive entity. For example, the entity-specific engagement-risk score may be a product of an engagement score and predictive risk score for a particular predictive entity. By way of example, an entity-specific engagement-risk score may be computed by multiplying an engagement score by a predictive risk score.

In some embodiments, an evaluation entity 302 is an entity for which one or more evaluations, assessments, analyses, or the like are made. For example, in a clinical context, an evaluation entity 302 may be a provider or healthcare provider. According to various embodiments of the present disclosure, the evaluation entity 302 may be associated with one or more evaluations, assessments, analyses, or the like. For example, an evaluation entity 302 may be assessed to determine various outcomes or impacts of enrolling the evaluation entity 302 in a program. In one example, an evaluation entity 302 is assessed to determine the change in revenue causally related to enrollment of the evaluation entity 302 in a program. In another example, an evaluation entity 302 is evaluated to determine a star change of a health plan causally related to the enrollment status of the evaluation entity 302 with respect to a program. In yet another example, a plurality of evaluation entities is evaluated to determine the financial impact causally related to enrollment of the plurality of evaluation entities in a program.

In some embodiments, a predictive entity of the plurality of predictive entities 306 is an entity for which one or more predictions, insights, or the like are derived. For example, in a clinical context, a predictive entity may be a member, client, or the like of a healthcare provider. According to various embodiments of the present disclosure, a predictive entity may be associated with one or more predictions, insights, forecasts, or the like. For example, one or more generated engagement scores of the plurality of engagement scores 314, predictive risk scores of the plurality of predictive risk scores 318, predictive risk-based opportunity scores, or the like may be derived from a predictive entity.

In some embodiments, an entity cohort 304 is a plurality of associated predictive entities 306. For example, in a clinical context, an entity cohort 304 may include a plurality of members, clients, or the like that are associated by common membership within an evaluation entity 302 (e.g., healthcare provider).

In some embodiments, an engagement score of the plurality of engagement scores 314 is a data entity that describes an interactivity of a predictive entity of the plurality of predictive entities 306. For instance, an engagement score may identify a likelihood that a predictive entity will interact with an evaluation entity 302 through at least one of one or more different interaction channels. In some examples, an engagement score may be selected and/or derived from a plurality of channel-specific engagement scores 312. For instance, an engagement score may include a minimum, maximum, average, and/or the like score from a plurality of channel-specific engagement scores 312. By way of example, for a given predictive entity, a channel-specific engagement score of the plurality of channel-specific engagement scores 312 may be generated for a plurality of different potential channels for engagement, the greatest (and/or lowest, average, etc.) of which may be selected as an engagement score for the predictive entity.

In some embodiments, a channel-specific engagement score of the plurality of channel-specific engagement scores 312 is a data entity that describes a likelihood of a predictive entity of the plurality of predictive entities 306 to interact with an evaluation entity 302 through a particular channel. A channel-specific engagement score, for example, may include an individual score that corresponds to a channel and a predictive entity. The individual score may include real value, a percentage, ratio, and/or any other value, type of value, or representation of a likelihood that a predictive entity may leverage a particular channel to interact with an evaluation entity 302 within a particular time interval.

In some embodiments, a channel-specific engagement score of the plurality of channel-specific engagement scores 312 is generated using a channel-specific model of the plurality of channel-specific models 310. A channel-specific model, for example, may be trained on historic interaction data associated with a predictive entity of the plurality of predictive entities 306 and/or a particular channel. In some examples, a different channel-specific model may be applied to a predictive entity's historic interaction data to generate an engagement score of the plurality of engagement scores 314 for each of the potential channels of engagement available for the predictive entity. For example, one machine learning model may be applied to generate a channel-specific engagement score associated with a first channel (e.g., an in-person meeting, etc.) while another machine learning model may be applied to generate a channel-specific engagement score associated with a second channel (e.g., a virtual meeting, etc.), and so on.

In some embodiments, a channel is a data entity that describes an engagement mechanism for facilitating an interaction between a predictive entity of the plurality of predictive entities 306 and an evaluation entity 302. A channel may include any means for communicating between the two entities. By way of example, a channel may include a virtual channel (e.g., a virtual meeting, etc.), a physical channel (e.g., an in-person meeting, etc.), an audio channel (e.g., a telephone call, etc.), a visitation channel (e.g., a home visit, etc.), a survey channel (e.g., a distributed survey) and/or the like. In some examples, a channel may depend on a prediction domain. For instance, for a clinical domain, a channel may include a virtual screening, an office visit, an emergency call line, an at home visit, a clinical survey and/or the like.

In some embodiments, a channel-specific model of the plurality of channel-specific models 310 is a data entity that describes parameters, hyper-parameters, and/or defined operations of a rules-based and/or machine learning model (e.g., model including at least one of one or more rule-based layers, one or more layers that depend on trained parameters, coefficients, and/or the like). A channel-specific model may include one or more machine learning models configured, trained (e.g., jointly, separately, etc.), and/or the like to generate a channel-specific engagement score of the plurality of channel-specific engagement scores 312 for a predictive entity of the plurality of predictive entities 306. A channel-specific model may include one or more of any type of machine learning model including one or more supervised, unsupervised, semi-supervised, reinforcement learning models, and/or the like. In some examples, a channel-specific model may include multiple models configured to perform one or more different stages of a prediction process.

In some embodiments, a channel-specific model of the plurality of channel-specific model 310 is trained using one or more supervised training techniques. In some examples, a channel-specific model may be trained, using the supervised training techniques, to generate a channel-specific engagement score of the plurality of channel-specific engagement scores 312 based on one or more historical interaction data objects 308 associated with a predictive entity of the plurality of predictive entities 306. By way of example a channel-specific model may be trained using labeled historical interaction data description of a plurality of historical interaction data objects 308 and one or more labels indicative of an occurrence of an interaction through a particular channel. By way of example, a channel-specific model may include a supervised machine learning regression model, such as a linear regression, logistic regression, and/or the like, that is previously trained (and/or continuously trained) to generate a channel-specific engagement score for a predictive entity based on one or more historical interaction data objects 308.

In some embodiments, a historical interaction data object of the plurality of historical interaction data objects 308 is a data entity that describes a previous interaction between a predictive entity of the plurality of predictive entities 306 and one or more evaluation entities. A historical interaction data object, for example, may include a data record that is descriptive of a virtual meeting, a physical channel, an audio channel, a visitation channel, and/or the like.

In some embodiments, a predictive risk score of the plurality of predictive risk scores 318 is a data entity that describes an undocumented risk gap for a predictive entity of the plurality of predictive entities 306. For example, a predictive risk score may describe a potential gap in a predictive entity's documentation based on a predictive entity's likelihood of being associated with one or more of a plurality of conditions. The plurality of conditions may depend on a prediction domain. For example, in a clinical context, the plurality of conditions may be defined by a set of hierarchical condition category (HCC) codes.

A predictive risk score of the plurality of predictive risk scores 318 may include an aggregate of a plurality of entity-specific sub-risk scores 316 respectively corresponding to each of a plurality of defined conditions within a prediction domain. For instance, a predictive risk score may include summation of the plurality of entity-specific sub-risk scores 316. In some embodiments, a predictive risk score is a static and/or dynamic value, range of values, percentage, real number, ratio, numeric, and/or the like. In some examples, a predictive risk score may be a binary indicator such as 1 or 0, true or false, or the like corresponding to an HCC code. By way of example, a predictive risk score may be 0, 1, 10, 99, or any other value.

In some embodiments, an entity-specific sub-risk score of the plurality of entity-specific sub-risk scores 316 is a component of a predictive risk score of the plurality of predictive risk scores 318. For example, an entity-specific sub-risk score may describe a likelihood that a particular predictive entity of the plurality of predictive entities 306 is associated with a particular condition. For example, in a clinical context, an entity-specific sub-risk score may be an indicator that a predictive entity meets clinical criterial set by a clinical professional, that either define the requirements for diagnosis or strongly suggest the presence of a disease within a Hierarchical Condition Category (HCC). An entity-specific sub-risk score 316 may include a percentage, ratio, and/or the like. In addition, or alternatively, an entity-specific sub-risk score may include a binary indicator.

In some embodiments, a hierarchical condition set is a defined set of conditions for a prediction domain. A hierarchical condition set may include any of a number of different conditions defined for a particular prediction domain. As one example, a hierarchical condition set may include an HCC dataset.

In some embodiments, a predictive impact score 326 of a prediction-based action on the evaluation entity 302 is generated using an action-specific causal inference model 324. In some examples, the action-specific causal inference model 324 may be a directed acyclic graph that includes a plurality of nodes and each of the plurality of nodes may correspond to a causal feature associated with a prediction-based action. In some examples, one of the plurality of nodes may be indicative of an enrollment status of the evaluation entity with a training program and the predictive impact score may be indicative of a predicted causal effect of the enrollment status of the evaluation entity.

In some embodiments, a predictive impact score 326 is a data entity that describes a causal impact of a prediction-based action on a gap closure rate 328. In some examples, a predictive impact score 326 may include a predictive output from an action-specific causal inference model 324. For example, a predictive impact score 326 may be a causal change in assessed conditions per risk gap. In some examples, the predictive impact score 326 may be used in combination with a gap closure rate 328 to compute a causal gap closure score 330. For example, in a clinical context, the predictive impact score 326 may represent a causal change in assessed conditions per gap which may be used with a provider diagnosis rate to compute a causal change in diagnosed conditions per gap.

In some embodiments, a predictive impact score 326 is a static and/or dynamic value, range of values, percentage, real number, ratio, numeric, and/or the like. By way of example, a predictive impact score 326 may be value such as 0.02, 0.06, 0.09, or any other value.

In some embodiments, a prediction-based action is an action that may be selected for performance response to one or more predictions. A prediction-based action, for example, may be intelligently selected, using some of the techniques of the present disclosure, to achieve a predictive impact score 326 (and/or a measure thereof). A prediction-based action may depend on the prediction domain. For example, in a clinical context, a prediction-based action may be an enrollment in a clinical program designed to improve a detection of conditions within a population of members. By way of example, in response to the selection of a prediction-based action, an evaluation entity 302, such as a healthcare provider, may be enrolled in a clinical program to improve the detection of one or more conditions. In some examples, a predictive impact score 326 may identify a positive impact of a healthcare provider being enrolled in a clinical program and/or a negative impact of a healthcare provider not being enrolled in the clinical program.

In some embodiments, a causal gap closure score 330 is generated for the evaluation entity 302 based on the predictive impact score 326 and a gap closure rate 328 associated with the evaluation entity 302. In some examples, the causal gap closure score may be a product of the predictive impact score 326 and the gap closure rate 328.

In some embodiments, a causal gap closure score 330 is a data entity that describes a predicted rate of change of a predictive risk score of the plurality of predictive risk scores 318 with respect to an evaluation entity 302 in response to a prediction-based action. A causal gap closure score 330, for example, may identify a causal rate of change, in response to a prediction-based action, to a risk gap within an entity cohort 304 associated with an evaluation entity 302. As an example, in a clinical context, a causal gap closure score 330 may identify a causal change in a rate of diagnosed conditions by an evaluation entity 302.

In some embodiments, a causal gap closure score 330 is based on a predictive impact score 326 and a gap closure rate 328 associated with an evaluation entity 302. A causal gap closure score 330 may be a static and/or dynamic value, range of values, percentage, real number, ratio, numeric, and/or the like. By way of example, a causal gap closure score 330 may be a value, such as 0.0882, 0.0194, 0.0594, or any other value.

In some embodiments, a gap closure rate 328 is a data entity that describes a condition identification rate of an evaluation entity 302. For example, in a clinical context, a gap closure rate 328 may be an evaluation entity's 302 diagnosis rate. In some examples, the gap closure rate 328 may be determined based on historic entity interaction data, such as a plurality of historical interaction data objects 308 corresponding to an evaluation entity 302. In addition, or alternatively, a gap closure rate 328 may be imputed for an evaluation entity 302 based one or more entity attributes, one or more entity cohort 304 characteristics, one or more related evaluation entities, and/or the like using one or more imputation models. By way of example, in the event that an evaluation entity 302 is not associated with a threshold number of historic entity interaction data objects, a mean, median, and/or the like gap closure rate 328 for a plurality of evaluation entities may be imputed as the evaluation entity's 302 gap closure rate 328.

In some embodiments, a gap closure rate 328 is a static and/or dynamic value, range of values, percentage, real number, ratio, numeric, and/or the like. By way of example, a gap closure rate 328 may be a value such as 0.97, 0.98, 0.99, or any other value.

In some embodiments, a causal risk opportunity scores 332 is generated based on the causal gap closure score 330 and the predictive risk-based opportunity score 322.

In some embodiments, a causal risk opportunity scores 332 is a data entity that describes a predicted impact to a predictive risk score 318 with respect to an evaluation entity 302 in response to a prediction-based action. A causal risk opportunity scores 332, for example, may identify a causal impact of a prediction-based action on a risk gap within an entity cohort 304 associated with an evaluation entity 302. As an example, in a clinical context, a causal risk opportunity scores 332 may identify a predicted change in number of diagnosed conditions by an evaluation entity 302.

In some embodiments, a causal risk opportunity scores 332 is based on a causal gap closure score 330 and a predictive risk-based opportunity score 322 for an evaluation entity 302. A causal risk opportunity scores 332 may be a static and/or dynamic value, range of values, percentage, real number, ratio, numeric, and/or the like. By way of example, a causal risk opportunity scores 332 may be a value such as 3.5302, 5.2735, 9.0116, or any other value.

In some embodiments, a causal risk-based impact score 336 is generated for the prediction-based action and the evaluation entity 302 based on the causal risk opportunity score 332 and a predictive improvement measure 334.

In some embodiments, a causal risk-based impact score 336 is a data entity that describes a predicted impact of a prediction-based action on an evaluation entity 302. A causal risk-based impact score 336, for example, may correspond to one of a plurality of potential prediction-based actions for an evaluation entity 302. In some examples, the causal risk-based impact score 336 may measure a predicted impact of a prediction-based action in one or more action-agnostic units of measurement. In this manner, a causal risk-based impact score 336 for a particular prediction-based action may be directly compared against causal risk-based impact scores 336 for each of plurality of different causal risk-based impact scores 336. The action-agnostic unit of measurement may depend on the prediction domain. In some examples, in a clinical context, the causal risk-based impact score 336 measures a predicted impact of a prediction-based action in terms of a predicted change in revenue.

In some embodiments, a causal risk-based impact score 336 is generated based on a causal risk opportunity score 332 and a predictive improvement measure 334. A causal risk-based impact score 336 may be a static and/or dynamic value, range of values, percentage, real number, ratio, numeric, and/or the like. By way of example, a causal risk-based impact score 336 may be a value such as 7,060.40, 10,547.00 18,023.00, or any other value.

In some embodiments, a predictive improvement measure 334 is an action-agnostic measure of impact with respect to an evaluation entity 302. A predictive improvement measure 334, for example, may include a unit of measurement that is agnostic to a prediction-based action. The predictive improvement measure 334 may be leveraged to transform an action-based measures of impact to comparable units of measurements across different potential prediction-based actions within a prediction domain. By way of example, in a clinical context, a predictive improvement measure 334 may include an average revenue per diagnosis for a provider. In such a case, a predictive improvement measure 334 may be a predicted revenue amount that a provider receives in response to making a new diagnosis associated with a health condition of a client. The predictive improvement measure 334 may be used in combination with a causal risk opportunity score 332 to generate a causal risk-based impact score 336 based on a prediction-based action that may be comparable across each of a plurality of different, unrelated prediction-based actions within a prediction domain. For example, in a clinical context, a predictive improvement measure 334 may be an average revenue per diagnosis which may be used in combination with a causal opportunity score to generate a causal risk revenue change associated with a particular enrollment status of an evaluation entity 302 in a clinical program.

In some embodiments, a predictive improvement measure 334 is a static and/or dynamic value, range of values, percentage, real number, ratio, numeric, and/or the like. By way of example, a predictive improvement measure 334 may be a value such as 2000, 1000, 500, or any other value.

In some embodiments, a recommendation data object 338 for the prediction-based action and reflective of one or more ranked evaluation entities that are ranked according to one or more corresponding causal risk-based impact scores 336 is provided based on the causal risk-based impact score 336.

In some embodiments, a recommendation data object 338 is a data entity that describes one or more prediction-based actions tailored to a goal of a user. For example, a recommendation data object 338 may be indicative (e.g., include a context identifier, textual description, graphical elements, etc.) of a context-specific data entity that is associated with one or more actions a user may take. By way of example, a recommendation data object 338 may include one or more recommendation rank scores, causal net impact scores, causal risk-based impact scores, causal quality-based impact scores, data descriptive of prediction-based actions, evaluation entities, programs, or the like usable by a user (e.g., a training program enrollment team in a clinical context). In one example, in a clinical context, a recommendation data object 338 may be directed to a healthcare program (e.g., a health insurance plan, a Medicare plan, etc.). In some examples, a recommendation data object 338 may correspond to a particular program recommendation (e.g., insurance training program, healthcare plan recommendation, health insurance plan recommendation, Medicare plan recommendation, etc.). In some examples, a recommendation data object 338 may correspond to descriptive data associated with one or more evaluation entities (e.g., healthcare providers) related to a particular program recommendation.

In this manner, a program may be recommended for an evaluation entity 302 based on a predicted causal impact of the program on the evaluation entity 302. As described herein, the impact may be measured based on a unique combination of machine learning-based and causal-based features, including a predictive impact score generated using an action-specific causal inference model. An example action-specific causal inference model 324 is described in further detail with reference to FIG. 4.

Figure 4:
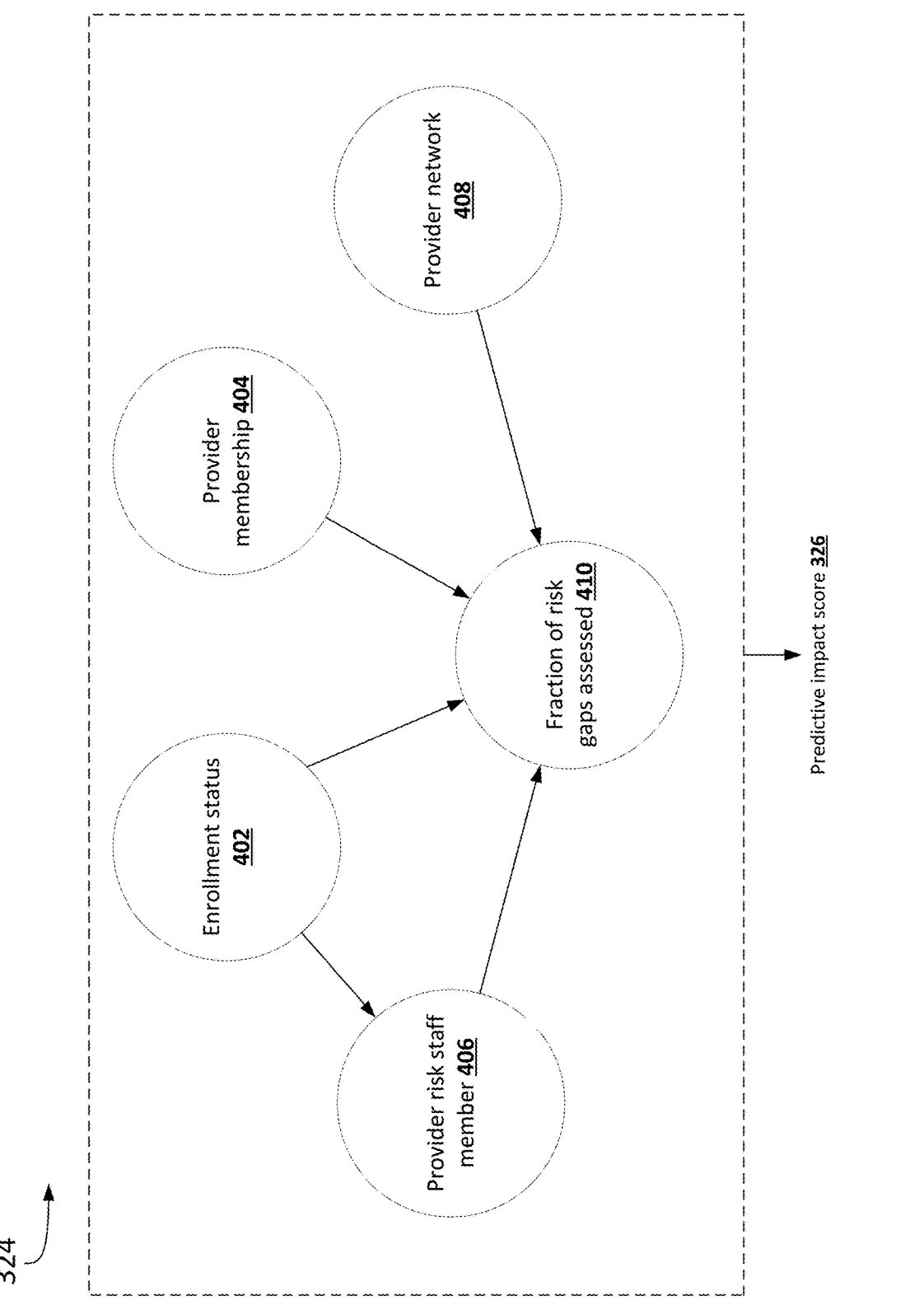
FIG. 4 is an example architecture for use within an example action-specific causal inference model in accordance with some embodiments discussed herein.

FIG. 4 is an example architecture for use within an example action-specific causal inference model 324 in accordance with some embodiments discussed herein. The example architecture depicts an action-specific causal inference model 324 for use within a clinical context. In some embodiments, the action-specific causal inference model 324 includes a plurality of nodes. For example, the action-specific causal inference model 324 may include a plurality of nodes that describe associated factors including enrollment status 402, provider membership 404, provider risk staff member 406, provider network 408, and fraction of risk gaps assessed 410, and/or the like. The plurality of nodes may be connected along unidirectional edges representative of causal relationships between the nodes. In some embodiments, the action-specific causal inference model 324 is configured to generate a predictive impact score 326.

In some embodiments, an action-specific causal inference model 324 is a predictive model constructed to compute a causal change in a metric associated with an evaluation entity attributable to a given action (e.g., enrollment status 402). For example, in a clinical context, the evaluation entity related metric may be a change in assessed medical conditions per risk gap in response to a given entity being enrolled in a program. In some examples, an action-specific causal inference model 324 may be configured to predict by how much an evaluation entity may change its ability to assess health conditions associated with predictive entities as a result of enrolling in a training program (e.g., predictive impact score 326).

In some embodiments, an action-specific causal inference model 324 includes a directed acyclic graph with a plurality of nodes and edges defining a plurality of factors and their relationships to a diagnosis of a condition. For example, a directed acyclic graph may be constructed using one or more subject matter experts based on one or more causal relationships expressed in a prediction domain. In some examples, a directed acyclic graph may include nodes that represent factors with an historical, observed, and/or predicted impact on a metric and unidirectional edges between nodes representative of causal relationships between factors. In some examples, a prediction-based action may be represented within a directed acyclic graph by a Boolean node (e.g., enrollment status 402). By way of example, in a clinical context, the Boolean node (e.g., enrollment status 402) may be switched on to represent an enrollment in a clinical program and switched off to represent an unenrollment in the clinical program.

In this manner, causal features may be evaluated with respect to a program for an evaluation entity 302 based on a predicted causal impact of the program on the evaluation entity 302. As described herein, causal features may be combined, using some of the techniques of the present disclosure, with machine learning-based features to generate predictive insights tailored to an evaluation entity. An example of a plurality of predictive features is described in further detail with reference to FIG. 5.

Figure 5:
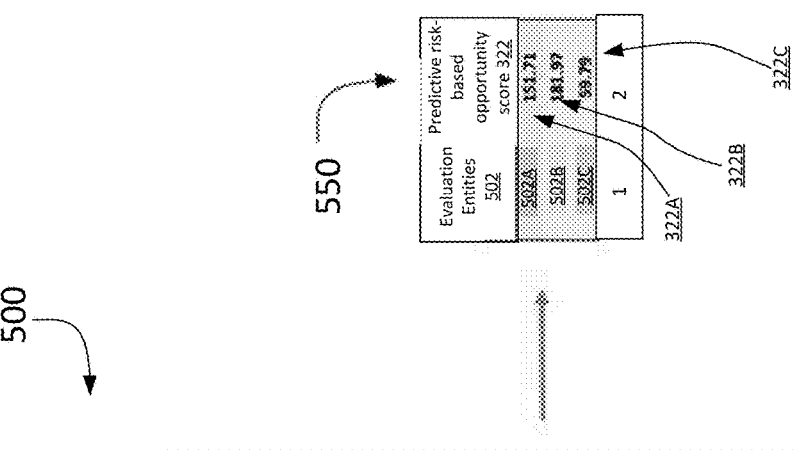
FIG. 5 is an operational example of a risk-based predictive data structure of a plurality of risk-based predictive features in accordance with some embodiments discussed herein.

FIG. 5 is an operational example of a risk-based predictive data structure 500 of a plurality of risk-based predictive features in accordance with some embodiments discussed herein. As depicted, the risk-based predictive data structure 500 may include one or more predictive features for each of a plurality of predictive entities associated with one more evaluation entities.

For example, the risk-based predictive data structure 500 may include a plurality of evaluation entities 502A-C (e.g., a plurality of healthcare providers) that are each associated with a subset of a plurality of predictive entities 504A-W (e.g., members, clients, or the like). For example, evaluation entity 502A may be associated with a subset of predictive entities 504A-H, evaluation entity 502B may be associated with a subset of predictive entities 504I-P, and evaluation entity 502C may be associated with a subset of predictive entities 504Q-W. By way of example, the plurality of predictive entities 504A-W may each be associated with a respective entity cohort. The predictive entities 504A-H may be included in a first entity cohort, the predictive entities 504I-P may be included in a second entity cohort, and the predictive entities 504Q-W may be included in a third entity cohort.

The risk-based predictive data structure 500 may include a plurality of machine learning-based and causal inference-based predictive features. For instance, the risk-based predictive data structure 500 may include a plurality of entity-specific sub-risk scores 316A-C (e.g., n number of entity-specific sub-risk scores 316 (e.g., n HCC conditions)) for each of the plurality of predictive entities 504A-W. As shown, the entity-specific sub-risk scores 316A-C may include binary indicators (e.g., 1 or 0) indicative of whether the respective predictive entity of the plurality of predictive entities 504A-W meets criteria associated with the respective entity-specific sub-risk score. In some examples, the risk-based predictive data structure 500 may include a plurality of predictive risk scores 318 for each of the plurality of predictive entities 504A-W. A predictive risk score of the plurality of predictive risk scores 318 may include an aggregation of the entity-specific sub-risk scores 316A-C for each predictive entity.

In addition, or alternatively, the risk-based predictive data structure 500 may include a plurality of engagement scores 314 for each of the plurality of predictive entities 504A-W. The risk-based predictive data structure 500 may include an entity-specific engagement risk-score of the plurality of entity-specific engagement-risk scores 506 (e.g., opportunity scores) for each of the plurality of predictive entities 504A-W. Each entity-specific engagement-risk score may be based on a respective predictive risk score of the plurality of predictive risk scores 318 and engagement score of the plurality of engagement scores 314.

In some embodiments, the risk-based predictive data structure 500 may be reduced to an opportunity predictive data structure 550. The opportunity predictive data structure 550, for example, may include a single instance of each evaluation entity of the plurality of evaluation entities 502A-C from the risk-based predictive data structure 500 and a corresponding predictive risk-based opportunity scores 322A-C each associated with a respective evaluation entity 502A-C. The predictive risk-based opportunity scores 322A-C may be the aggregates of the entity-specific engagement-risk scores 506 associated with each evaluation entity 502A-C. For example, with respect to the opportunity predictive data structure 550, the evaluation entity 502A may be associated with a predictive risk-based opportunity score 322A (e.g., 151.71) which is the aggregate (e.g., sum) of the entity-specific engagement-risk scores 506 of the risk-based predictive data structure 500 associated with evaluation entity 502A (i.e., 0.28, 46.20, 6.27, 9.18, 0.99, 27.20, 23.43, 38.16).

As described herein, the plurality of predictive features depicted within the risk-based predictive data structure 500 may be leveraged to generate a causal risk-based impact score (e.g., causal risk-based impact score 336) for each of a plurality of prediction-based actions. These causal risk-based impact scores may be combined with predictive improvement measures (e.g., predictive improvement measure 334) to forecast a relative predictive impact of a plurality of prediction-based actions on an evaluation entity. An example of a plurality of causal risk-based impact scores is described in further detail with reference to FIG. 6.

Figure 6:
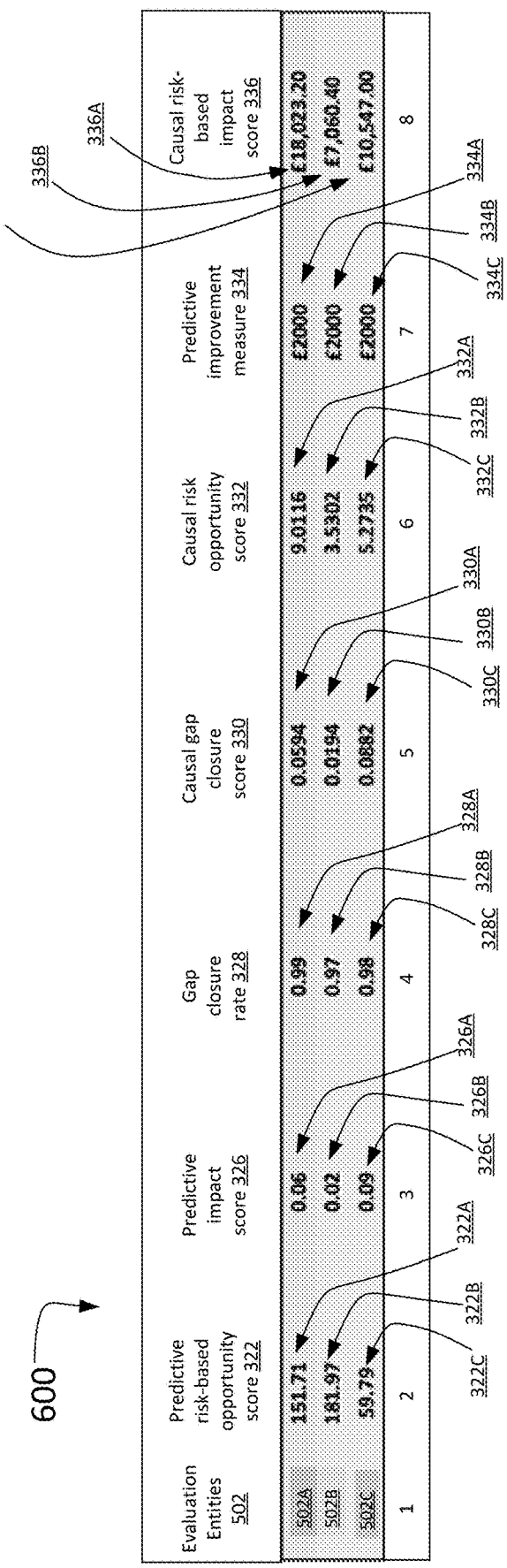
FIG. 6 is an operational example of a risk-based impact data structure of a plurality of causal risk-based impact scores in accordance with some embodiments discussed herein.

FIG. 6 is an operational example of a risk-based impact data structure 600 of a plurality of causal risk-based impact scores in accordance with some embodiments discussed herein. As depicted, the risk-based impact data structure 600 may include a plurality of evaluation entities 502A-C (e.g., healthcare providers, etc.) and a plurality of predictive features, including the predictive risk-based opportunity scores 322A-C, for each of the evaluation entities 502A-C. In addition, or alternatively, the plurality of predictive features may include predictive impact scores 326A-C (e.g., causal increases in assessed conditions per gap), gap closure rates 328A-C (e.g., provider diagnosis rates), causal gap closure scores 330A-C (e.g., causal increases in diagnosed conditions per gap), causal risk opportunity scores 332A-C (e.g., causal opportunity scores), predictive improvement measures 334A-C (e.g., average revenue per diagnosis), causal risk-based impact scores 336A-C (e.g., causal revenue increases), and/or the like.

In some embodiments, a causal gap closure score 330 is based on a respective predictive impact score 326 and gap closure rate 328. For example, the causal gap closure score 330A associated with evaluation entity 502A (i.e., 0.0594) is the product of the respective predictive impact score 326A (i.e., 0.06) and gap closure rate 328A (i.e., 0.99). In some embodiments, a causal risk opportunity scores 332 is based on a respective predictive risk-based opportunity score 322 and causal gap closure score 330. For example, the causal risk opportunity score 332A associated with evaluation entity 502A (i.e., 9.0116) is the product of the respective predictive risk-based opportunity score 322A (i.e., 151.71) and causal gap closure score 330A (i.e., 0.0594). In some embodiments, a causal risk-based impact score 336 is based on a respective causal risk opportunity score 332 and predictive improvement measure 334. For example, the causal risk-based impact score 336A associated with evaluation entity 502A (i.e., 18,023.20) is the product of the respective causal risk opportunity score 332A (i.e., 9.0116) and predictive improvement measure 334A (i.e., 2000).

B. Causal Quality-Based Scoring

Figure 7:
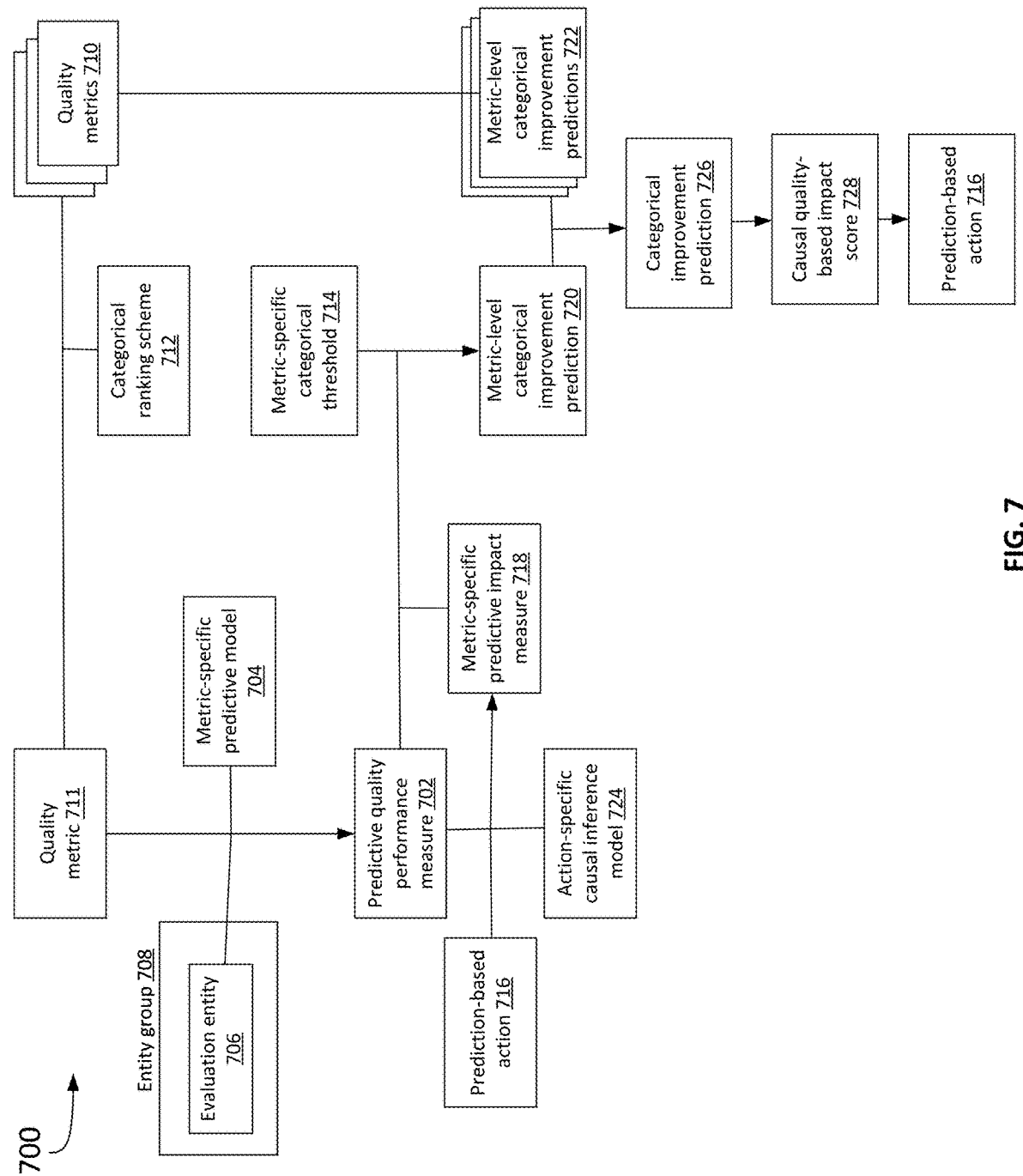
FIG. 7 is a dataflow diagram showing example data structures and modules for forecasting the quality-based opportunity with respect to a plurality of candidate prediction-based actions in accordance with some embodiments discussed herein.

FIG. 7 is a dataflow diagram 700 showing example data structures and modules for forecasting the quality-based opportunity with respect to a plurality of candidate prediction-based actions in accordance with some embodiments discussed herein. The dataflow diagram 700 depicts an intelligent ranking process in which a plurality of prediction-based actions is evaluated based on their predicted causal impact on an entity group 708. The intelligent ranking process may leverage a plurality of machine-learning and causal modeling-based scores, that collectively account for a plurality of a future circumstances with respect to a prediction-based action 716, to forecast a future opportunity for each of a plurality of prediction-based actions. By doing so, a prediction-based action may be filtered, ranked, and initiated for evaluation entities within an entity group 708.

In some embodiments, a predictive quality performance measure 702 is generated using a metric-specific predictive model 704 based on (i) an evaluation entity 706 of a plurality of evaluation entities within an entity group 708 and (ii) a quality metric 711 of a plurality of quality metrics 710 corresponding to a categorical ranking scheme 712 for the entity group 708.

In some embodiments, a metric-specific predictive model 704 is a predictive model configured to forecast a predictive quality performance measure 702 for a particular quality metric 711 given. A metric-specific predictive model 704 may be tailored to the particular metric. For example, a different metric-specific predictive model 704 may be accessed, trained, and/or leveraged to generate a predictive quality performance measure 702 for each of a plurality of quality metrics 710.

In some examples, a metric-specific predictive model 704 may include one of a plurality of model types. A first model type, for example, may include a metric-specific performance forecasting model that is configured to generate a predictive quality performance measure 702 for a member-based quality metric 711. A second model type may include a metric-specific performance simulation model that is configured to generate a predictive quality performance measure 702 for a survey-based quality metric 711.

In some embodiments a metric-specific performance forecasting model is a data entity that describes parameters, hyper-parameters, and/or defined operations of a rules-based and/or machine learning model (e.g., model including at least one of one or more rule-based layers, one or more layers that depend on trained parameters, coefficients, and/or the like). A metric-specific performance forecasting model, for example, may include one or more machine learning models configured, trained (e.g., jointly, separately, etc.) to forecast a member-based quality metric 711. A metric-specific performance forecasting model may include one or more of any type of machine learning model including one or more supervised, unsupervised, semi-supervised, reinforcement learning models, and/or the like. In some examples, a metric-specific performance forecasting model may include multiple models configured to perform one or more different stages of a prediction process.

In some embodiments, a metric-specific performance forecasting model is a time-series neural network, such as one or more autoregressive neural networks, and/or the like. By way of example, in a clinical context, a metric-specific performance forecasting model may be a time-series neural network model trained to predict the fraction of an evaluation entity's total quality gaps that will be closed in a given clinical year for a particular quality metric 711. A metric-specific performance forecasting model, for example, may be trained, using one or more supervised training techniques (e.g., standard gradient descent, backpropagation of errors, etc.) based on a plurality of historical interaction data objects and historical quality measures associated with a plurality of evaluation entities. In some examples, the training data for each of a plurality of metric-specific performance forecasting models may be tailored to a specific quality metric 711. For instance, the training data for a metric-specific performance forecasting model corresponding to a particular quality metric 711 may include a plurality of historical interaction data objects and a plurality of historical quality measures (e.g., ground truths) for the particular quality metric 711.

In some embodiments, a metric-specific performance simulation model is a hybrid model configured to forecast a survey-based quality metric 711. A metric-specific performance simulation model, for example, may include one or more of a proxy survey, eligibility prediction sub-model, response likelihood prediction sub-model, and/or response prediction sub-model. By way of example, a metric-specific performance simulation model may predict a survey-based quality metric 711 for an evaluation entity 706 with respect to a time interval (e.g., over a clinical year).

In some embodiments, a proxy survey is a survey configured to replicate a target survey. In some examples, a proxy survey (e.g., Starmaker, etc.), may be used in combination with a metric-specific performance simulation model where the proxy survey is configured to simulate the constituent questions of a target survey associated with a survey-based quality metric 711 (e.g., CAHPS, HOS, etc.). In some examples, the proxy survey may be distributed to a plurality of predictive entities associated with an entity group 708. The responses to the proxy survey may be used in combination with historic interaction data objects associated with the predictive entities to simulate the outcome of the target surveys (e.g., CAHPS, HOS, etc.) being answered by the same predictive entities.

In some embodiments, an eligibility prediction sub-model is a data entity that describes parameters, hyper-parameters, and/or defined operations of a rules-based and/or machine learning model (e.g., model including at least one of one or more rule-based layers, one or more layers that depend on trained parameters, coefficients, and/or the like). An eligibility prediction sub-model, for example, may be a rules-based logic model configured to define whether a predictive entity is eligible for a respective topic/condition outlined by a survey question (e.g., a proxy survey question). In some examples, an eligibility prediction sub-model may generate a static and/or dynamic value, range of values, percentage, real number, ratio, numeric, categorical variable, binary indicator such as 1 or 0, true or false, yes or no, and/or the like.

In some embodiments, a response likelihood prediction sub-model is a data entity that describes parameters, hyper-parameters, and/or defined operations of a rules-based and/or machine learning model (e.g., model including at least one of one or more rule-based layers, one or more layers that depend on trained parameters, coefficients, and/or the like). A response likelihood prediction sub-model, for example, may include one or more machine learning models configured, trained (e.g., jointly, separately, etc.) to forecast a likelihood that an evaluation entity 706 will complete a survey. A response likelihood prediction sub-model may include one or more of any type of machine learning model including one or more supervised, unsupervised, semi-supervised, reinforcement learning models, and/or the like. In some examples, a response likelihood prediction sub-model may include multiple models configured to perform one or more different stages of a prediction process.

In some embodiments, a response likelihood prediction sub-model is trained using one or more supervised training techniques. In some examples, response likelihood prediction sub-model may be trained, using the supervised training techniques, to generate a predictive entity's survey response likelihood given a question of a survey (e.g., CAHPS, HOS, etc.) based on one or more historical interaction data objects associated with a predictive entity. By way of example, a response likelihood prediction sub-model may be trained using labeled predictive entity data descriptive of a plurality of predictive entities and one or more labels each indicative of an occurrence of an interaction with a historical survey question. By way of example, a response likelihood prediction sub-model may include a supervised machine learning regression model, such as a linear regression, logistic regression, and/or the like, that is previously trained (and/or continuously trained) to generate a response likelihood prediction for a predictive entity based on one or more features (e.g., extracted from health records in a clinical context) of the predictive entity.

In some embodiments, a survey response likelihood is a data entity that describes a forecasted probability that a predictive entity will respond to a given question of a survey. In some examples, a survey response likelihood is used in combination with an engagement score to generate a predictive quality performance measure 702. In some embodiments, a survey response likelihood may be a static and/or dynamic value, range of values, percentage, real number, ratio, numeric, binary indicator, categorical variable, and/or the like. By way of example, a survey response likelihood may be 0.33, 0.66, 1, or any other value.

In some embodiments, a response prediction sub-model is a data entity that describes parameters, hyper-parameters, and/or defined operations of a rules-based and/or machine learning model (e.g., model including at least one of one or more rule-based layers, one or more layers that depend on trained parameters, coefficients, and/or the like). A response prediction sub-model, for example, may include one or more rule-based or machine learning models configured, trained (e.g., jointly, separately, etc.) to generate a predicted survey response for a predictive entity given a survey question. A response prediction sub-model may include one or more of any type of machine learning model including one or more supervised, unsupervised, semi-supervised, reinforcement learning models, and/or the like. In some examples, a response prediction sub-model may include multiple models configured to perform one or more different stages of a prediction process.

In some embodiments, a response prediction sub-model is trained using one or more supervised training techniques. In some examples, response prediction sub-model may be trained, using the supervised training techniques, to generate a predicted survey response given a question of a survey (e.g., CAHPS, HOS, etc.) based on one or more historical interaction data objects associated with a predictive entity. By way of example, a response prediction sub-model may be trained using labeled predictive entity data descriptive of a plurality of predictive entities and one or more labels each indicative of a historical response to a historical survey question. By way of example, a response prediction sub-model may include a supervised machine learning regression model, such as a linear regression, logistic regression, and/or the like, that is previously trained (and/or continuously trained) to generate a response prediction for a predictive entity based on one or more features (e.g., extracted from health records in a clinical context) of the predictive entity. In some examples, the response prediction sub-model may be trained using one or more proxy survey responses to explicitly predict what the survey response would be if a particular predictive entity was contacted and responded.

In some embodiments, a predictive quality performance measure 702 is a predictive measure of an evaluation entity's performance with respect to a quality metric 711. A predictive quality performance measure 702, for example, may represent an expected, unmodified performance of an evaluation entity 706 with respect to a quality metric 711 without the performance of a prediction-based action 716. By way of example, in a clinical domain, a predictive quality performance measure 702 may include a predicted quality gap closure fraction representing a predicted percentage of quality gaps accounted for by a quality metric 711 that are expected to be closed by an evaluation entity 706 over a clinical year. A predictive quality performance measure 702 may be generated for any type of quality metric 711 using a metric-specific predictive model 704 tailored to the particular quality metric 711.

In some embodiments, a predictive quality performance measure 702 is a static and/or dynamic value, range of values, percentage, real number, ratio, numeric, and/or the like. By way of example, a predictive quality performance measure 702 may be a value such as 0.68, 0.98, 0.78, or any other value.

In some embodiments, an entity group 708 is a plurality of associated evaluation entities. By way of example, in a clinical context, an entity group 708 may include a plurality of evaluation entities that are associated by common membership within a healthcare plan (e.g., a healthcare plan managed by an insurer).

In some embodiments, a quality metric 711 is a type of quality for evaluating an entity group 708. For example, a categorical ranking scheme 712 may define a plurality of quality metrics 710 that each evaluate a particular aspect of an entity group 708. The plurality of quality metrics 710 may be collectively used, in accordance with the categorical ranking scheme 712, to assign a specific categorical ranking to an entity group 708. A particular quality metric 711 may include a member-based quality metric 711 and/or a survey-based quality metric 711.

In some embodiments, a member-based quality metric 711 is a type of quality metric 711 for evaluating an interaction between one or more predictive entities and an associated evaluation entity 706. By way of example, in a clinical context, a member-based quality metric 711 may be colorectal cancer screening, diabetes care, eye exam care, cardiovascular care, cholesterol screening, or the like. Each predictive entity associated with an evaluation entity 706 may be categorized as noneligible, compliant, or noncompliant for each member-based quality metric 711. For example, in a clinical context, with respect to a member-based quality metric 711 (e.g., diabetes care), a member of a healthcare provider may be noneligible for consideration, compliant (e.g., the member has received the respective recommended care), or non-compliant (e.g., the member has not received the respective recommended care). In some examples, a member-based quality metric 711 may be a Healthcare Effectiveness Data and Information Set (HEDIS) quality metric 711 (e.g., Colorectal Cancer Screening, Diabetes Care—Eye Exam, Cardiovascular Care-Cholesterol Screening, etc.), Pharmacy quality metric 711 (e.g., Medical Adherence for Diabetics and Medical Adherence for Hypertonics), or the like as defined by CMS. In some examples, various operations and mathematical logic associated with HEDIS and Pharmacy quality metrics 710 may be similar such that the terms may be used interchangeably herein.

In some embodiments, a survey-based quality metric 711 is a type of quality derived from a survey for evaluating an interaction between one or more predictive entities and an associated evaluation entity 706. By way of example, in a clinical context, a survey-based quality metric 711 may be derived from a survey administered by CMS to assess one or more predictive entities' experiences with an evaluation entity 706. Examples of such quality metrics 710 include Annual Flu Vaccine, Rating of Drug Plan and Getting Appointments and Care Quickly, as defined by CMS. In some examples, a survey-based quality metric 711 may be derived from Consumer Assessment of Healthcare Providers and Systems (CAHPS) or Health Outcomes Survey (HOS).

In some embodiments, a survey-based quality metric 711 may be based on a plurality of sub-questions. In such a case, various operations with respect to a survey-based quality metric 711 described herein may be replicated for each sub-question where the quality metric 711 is based on the plurality of sub-questions. For example, a survey-based quality metric 711 may be the mean of a plurality of sub-questions.

In some embodiments, a categorical ranking scheme 712 is a rule-based ranking scheme for evaluating an entity group 708. A categorical ranking scheme 712 may define a plurality of ranked categories. A specific ranked category may be assigned to an entity group 708 based on the entity group's performance with respect to a plurality of metrics. For example, a specific ranked category may be assigned to an entity group 708 based on one or more quality metrics 710 associated with the entity group 708. In some examples, the ranked categories defined by a categorical ranking scheme 712 may be a set of discrete categories. By way of example, in a clinical context, the categorical ranking scheme 712 may be a Five-Star Quality Rating System defined by the Centers for Medicare & Medicaid Services (CMS). In such a case, the specific ranked categories may be one of the star levels defined by the Five-Star Quality Rating System. By way of example, an entity group 708, such as a health plan in a clinical example, may be assigned to a categorical quality-based star rating from one to five stars, with higher levels of reimbursement awarded for each incremental star (e.g., ranked category). In some examples, ranked category, such as a quality-based star rating of a health plan, may be determined by an entity group's aggregated performance on a set number of discrete quality measures. For example, following on from the clinical example, the 2025 Star Ratings are currently expected to consider forty different quality metrics 710.

In some examples, a specific ranked category may be assigned to an entity group 708 with respect to a time interval. For example, an entity group 708 may be assigned one specific ranked category for one time interval (e.g., a current year) and another specific ranked category for another time interval (e.g., a future year). In some examples, a change in the assigned specific ranked category associated with an entity group 708 (e.g., across two consecutive time intervals) may be associated with one or more impacts (e.g., higher levels of reimbursement, etc.). Using some of the techniques of the present disclosure, these impacts may be forecasted based on a plurality of plurality of predictive quality measures corresponding to each of a plurality of quality metrics 710 considered by a categorical ranking system. By way of example, impacts, such as metric-level impact scores, causal metric-level impact scores, causal quality-based impact scores 728, and/or the like may be generated based on a change in an assigned specific ranked category associated with an entity group 708 due to a prediction-based action 716.

In some embodiments, a quality impact score is a data entity representative of an impact associated with a prediction-based action 716. For example, in a clinical context, a quality impact score may be a revenue related to a health plan. In some examples, a quality impact score is conditional on a prediction-based action 716. For example, in a case where the quality impact score is a revenue related to a health plan, the revenue may be conditional on an enrollment status of one or more evaluation entities associated with the health plan (i.e., entity group 708). In some examples, a quality impact score may be used in combination with a group-based action-specific rank to generate a metric-level impact score.

In some embodiments, a quality impact score is a static and/or dynamic value, range of values, percentage, real number, ratio, numeric, and/or the like. By way of example, a quality impact score may be a value such as 2000, 1000, 500, or any other value.

In some embodiments, a metric-level impact score is a data entity representative of a change in a metric associated with a quality metric 711. By way of example, in a clinical context, a metric-level impact score may be a revenue change that may be substantively causally related to a given quality metric 711. In some examples, a metric-level impact score is based on an impact score and a group-based action-specific rank. In some examples, a metric-level impact score is used in combination with a metric-specific predictive impact measure 718 to generate a causal metric-level impact score.

In some embodiments, a metric-level impact score is a static and/or dynamic value, range of values, percentage, real number, ratio, numeric, and/or the like. By way of example, a metric-level impact score may be 100, 500, 1800, or any other value. By way of example, a metric-level impact score may be generated using the following equation:

$$DR_i = \frac{w_i\big[\langle s_R^i|\text{enrolled}\rangle - \langle s_R^i|\text{not enrolled}\rangle\big]\big[\langle R_{HP}|\text{enrolled}\rangle - \langle R_{HP}|\text{not enrolled}\rangle\big]}{\sum_{i=1}^{i=N} w_i\big[\langle s_R^i|\text{enrolled}\rangle - \langle s_R^i|\text{not enrolled}\rangle\big]},$$

where $DR_i$ denotes the metric-level impact score of quality metric i, $$\langle s_R^i\,|\,\text{enrolled}\rangle \text{ and } \langle s_R^i\,|\,\text{not enrolled}\rangle$$

denotes the group-based action-specific rank and $\langle R_{HP}|\text{enrolled}\rangle$ $\langle R_{HP}|\text{not enrolled}\rangle$ denotes the quality impact score.

In some embodiments, a causal metric-level impact score is a data entity representative of an impact associated with a given quality metric 711 and evaluation entity 706. For example, in a clinical context, a causal metric-level impact score may be a revenue generated with respect to a given quality metric 711 and a given evaluation entity 706. In some examples, a causal metric-level impact score is based on a metric-specific predictive impact measure 718 and metric-level impact score. In some examples, a plurality of causal metric-level impact scores is generated with respect to each of a plurality of quality metrics 710 and evaluation entities such that the revenue generated for a given evaluation entity 706 may be generated by aggregating the causal metric-level impact scores across all quality metrics 710 associated with the given evaluation entity 706. Similarly, a causal metric-level impact score for an entity group 708 may be generated by aggregating the causal metric-level impact scores across all evaluation entities for the entity group 708.

In some embodiments, a causal metric-level impact score is a static and/or dynamic value, range of values, percentage, real number, ratio, numeric, and/or the like. By way of example, a causal metric-level impact score may be a value such as 100, 500, 2000, or any other value. By way of example, a causal metric-level impact score may be generated using the following equation:

$$p_{ij} = \frac{c_{ij}DR_i}{\sum_{j=1}^{j=3} c_{ij}}.$$

where $p_{ij}$ denotes the causal metric-level impact score of quality metric i and evaluation entity j, $DR_i$ denotes the metric-level impact score of quality metric i, and $c_{ij}$ denotes the metric-specific predictive impact measure 718 of quality measure i and evaluation entity j.

In some embodiments, a causal quality-based impact score is a data entity representative of an impact associated with a given evaluation entity 706 for a plurality of quality metrics 710. For example, in a clinical context, a causal quality-based impact score may be a revenue generated with respect to a given evaluation entity 706 for a plurality of quality metrics 710. In some examples, a causal quality-based impact score is based on a plurality of causal metric-level impact scores. For example, a plurality of causal metric-level impact scores associated with an evaluation entity 706 may be used in combination (e.g., aggregated) to generate a causal quality-based impact score. By way of example, a causal quality-based impact score may be generated using the following equation:

$$p_j = \sum_{i=1}^{i=N} p_{ij}.$$

where $p_j$ denotes the causal quality-based impact score of evaluation entity j and $p_{ij}$ denotes the causal metric-level impact score of quality metric i and evaluation entity j.

In some embodiments, a metric-specific predictive impact measure 718 is generated using an action-specific causal inference model 724 based on the quality metric 711, the evaluation entity 706, and a prediction-based action 716.

In some embodiments, a metric-specific predictive impact measure 718 is a data entity that describes a change in a predictive quality performance measure 702 with respect to a particular prediction-based action 716. By way of example, in a clinical context, a metric-specific predictive impact measure 718 may correspond to a causal increase in a quality gap closure fraction with respect to a particular prediction-based action 716 (e.g., enrolment of an evaluation entity 706 in a program). The metric-specific predictive impact measure 718 may be used in combination with a respective predictive quality performance measure 702 to generate a modified quality performance measure for an evaluation entity 706.

In some embodiments, a metric-specific predictive impact measure 718 may be generated by a causal inference model. A metric-specific predictive impact measure 718 may be a static and/or dynamic value, range of values, percentage, real number, ratio, numeric, and/or the like. By way of example, a metric-specific predictive impact measure 718 may be a value such as 0.07, 0.01, 0.05, or any other value.

In some embodiments, a modified quality performance measure is a predictive quality performance measure 702 modified by a metric-specific predictive impact measure 718. A modified quality performance measure, for example, may represent an expected, modified performance of an evaluation entity 706 with respect to a quality metric 711 given the performance of a prediction-based action 716. By way of example, in a clinical context, a modified quality performance measure may include a causal quality gap closure fraction representing a predicted percentage of quality gaps accounted for by a quality metric 711 that are expected to be closed by an evaluation entity 706 over a clinical year given performance of a prediction-based action 716.

In some embodiments, a modified quality performance measure may be based on a predictive quality performance measure 702 and metric-specific predictive impact measure 718. A modified quality performance measure may be a static and/or dynamic value, range of values, percentage, real number, ratio, numeric, and/or the like. By way of example, a modified quality performance measure may be a value such as 0.75, 0.99, 0.83, or any other value.

In some embodiments, a metric-level categorical improvement prediction 720 is generated for the entity group 708 with respect to the quality metric 711 based on a comparison of the predictive quality performance, measure, the metric-specific predictive impact measure 718, and a metric-specific categorical threshold 714.

In some embodiments, a metric-level categorical improvement prediction 720 is a data entity that describes a prediction of whether an entity group 708 will be assigned an improved specific ranked category within a categorical ranking scheme 712 with respect to a particular quality metric 711. In some examples, a metric-level categorical improvement prediction 720 may be based on a comparison between a modified group quality performance measure and a metric-specific categorical threshold 714. For example, a metric-level categorical improvement prediction 720 may indicate that an improved Star Rating will not be assigned to an entity group 708 in response to a modified group quality performance measure (e.g., 0.85) failing to satisfy a metric-specific categorical threshold 714 (e.g., 0.88). In another example, a metric-level categorical improvement prediction 720 may indicate that an improved Star Rating will be assigned to an entity group 708 in response to a modified group quality performance measure (e.g., 0.90) satisfying a metric-specific categorical threshold 714 (e.g., 0.88). In some examples, a metric-level categorical improvement prediction 720 may be a static and/or dynamic value, range of values, percentage, real number, ratio, numeric, categorical variable, binary indicator such as 1 or 0, true or false, yes or no, and/or the like.

In some embodiments, a metric-specific categorical threshold 714 is a data entity that describes a threshold between categories of a categorical ranking scheme 712. A categorical ranking scheme 712 may include a plurality of specific ranked categories where each specific ranked category is associated with a range of values corresponding to a specific metric. By way of example, in a clinical context, a metric specific categorical threshold may be a value that defines a threshold associated with a modified group quality performance measure. For example, a modified group quality performance measure of a first value (e.g., 0.80) may correspond to an entity group 708 being assigned a first specific ranked category (e.g., 4 stars) while a modified group quality performance measure of a second value (e.g., 0.88) that satisfies a metric specific categorical threshold (e.g., 0.85) may correspond to the entity group 708 being assigned a second specific ranked category (e.g., 5 stars).

In some embodiments, a modified group quality performance measure is a measure that is based on a plurality of modified quality performance measures. For example, a modified group quality performance measure may be an average, median, aggregate, range, or the like based on a plurality of modified quality performance measures associated with an entity group 708.

In some embodiments, a modified group quality performance measure may be a static and/or dynamic value, range of values, percentage, real number, ratio, numeric, and/or the like. By way of example, a modified group quality performance measure may be a value such as 0.85, 0.83, 0.94, or any other value.

In some embodiments, a categorical improvement prediction 726 is generated for the entity group 708 with respect to the categorical ranking scheme 712 based on a weighted aggregation of the metric-level categorical improvement prediction 720 and a plurality of metric-level categorical improvement prediction 726s 722 respectively corresponding to the plurality of quality metrics 710.

In some embodiments, a categorical improvement prediction 726 is a prediction of a whether an improved specific ranked category will be assigned to an entity group 708 based on a prediction-based action 716. A categorical improvement prediction 726, for example, may be based on a first group-based action-specific rank (e.g., 2 Stars) without the performance of a prediction-based action 716 (e.g., enrollment in a program) and a second group-based action-specific rank (e.g., 3 Stars) with the performance of a prediction-based action 716 (e.g., enrollment in a program). In such an example, a categorical improvement prediction 726 may indicate that the prediction-based action 716 resulted in an improved specific rank category assigned to the entity group 708.

In some embodiments, a group-based action-specific rank is a predicted assigned specific ranked category for an entity group 708 with respect to a prediction-based action 716. A group-based action-specific rank, for example, may be determined by:

$$S_R = \left\lceil \frac{\sum_{i=1}^{i=N} w_i s_R^j}{\sum_{i=1}^{i=N} w_i} \right\rceil,$$

where $S_R$ denotes the group-based action-specific rank, $w_i$ denotes a metric-specific weight, and $$s_R^j$$

denotes a metric-specific action-specific rank of quality metric 711 *i*. In some examples, it is assumed that there are N discrete relevant quality metrics 710, and that disaster mitigation occurrences may be accounted for the model.

In some embodiments, a metric-specific action-specific rank is a predicted assigned specific ranked category of a categorical ranking scheme 712 for an entity group 708 based on a specific quality metric 711 and prediction-based action 716. For example, a plurality of metric-specific action-specific ranks may be predicted for an entity group 708 where each metric-specific action-specific rank corresponds to a specific quality metric 711 (e.g., HEDIS, CAHPS, HOS, etc.) and a specific prediction-based action 716 (e.g., enrollment in a program, no enrollment in a program). In one example, a metric-specific action-specific rank may correspond to a HEDIS quality measure given no enrollment in a program. In another example, a metric-specific action-specific rank may correspond to a CAHPS quality measure given enrollment in a program.

In some embodiments, a metric-specific weight is a data entity that describes a predetermined variable used to modify the value of another variable. A metric-specific weight, for example, may be a value associated with a specific quality metric 711 that is used to scale a metric-specific action-specific rank and/or scheme. In some examples, a metric-specific weight is defined by CMS.

In some embodiments, an operational quality measure is a type of quality for evaluating an optimization entity. By way of example, in a clinical context, an operation quality measure may include information describing complaints about a drug plan or if a plan makes timely decisions about appeals and reviewing appeals decisions. In some examples, an operational quality measure may be associated with or impact a specific ranked category assigned to an entity group. In some examples, a model may be configured to predict a specific ranked category associated with an operational quality measure assigned to an entity group for a particular time interval. For example, a machine learning operation forecasting model may be configured to predict a star rating of one or more operational quality measures for an entity group over a clinical year.

In some embodiments, a machine learning operational forecasting model is a data entity that describes parameters, hyper-parameters, and/or defined operations of a rules-based and/or machine learning model (e.g., model including at least one of one or more rule-based layers, one or more layers that depend on trained parameters, coefficients, and/or the like). A machine learning operation forecasting model, for example, may include one or more rule-based or machine learning models configured, trained (e.g., jointly, separately, etc.) to predict an operational quality measure. A machine learning operation forecasting model may include one or more of any type of machine learning model including one or more supervised, unsupervised, semi-supervised, reinforcement learning models, and/or the like. In some examples, a machine learning operation forecasting model may include multiple models configured to perform one or more different stages of a prediction process.

In some embodiments, a machine learning operation forecasting model is trained using one or more supervised training techniques. In some examples, machine learning operation forecasting model may be trained, using the supervised training techniques, to generate an operational quality measure for a quality metric based on one or more evaluation entity attributes and one or more ground truth operational quality measures. By way of example, a machine learning operation forecasting model may include a supervised machine learning regression model, such as a linear regression, logistic regression, and/or the like, that is previously trained (and/or continuously trained) to generate an operational quality measure for an evaluation entity based on one or more features (e.g., extracted from health records in a clinical context) of the evaluation entity.

In some embodiments, a performance of the prediction-based action 716 is initiated based on the categorical improvement prediction.

FIG. 8 is an operational example of a quality-based predictive data structure 800 of a plurality of quality-based predictive features in accordance with some embodiments discussed herein. As depicted, the quality-based predictive data structure 800 may include one or more predictive features for an entity group and/or each of a plurality of evaluation entities associated with an entity group.

For example, the quality-based predictive data structure 800 may include a plurality of evaluation entities 502A-C (e.g., a plurality of healthcare providers) that are each associated with a plurality of predictive features. For example, predictive quality performance measures 802, total quality gaps 804, predicted closed quality gaps 806, metric-specific categorical threshold 808 and/or improvement required for satisfying the metric-specific categorical threshold 810 may be associated an entity group and/or each of a plurality of evaluation entities associated with an entity group. In some examples, the aggregate of the total quality gaps 804 may be used in combination with aggregate of the predicted closed quality gaps 806 to generate a total for the predictive quality performance measures 802. For example, the predictive quality performance measure 802A is the quotient of the aggregate of the total quality gaps 804 and the aggregate of the predicted closed quality gaps 806. In some examples, the predictive quality performance measure 802A may be used in combination with the metric-specific categorical threshold 808 to generate the improvement required for satisfying the metric-specific categorical threshold 810. For example, the improvement required for satisfying the metric-specific categorical threshold 810 is the difference between the predictive quality performance measure 802A and the metric-specific categorical threshold 808.

FIG. 9 is an operational example of a quality-based predictive data structure 900 of a plurality of quality-based predictive features in accordance with some embodiments discussed herein. As depicted, the quality-based predictive data structure 900 may include one or more predictive features for an entity group and/or each of a plurality of evaluation entities associated with an entity group.

For example, the quality-based predictive data structure 900 may include a plurality of evaluation entities 502A-C (e.g., a plurality of healthcare providers) that are each associated with a plurality of predictive features. For example, predictive quality performance measures 802, metric-specific predictive impact measures 902, modified quality performance measures 904, total quality gaps 804, causal total closed quality gaps 906, metric-specific categorical threshold 808, and/or metric-level categorical improvement prediction 908 may be associated with an entity group and/or each of a plurality of evaluation entities associated with an entity group. For example, a plurality of predictive quality performance measures 802 may be generated for each of the evaluation entities 502A-C. In some examples, the modified quality performance measures 904 may be generated based on the predictive quality performance measures 802 and the metric-specific predictive impact measures 902. For example, each modified quality performance measure is the aggregate of a respective predictive quality performance measure and metric-specific predictive impact measure. In some examples, the aggregate of the causal total closed quality gaps 906 may be used in combination with the aggregate of the total quality gaps 804 to generate a total for the modified quality performance measures 904. For example, the total for the modified quality performance measures 904A is the quotient of the aggregate of the total quality gaps 804 and the aggregate of the causal total closed quality gaps 906. In some examples, the modified quality performance measure 904A may be used in combination with the metric-specific categorical threshold 808 to generate the metric-level categorical improvement prediction 908. For example, since the modified quality performance measure 904A satisfies the metric-specific categorical threshold 808, the metric-level categorical improvement prediction indicates the metric-specific categorical threshold 808 is satisfied (i.e., Yes).

FIG. 10 is an operational example of a quality-based predictive data structure 1000 of a plurality of quality-based predictive features in accordance with some embodiments discussed herein. As depicted, the quality-based predictive data structure 1000 may include one or more predictive features for each of a plurality of predictive entities and evaluation entities associated with an entity group.

For example, the quality-based predictive data structure 1000 may include a plurality of evaluation entities 502A-C and a plurality of predictive entities 504A-W that are each associated with a plurality of predictive features. For example, eligibility predictions 1002, engagement scores 1004, survey response likelihoods 1006, predicted scores 1008 and/or maximum potential scores 1010 may each be associated with an evaluation entity and/or predictive entity. Eligibility predictions 1002 may include a plurality of eligibility predictions (e.g., generated by an eligibility prediction sub-model) associated with the plurality of predictive entities 504. Similarly, survey response likelihoods 1006 may include a plurality of survey response likelihood scores (e.g., generated by a response likelihood prediction sub-model). In some examples, a predicted score of the plurality of predicted scores 1008 may be generated based on a respective engagement score of the plurality of engagement scores 1004 and survey response likelihood of the plurality of survey response likelihoods 1006. In some examples, a maximum potential score of the plurality of maximum potential scores 1010 may be generated based on a respective engagement score of the plurality of engagement scores 1004 and eligibility prediction of the plurality of eligibility predictions 1002.

FIG. 11 is an operational example of a quality-based predictive data structure 1100 of a plurality of quality-based predictive features in accordance with some embodiments discussed herein. As depicted, the quality-based predictive data structure 1100 may include one or more predictive features for an entity group and/or each of a plurality of evaluation entities associated with an entity group.

For example, the quality-based predictive data structure 1100 may include a plurality of evaluation entities 502A-C each associated with a plurality of predictive features. For example, predictive quality performance measures 1102, predicted scores 1104, maximum potential scores 1106, metric-specific categorical threshold 1108, and/or improvement required for the metric-specific categorical threshold 1110 may be associated with an entity group and/or each of a plurality of evaluation entities associated with an entity group. For example, a plurality of predictive quality performance measures 1102 may be generated for each of evaluation entities 502A-C. In some examples, the predicted scores 1104 associated with each evaluation entity may be the aggregate of the predicted scores 1008 for each predictive entity associated with a respective evaluation entity. Similarly, the maximum potential scores 1106 associated with each evaluation entity may be the aggregate of the maximum potential scores 1010 for each predictive entity associated with the respective evaluation entity. In some examples, the aggregate of the predicted scores 1104 may be used in combination with the aggregate of the maximum potential scores 1106 to generate a total for the predictive quality performance measures 1102. For example, the predictive quality performance measure 1102A is the quotient of the aggregate of the predicted scores 1104 and the aggregate of the maximum potential scores 1106. In some examples, the predictive quality performance measure 1102A may be used in combination with the metric-specific categorical threshold 1108 to generate the improvement required for the metric-specific categorical threshold 1110. For examples, the improvement required for the metric-specific categorical threshold 1110 is the difference between the predictive quality performance measure 1102A and the metric-specific categorical threshold 1108.

FIG. 12 is an operational example of a quality-based predictive data structure 1200 of a plurality of quality-based predictive features in accordance with some embodiments discussed herein. As depicted, the quality-based predictive data structure 1200 may include one or more predictive features for each of a plurality of evaluation entities associated with an entity group.

For example, the quality-based predictive data structure 1200 may include a plurality of evaluation entities 502A-C each associated with a plurality of predictive features. For example, predictive quality performance measures 1102, metric-specific predictive impact measures 1202, modified quality performance measures 1204, maximum potential scores 1106, causal predicted scores 1206, metric-specific categorical threshold 1108, and/or metric-level categorical improvement prediction 1208 may be associated with an entity group and/or each of a plurality of evaluation entities associated with an entity group. In some examples, the modified quality performance measures 1204 may be generated based on the predictive quality performance measures 1102 and the metric-specific predictive impact measures 1202. For example, each modified quality performance measure is the aggregate of a respective predictive quality performance measure and metric-specific predictive impact measure. In some examples, the aggregate of the causal predicted scores 1206 may be used in combination with the aggregate of the maximum potential scores 1106 to generate a total for the modified quality performance measures 1204. For example, the total for the modified quality performance measures 1204A is the quotient of the aggregate of the causal predicted scores 1206 and the aggregate of the maximum potential scores 1106. In some examples, the modified quality performance measure 1204A may be used in combination with the metric-specific categorical threshold 1108 to generate the metric-level categorical improvement prediction 1208. For example, since the modified quality performance measure 1204A fails to satisfy the metric-specific categorical threshold 1108, the metric-level categorical improvement prediction indicates the metric-specific categorical threshold 1108 is not satisfied (i.e., No).

FIG. 13 is an operational example of a quality-based predictive data structure 1300 of a plurality of quality-based predictive features in accordance with some embodiments discussed herein. As depicted, the quality-based predictive data structure 1300 may include one or more predictive features for each of a plurality of quality metrics. By way of example, the quality-based predictive data structure 1300 may include a plurality of quality metrics 1304 associated with one or more quality metric types 1302. In some examples, for each quality metric, one or more combinations of features may be generated, including a predictive quality performance measure 1306, modified quality performance measure 1308, a current improvement level 1310, a next improvement level, a next improvement threshold 1314, and/or a threshold reached 1316, and/or the like, in accordance with the one or more embodiments of the present disclosure.

FIG. 14 is an operational example of a quality-based predictive data structure 1400 of a plurality of quality-based predictive features in accordance with some embodiments discussed herein. As depicted, the quality-based predictive data structure 1400 may include one or more predictive features for each of a plurality of quality metrics.

For example, improvement levels without enrollment 1406 may include a plurality of indicators that indicate whether a respective quality metric will improve, decline, or not change with respect to a categorical ranking scheme and without the performance of a prediction-based action. Similarly, improvement levels with enrollment 1408 may include a plurality of indicators that indicate whether a respective quality metric will improve, decline or not change with respect to a categorical ranking scheme and with the performance of a prediction-based action. A total scheme-based quality improvement measure 1406A may be generated from a plurality of indicators from the improvement levels without enrollment 1406 and a plurality of weights from the measure weights 1410. Similarly, a total scheme-based quality improvement measure 1408A may be generated from a plurality of indicators from the improvement levels with enrollment 1408 and a plurality of weights from the measure weights 1410. In some examples, the total scheme-based quality improvement measure 1406A and total scheme-based quality improvement measure 1408A may be used in combination with a categorical ranking scheme to determine total star rating for each scheme-based quality improvement measure 1412 and 1416.

In some embodiments, a scheme-based quality improvement measure is a type of quality for evaluating the improvement of one or more quality metrics. By way of example, in a clinical context, a scheme-based quality improvement measure may evaluate whether a quality metric (e.g., HEDIS, CAHPS, HOS, etc.) for a particular entity group has significantly improved, declined, or not changed between two consecutive clinical years. In some examples, a scheme-based quality improvement measure may be associated with or impact a specific ranked category assigned to an entity group. In some examples, a scheme-based quality improvement measure may be a function of the performance of one or more quality measures (e.g., eligible quality measures within the CMS Star Ratings). In some examples, a scheme-based quality improvement measure is determined by a scheme-specific rule-based model. In some examples, a scheme-based quality improvement measure may be a static and/or dynamic value, range of values, percentage, real number, ratio, numeric, categorical variable, binary indicator, or the like. By way of example, a scheme-based quality improvement measure may be −0.036, 0.36, 0.15, or any other value.

In some embodiments, a scheme-specific rule-based model is a model configured to forecast a scheme-based quality improvement measure. In some examples, a scheme-specific rule-based model includes a paired t-test at a specific significance level (e.g., 5% significance level) that determines if a specific quality metric has significantly improved, declined, or not changed between different time intervals. By way of example, in a clinical context, a scheme-specific rule-based model may include a t-test (e.g., a paired t-test described by CMS) from which minimum values may be derived that define significant improvement or decline for a scheme-based quality improvement measure. By way of example, for a CMS categorical ranking scheme, examples may be extracted from CMS documentation and summarized to generate a scheme-specific rule-based model, including the following series of equations:

$$\text{Difference } (\textit{diff}) = \text{score}_2 - \text{score}_1$$

$$\text{correlation } (\textit{corr}) = \text{Table } I - 1 \text{ Star Rating Technical Notes}$$

$$\text{Standard Error} (\textit{SE}) = \sqrt{\frac{\text{score} * (100 - \text{score})}{\text{denominator}}}$$

$$\text{Covariance } (\text{cov}) = SE_1 * SE_2 * corr$$

$$SE \ (\textit{diff}) = \sqrt{SE_1^2 + SE_2^2 - 2 * cov}$$

$$\text{Test Statistic } (t) = \frac{\textit{diff}}{SE(\textit{diff})}$$

$$\textit{IMPR} \text{ Result} = \text{If } t > +1.96 \text{ then significant improvement}$$

$$\text{If } t < -1.96 \text{ then Significant Decline}$$

$$\text{Else No Significant Change}$$

Using the above series of equations, minimum values such that significant improvement or decline of a quality metric is achieved may be derived as follows by let $\tilde{r}2 \in [0,1]$ be the prior year quality metric score, letting $\text{denx} \in \mathbb{N}+$ be the current year quality metric's denominator (e.g., number of eligible predictive entities for the given quality metric), letting $\rho \in [0,1]$ be the year-on-year quality metric correlation, and letting $SE \in \mathbb{R}$ be the prior year's standard error. The thresholds for achieving significant improvement/decline are given by $x \in [0,1]$ such that:

$$\frac{x - \tilde{r}_2}{\sqrt{\frac{x(1-x)}{den_x} + SE^2 - 2\rho SE \sqrt{\frac{x(1-x)}{Den_x}}}} \pm 1.96 = 0$$

Since the above function is continuous and differentiable on the domain of the function, Newton's method may be applied to approximate the aforementioned thresholds. Note, in some examples, there are instances where no value for x exists that satisfies the expression. In such examples, the solution does not exist in the domain of the function and significant improvement/decline is impossible for the respective quality metric (e.g., a quality metric whose prior year score is close to the boundary of the domain).

Using the outputs from one or more models for one or more respective other quality measures, a plurality of metric-level categorical improvement prediction may be made. The following equation generalizes the total scheme-based quality improvement measure. In some examples, there may be one or more distinct scheme-based quality improvement measures (e.g., CMS part C and CMS part D) and the following equation generalized to both:

$$I_R = \left\lceil \frac{\sum_{j=1}^{j=M} w_j i_R^j}{\sum_{j=1}^{j=M} w_j} \right\rceil,$$

where $I_R$ denotes the total scheme-based quality improvement measure, $w_j$ denotes the metric-specific weight and $$i_R^j \in \{-1, 0, 1\}$$

denotes the scheme-based quality improvement measure for quality metric j. In some examples, it may be assumed that there are M discrete quality metrics that are eligible for the scheme-based quality improvement measures calculation. $I_R$ may be compared to a metric-specific categorical threshold to determine a metric-level categorical improvement prediction.

FIG. 15 is an operational example of a quality-based predictive data structure 1500 of a plurality of quality-based predictive features in accordance with some embodiments discussed herein. As depicted, the quality-based predictive data structure 1500 may include one or more predictive features for each of a plurality of quality metrics associated with an entity group.

For example, quality-based predictive data structure 1500 may include rank levels without enrollment 1506 which includes a plurality of metric-specific action-specific ranks that indicate a rank (e.g., of a categorical ranking scheme) respective to each quality metric of the plurality of quality metrics 1304 without the performance of a prediction-based action. Similarly, rank level with enrollment 1508 may include a plurality of metric-specific action-specific ranks that indicate a rank (e.g., of a categorical ranking scheme) respective to each quality metric of the plurality of quality metrics 1304 with the performance of a prediction-based action. A group-based action-specific rank with respect to a prediction-based action may be generated by a plurality of metric-specific action-specific ranks and metric-specific weights of measure weights 1510. For example, respective to the performance of a prediction-based action, a plurality of metric-specific action-specific ranks from rank levels with enrollment 1508 may be combined with a plurality of metric-specific weights form measure weights 1510 to generate group-based action specific rank 1512 for an entity group.

C. Prediction-Based Action Optimization

Figure 16:
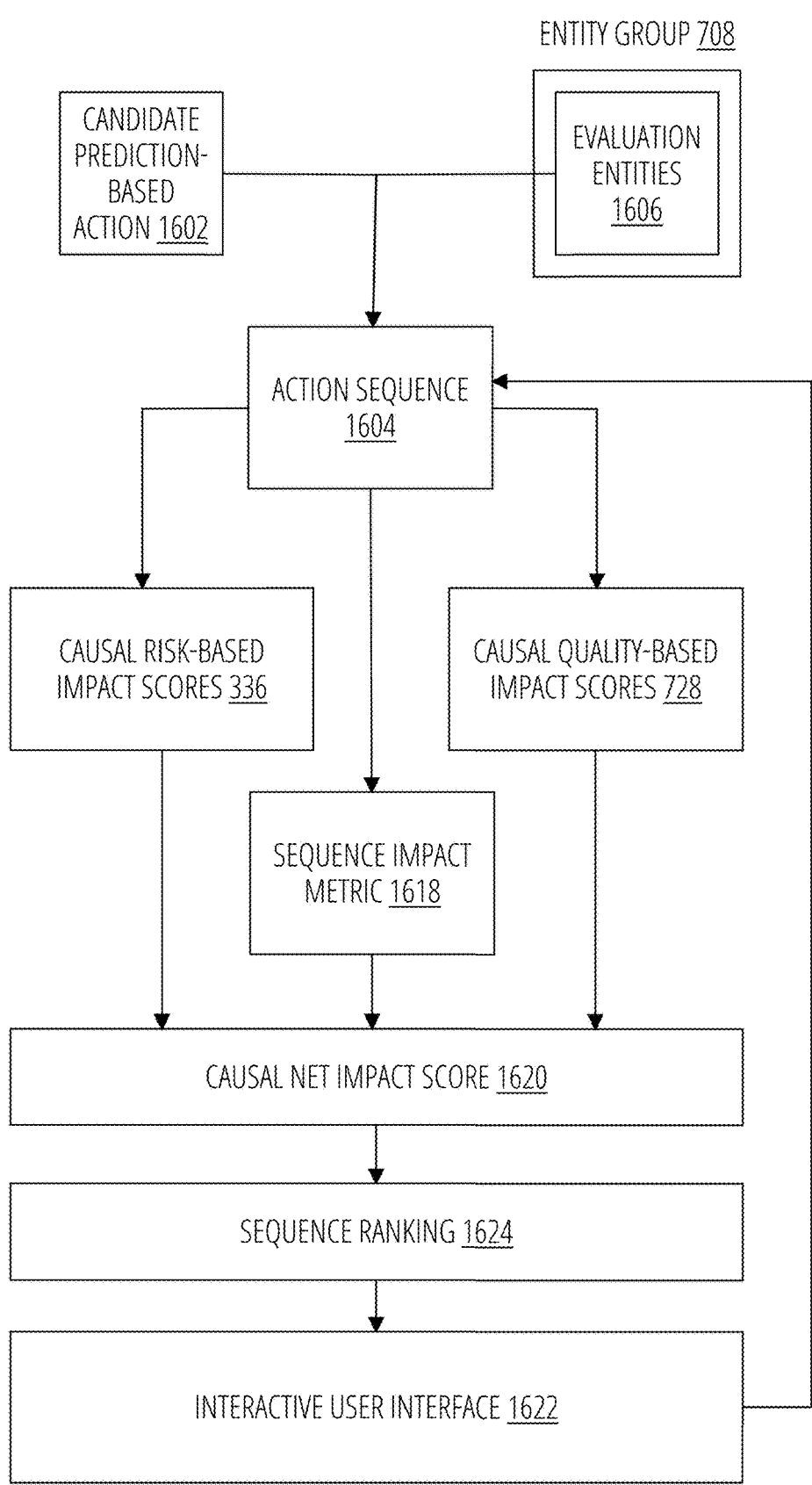
FIG. 16 is a dataflow diagram showing example data structures and modules for ranking a plurality of candidate prediction-based action sequences for an entity group in accordance with some embodiments discussed herein.

FIG. 16 is a dataflow diagram 1600 showing example data structures and modules for ranking a plurality of candidate prediction-based action sequences for an entity group in accordance with some embodiments discussed herein. The dataflow diagram 1600 depicts an intelligent ranking process in which a plurality of prediction-based actions is evaluated based on their net impact on an entity group. The intelligent ranking process may integrate multiple parallel forecasting pipelines, that collectively account for a plurality of a future circumstances with respect to a prediction-based action, to forecast a future opportunity for each of a plurality of prediction-based actions with respect to multiple disparate metrics. By doing so, an action sequence 1604 for a particular prediction-based action may be holistically evaluated, ranked, and initiated based on its impact relative to a plurality of different candidate action sequences.

In some embodiments, one or more candidate prediction-based actions are received for a plurality of evaluation entities 1606 within an entity group 708. In some embodiments, a plurality of causal risk-based impact scores 336 is generated for the plurality of evaluation entities 1606 with respect to a candidate prediction-based action 1602 of the one or more candidate prediction-based actions. The plurality of causal risk-based impact score 336, for example, may be generated in accordance with one or more techniques described herein.

In some embodiments, a plurality of causal quality-based impact scores 728 is generated for the plurality of evaluation entities 1606 and an action sequence 1604 for the plurality of evaluation entities 1606 with respect to the candidate prediction-based action 1602. In some examples, the action sequence 1604 may be sampled from a plurality of candidate action sequences using one or more sampling techniques. By way of example, the action sequence 1604 and/or one or more other action sequences may be generated using a Bayesian optimization or a stochastic gradient descent sampling technique. Each action sequence may be indicative of a plurality of action statuses for the plurality of evaluation entities 1606 with respect to the candidate prediction-based action 1602.

In some embodiments, the action sequence 1604 is a data entity that is descriptive of an action status for each of one or more evaluation entities 1606 within the entity group 708 with respect to a candidate prediction-based action 1602. By way of example, an action sequence 1604 may include a sequence of action statuses with respect to the candidate prediction-based action 1602. Each action status in the sequence of action statuses may identify whether a prediction-based action will be performed for a particular evaluation entity. For example, a prediction-based action may include a program in which an evaluation entity may be enrolled, and the action status may identify an enrollment status (e.g., enrolled, not enrolled, etc.) for an evaluation entity. By way of example, in a clinical context, the plurality of prediction-based actions may include a plurality of training programs and the action sequence may identify a particular set of evaluation entities (e.g., providers, etc.) within the entity group 708 (e.g., healthcare plan) that are (and/or are simulated to be) enrolled and/or not enrolled with a particular training program.

In some embodiments, the action status is a data entity that is descriptive of an evaluation entity's status with respect to the candidate prediction-based action 1602. For example, in a clinical context, an action status may provide an indication of whether an evaluation entity is enrolled in a training program. An action status may be updated dynamically to reflect the real time or near real time status of an evaluation entity with respect to a candidate prediction-based action 1602. An action status, for example, may be based on one or more of the action sequence 1604, updated action sequence, an enrollment response, selectable evaluation entity, and/or the like.

In some embodiments, a causal net impact score 1620 is generated for the action sequence 1604 based on (i) an aggregation of the plurality of causal risk-based impact scores 336 and the plurality of causal quality-based impact scores 728 and (ii) a sequence impact metric 1618 corresponding to the action sequence 1604. In some examples, the causal net impact score 1620 is generated based on one or more entity-specific impact metrics for one or more of the plurality of evaluation entities 1606. For example, one or more entity-specific impact metrics for one or more of the plurality of evaluation entities 1606 may be identified based on the candidate prediction-based action 1602 and the action sequence 1604. In some examples, the sequence impact metric 1618 may be generated based on an aggregation of the one or more entity-specific impact metrics.

In some embodiments, the entity-specific impact metric is a data entity that is descriptive of an impact associated with an evaluation entity and a candidate prediction-based action 1602. By way of example, in a clinical context, an entity-specific impact metric may include a cost to enroll a particular evaluation entity in a training program. In some examples, an entity-specific impact metric may be a static and/or dynamic value, range of values, percentage, real number, ratio, numeric, and/or the like. By way of example, an entity-specific impact metric may be a value such as 24,529.00, 12,971.06, 8,893.55, or any other value.

In some embodiments, a sequence impact metric 1618 is a data entity that is descriptive of an impact associated with the plurality of evaluation entities 1606 and an action sequence 1604 for a candidate prediction-based action 1602. A sequence impact metric 1618, for example, may include an aggregation (e.g., a summation, etc.) of each entity-specific impact metric for an action sequence 1604. By way of example, in a clinical context, a sequence impact metric 1618 may include an aggregated cost to enroll each of the enrolled evaluation entities of an action sequence 1604. In some examples, a sequence impact metric 1618 may be a static and/or dynamic value, range of values, percentage, real number, ratio, numeric, and/or the like. By way of example, a sequence impact metric 1618 may be a value such as 62,539.41, 41,721.06, 42,894.71, or any other value.

In some embodiments, the causal net impact score 1620 is a data entity that is descriptive of a net impact associated with an action sequence 1604. A causal net impact score 1620, for example, may be based on (e.g., an aggregate of) the plurality of causal quality-based impact scores 728, the plurality of causal risk-based impact scores 336, and the sequence impact metric 1618. By way of example, the causal net impact score 1620 may include a difference between (i) an aggregation of the causal quality-based impact scores 728 and the causal risk-based impact scores 336 and (ii) the sequence impact metric 1618. For example, in a clinical context, a causal net impact score 1620 may include a causal net profit associated with one or more enrollment decisions of an action sequence 1604. The causal net profit may include a revenue calculated from the causal quality-based impact scores 728 and the causal risk-based impact scores 336 minus the sequence impact metric 1618. In some examples, a causal net impact score 1620 may be a static and/or dynamic value, range of values, percentage, real number, ratio, numeric, and/or the like. By way of example, a causal net impact score 1620 may be a value such as 20,488.59, 23,283.74, −14,365.52, or any other value.

In some embodiments, a sequence ranking 1624 is generated for the action sequence 1604 based on a comparison between the causal net impact score 1620 and one or more causal net impact scores associated with one or more other action sequences for the plurality of evaluation entities 1606 with respect to the one or more candidate prediction-based actions.

In some embodiments, the sequence ranking 1624 is a data entity that is descriptive of a relative significance of the action sequence 1604 with respect to one or more alternative action sequences. A sequence ranking 1624, for example, may identify a rank ordering for a plurality of action sequences based on a plurality of respective causal net impact scores. For example, in a clinical context, a sequence ranking 1624 may include a prioritized list of a plurality of action sequences with respect to one or more enrollment requests. In this manner, a sequence ranking 1624 may be leveraged to automate one or more enrollment requests.

In some embodiments, a presentation of an interactive user interface 1622 is initiated. The interactive user interface 1622, for example, may be reflective of the action sequence 1604 and the sequence ranking 1624 for the action sequence 1604. The interactive user interface 1622 may be reflective of the causal net impact score 1620, one or more other action sequences, and/or one or more sequence rankings and one or more causal net impact scores for each of the other action sequences. In some examples, the interactive user interface 1622 may be reflective of a plurality of selectable evaluation entities corresponding to the plurality of evaluation entities 1606 of the entity group 708.

For example, the interactive user interface 1622 may include a plurality of selectable icons corresponding to one or more different action sequences and/or components thereof. In some examples, the interactive user interface 1622 may receive user input, such as a selection of a selectable icon, and, in response to the user input initiate an update to the action sequence 1604. The update to the action sequence 1604 may automatically trigger updated causal risk-based impact scores, causal quality-based impact scores, sequence impact metrics, causal net impact scores, sequence rankings, and/or the like for the updated action sequence. In this manner, the interactive user interface 1622 may provide a live feed of an action sequence that dynamical changed based on use input and/or any other real time changes associated with the candidate prediction-based action 1602. An example interactive user interface 1622 is described in further detail with reference to FIG. 17.

Figure 17:
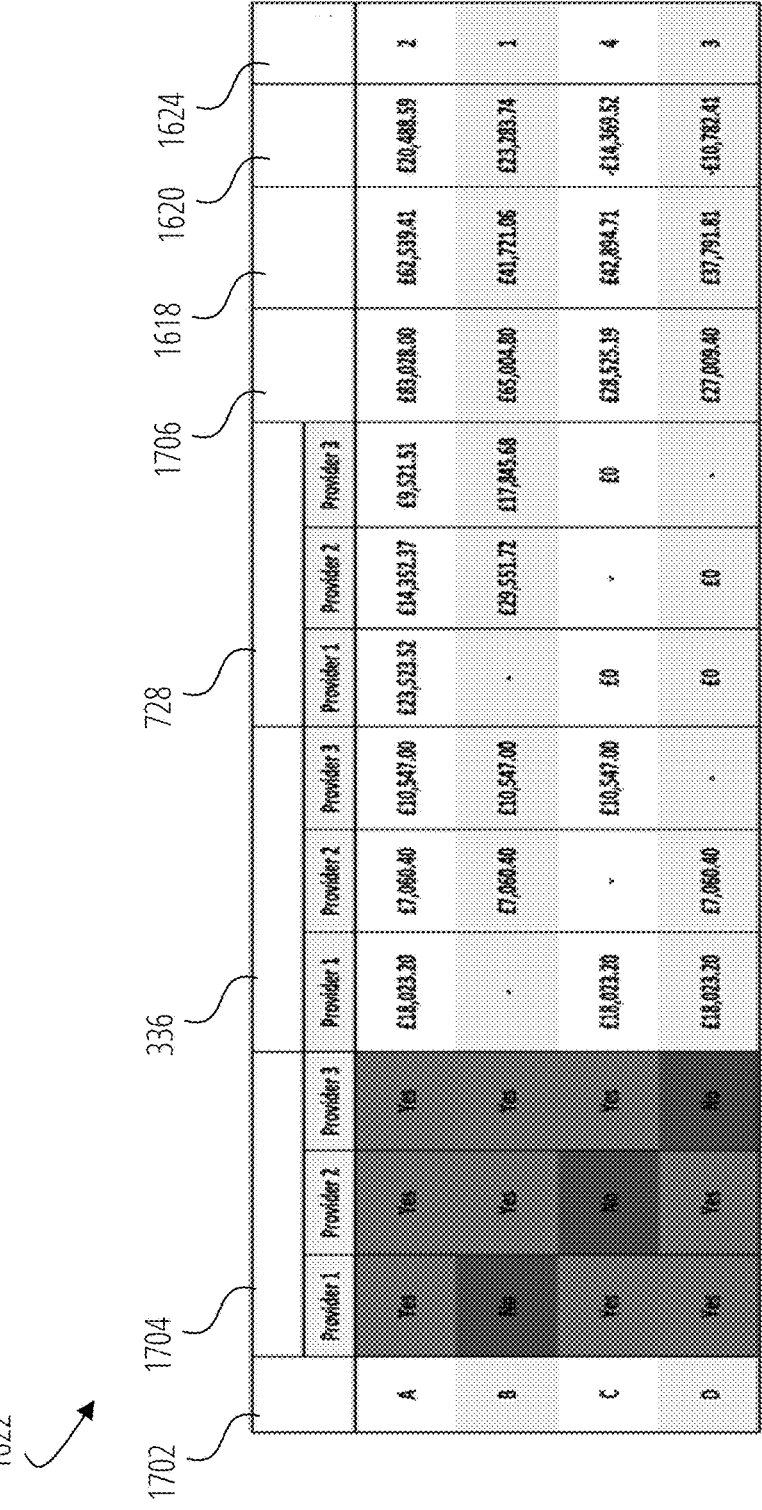
FIG. 17 is an operational example of an interactive user interface in accordance with some embodiments discussed herein.

FIG. 17 is an operational example of an interactive user interface 1622 in accordance with some embodiments discussed herein. As shown, the interactive user interface 1622 may be descriptive of a plurality of action sequences 1702 and a plurality of sequence attributes for each of the action sequences 1702. The sequence attributes, for example, may include a plurality of action statuses 1704, a plurality of causal risk-based impact scores 336, a plurality of causal quality-based impact scores 728, an aggregated cross-metric score 1706, a sequence impact metric 1618, a causal net impact score 1620, and/or a sequence ranking 1624. In some examples, the plurality of sequence attributes may be filtered based on a user. For example, a first subset of users with one or more first privileges may access each of the sequence attributes, whereas as a second subset of user with one or more second privileges may access only a subset of the sequence attributes. By way of example, the interactive user interface 1622 may limit a presentation to a plurality of action sequences 1702, the plurality of action statuses 1704, and the sequence rankings 1624 for a second subset of users.

In some embodiments, the interactive user interface 1622 is a specially configured graphical user interface tailored for optimizing prediction-based actions in accordance with some of the embodiments of the present disclosure. The interactive user interface 1622 may be configured to dynamically present, via one or more output devices (e.g., visual displays, audio devices, tactile devices, etc.) ranked action sequences based on one or more of the quality- and/or risk-based measures of the present disclosure. As described herein, the interactive user interface 1622 may dynamically update the ranked action sequences in response to one or more inputs, such as time, user input, action responses and/or the like. In this manner, the interactive user interface 1622 may present a live representation of ranked action sequences.

In some embodiments, the interactive user interface 1622 includes and/or is associated with one or more input mechanisms that enable a user to interact with information, such as a ranked action sequence and/or one or more components thereof, presented by the interactive user interface 1622. The input mechanisms, for example, may include one or more interactive icons displayed by an output device, one or more physical and/or digital buttons, one or more microphones for receiving audio input, and/or the like. By way of example, the ranked action sequences may include a plurality of selectable evaluation entities (and/or selectable components thereof) that enable interacting with one or more of an action sequence 1702, action status 1704, causal risk-based impact score 336, causal quality-based impact score 728, sequence impact metric 1618, causal net impact score 1620, sequence ranking 1624, selectable evaluation entity, updated action sequence, updated sequence ranking, enrollment request, enrollment response, denial response, approval response, and/or the like.

As described herein, an interactive user interface 1622 may receive user input via one or more input mechanisms and perform a real time action in response to the user input. The real time action, for example, may include updating an action sequence 1702 and/or one or more characteristics (e.g., an action status 1704 for a particular evaluation entity, etc.) and presenting an updated ranked list based on the updated action sequence. In addition, or alternatively, the real time action may include initiating a prediction-based action for an evaluation entity, providing an enrollment request to an evaluation entity device to enroll in a predictive-based action, and/or the like. In some examples, the interactive user interface 1622 may continuously receive action status updates (e.g., through communication with one or more external entities, etc.) from a plurality of evaluation entities and dynamically update the presented ranked action sequences in real time.

For example, a selection of a selectable evaluation entity of the plurality of selectable evaluation entities may cause an update to an action status 1704 for an evaluation entity corresponding to the selectable evaluation entity.

In some embodiments, a selectable evaluation entity a component of the interactive user interface 1622 representative of an evaluation entity and/or one or more components thereof. A selectable evaluation entity, for example, may include an interactive icon that enables a user to perform one or more operations with respect to an evaluation entity. In some examples, a selectable evaluation entity may be used to interact with information about a respective evaluation entity, such as an action status 1704, updated action sequence, updated sequence ranking, enrollment request, enrollment response, denial response, approval response, or the like. For example, selection of a selectable evaluation entity may cause generation of an enrollment request, enrollment response, an updated action sequence, an updated sequence ranking, information about the evaluation entity such as the enrollment status of the evaluation entity, or the like.

For example, the interactive user interface 1622 may initiate an action in response to the selection of a selectable evaluation entity. In some examples, in response to the selection of a selectable evaluation entity, an updated action sequence may be generated based on the update to the action status for the evaluation entity corresponding to the selectable evaluation entity. In addition, or alternatively, an updated sequence ranking for the updated action sequence may be generated and a presentation of an updated interactive user interface reflective of the updated action sequence and the updated sequence ranking may be initiated.

In some embodiments, an updated action sequence includes an action sequence that has been modified to reflect one or more changes. An updated action sequence, for example, may reflect a new or changed action status for one or more evaluation entities of an entity group. In some examples, an updated action sequence may be generated in response to selection of a selectable evaluation entity, an enrollment response, and/or the like.

In some embodiments, the updated sequence ranking is a sequence ranking 1624 that has been modified for an updated action sequence. An updated sequence ranking, for example, may reflect a new or changed rank order applied to an action sequence. By way of example, a sequence ranking may be updated in response to a change in one or more of an enrollment request, enrollment response, causal metric-based impact score, casual risk-based impact score, entity-specific cost metric, sequence impact metric, causal net impact score, action status, action sequence, updated action sequence, selectable evaluation entity, and/or the like.

In some examples, in response to a selection of a selectable evaluation entity of the plurality of selectable evaluation entities, an enrollment request may be provided for a candidate prediction-based action to an evaluation entity corresponding to the selectable evaluation entity. For example, an evaluation entity may be identified based on the selectable evaluation entity. A dynamic look-up may be performed to identify a network address for the identified evaluation entity. And an enrollment request may be automatically transmitted to the network address.

In some embodiments, an enrollment request includes a network message initiated by the interactive user interface 1622. An enrollment request may include a network message provided from an interactive user interface 1622 and to an evaluation entity. An enrollment request may include one or more instructions and/or a request for an evaluation entity to enroll in a prediction-based action. An enrollment request, for example, may be sent to an evaluation entity to prompt the evaluation entity to enroll in a training program. In some examples, an enrollment request may prompt an enrollment response.

In some embodiments, an enrollment response is received from the evaluation entity in response to the enrollment request. The enrollment response, for example, may include a denial response and/or an approval response. In response to either response, an action status of the plurality of action statuses 1704 and for the evaluation entity may be automatically updated to generate an updated action sequence. In some examples, an updated sequence ranking may be generated for the updated action sequence. In some examples, the presentation of an updated interactive user interface 1622 may be reflective of the updated action sequence and/or the updated sequence ranking.

In some embodiments, an enrollment response is a network message received by the interactive user interface 1622. An enrollment response may include a network message provided to an interactive user interface 1622 from an evaluation entity. An enrollment response, for example, may include one or more instructions and/or a response from an evaluation entity with respect to enrolling in a prediction-based action. The response, for example, may be indicative of an acceptance or a refusal to enroll with a prediction-based action. In some examples, an enrollment response may be used to reflect whether an evaluation entity becomes enrolled or not with respect to a prediction-based action. A particular enrollment response may include a denial response and/or an approval response. In some examples, the interactive user interface 1622 may automatically update an action sequence and/or sequence ranking in response to an enrollment response.

In some embodiments, a denial response is a type of enrollment response to an enrollment request. A denial response, for example, may reflect that an evaluation entity denied or was denied the option to enroll in a prediction-based action. In some examples, a denial response may be automatically generated in response to one or more conditions. For example, if an evaluation entity were to decline an enrollment request, a denial response may be generated in response. In another example, if an evaluation entity associated with a candidate prediction-based action were to decline an enrollment request, a plurality of denial responses may be generated with respect to other evaluation entities associated with the candidate prediction-based action in response.

In some embodiments, an approval response is a type of enrollment response to an enrollment request. An approval response may reflect an approval of an evaluation entity to enroll in a prediction-based action. In some examples, an approval response may be automatically generated in response to one or more conditions. For example, if an evaluation entity were to accept an enrollment request, an approval response may be generated in response.

D. Example Processes

Figure 18:
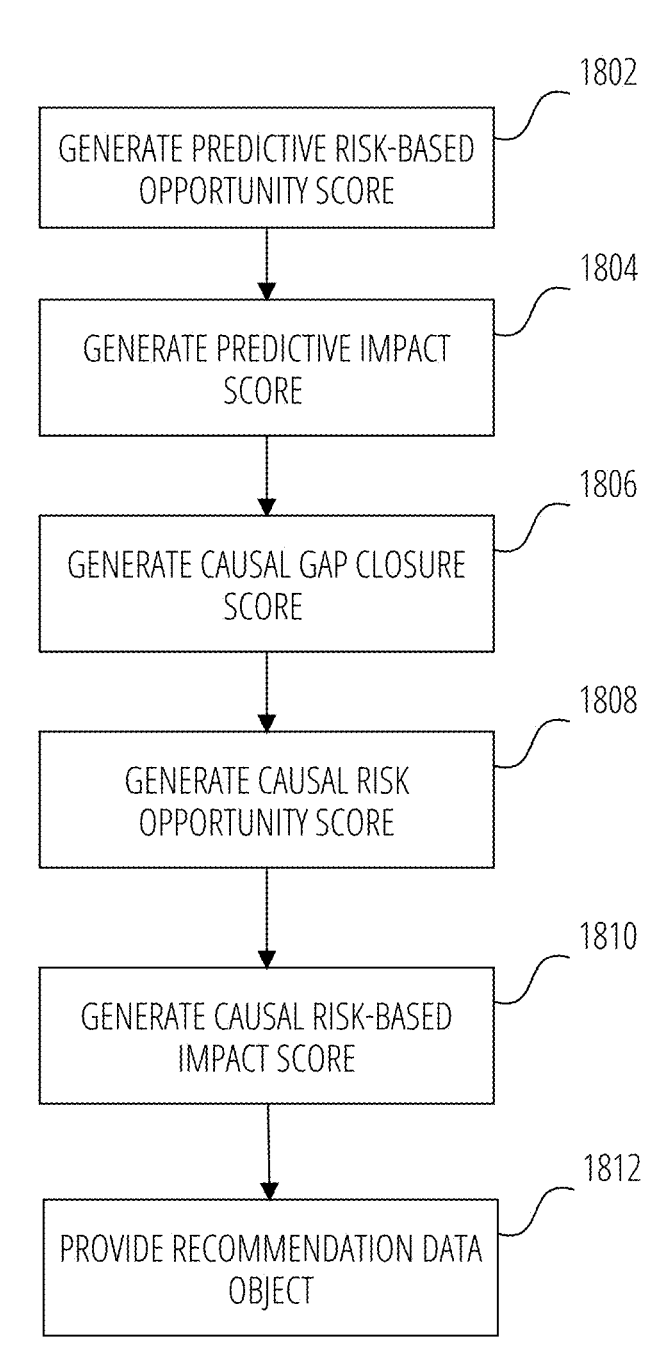
FIG. 18 is a flowchart showing an example of a process for forecasting causal risk-based impact scores in accordance with some embodiments discussed herein.

FIG. 18 is a flowchart showing an example of a process 1800 for forecasting causal risk-based impact scores in accordance with some embodiments discussed herein. The flowchart depicts a forecasting process that improves upon traditional forecasting techniques by that leveraging a multi-model pipeline to generate future risk-based predictions that account for a plural of disparate risk metrics. The process 1800 may be implemented by one or more computing devices, entities, and/or systems described herein. For example, via the various steps/operations of the process 1800, the computing system 101 may generate, leverage, and/or monitor risk-based impact scores with respect to a plurality of different evaluation entities and candidate prediction-based action to tailor prediction-based actions to a particular subset of entities. The multi-model pipeline may leverage a specific sequence of machine learning models, causal inference models, and probabilistic combinatorial techniques that collectively generate interpretable outputs with respect to a type of impact measure. By doing so, unlike traditional forecasting techniques, the process 1800 may generate holistic causal risk-based impact scores that account for a variety of different metrics while remaining interpretable to a human.

FIG. 18 illustrates an example process 1800 for explanatory purposes. Although the example process 1800 depicts a particular sequence of steps/operations, the sequence may be altered without departing from the scope of the present disclosure. For example, some of the steps/operations depicted may be performed in parallel or in a different sequence that does not materially impact the function of the process 1800. In other examples, different components of an example device or system that implements the process 1800 may perform functions at substantially the same time or in a specific sequence.

In some embodiments, the process 1800 includes, at step/operation 1802, generating a predictive risk-based opportunity score. For example, a computing system 101 may generate a predictive risk-based opportunity score for an evaluation entity based on (i) a plurality of engagement scores and (ii) a plurality of predictive risk scores respectively corresponding to a plurality of predictive entities within an entity cohort associated with the evaluation entity.

In some examples, an engagement score of the plurality of engagement scores that corresponds to a predictive entity is selected from one or more channel-specific engagement scores for the predictive entity. For example, each channel-specific engagement score of the one or more entity-specific engagement scores may correspond to a channel of a multi-channel domain and a channel-specific engagement score of one or more channel-specific engagement scores for a particular channel may be received from a channel-specific model based on a plurality of historical interaction data objects corresponding to the predictive entity. In some examples, the channel-specific model may be a supervised regression machine learning model.

In some examples, a predictive risk score of the plurality of predictive risk scores that corresponds to a predictive entity may include an aggregated risk score from a plurality of entity-specific sub-risk scores corresponding to the predictive entity. In some examples, each of the plurality of entity-specific sub-risk scores may be a binary indicator that corresponds to a particular condition in a hierarchical condition set.

In some embodiments, the process 1800 includes, at step/operation 1804, generating a predictive impact score. For example, a computing system 101 may generate, using an action-specific causal inference model, a predictive impact score of a prediction-based action on the evaluation entity. In some examples, the action-specific causal inference model may be a directed acyclic graph including a plurality of nodes and each of the plurality of nodes may correspond to a causal feature associated with a prediction-based action. In some examples, one of the plurality of nodes may be indicative of an enrollment status of the evaluation entity with a training program and the predictive impact score may be indicative of a predicted causal effect of the enrollment status of the evaluation entity.

In some embodiments, the process 1800 includes, at step/operation 1806, generating a causal gap closure score. For example, a computing system 101 may generate a causal gap closure score for the evaluation entity based on the predictive impact score and a gap closure rate associated with the evaluation entity.

In some embodiments, the process 1800 includes, at step/operation 1808, generating a causal risk opportunity score. For example, a computing system 101 may generate a causal risk opportunity score based on a comparison between the causal gap closure score and the predictive risk-based opportunity score. In some examples, the computing system 101 may generate an entity-specific engagement-risk score for a predictive entity of the plurality of predictive entities based on an aggregation of an engagement score and a predictive risk score corresponding to the predictive entity. In some examples, the computing system 101 may generate the predictive risk-based opportunity score based on an aggregation of a plurality of entity-specific engagement-risk scores respectively corresponding to the plurality of predictive entities within the entity cohort associated with the evaluation entity.

In some embodiments, the process 1800 includes, at step/operation 1810, generating a causal risk-based impact score. For example, a computing system 101 may generate a causal risk-based impact score for the prediction-based action and the evaluation entity based on a comparison between the causal risk opportunity score and a predictive improvement measure.

In some embodiments, the process 1800 includes, at step/operation 1812, provide recommendation data object. For example, a computing system 101 may provide, based on the causal risk-based impact score, a recommendation data object for the prediction-based action and reflective of one or more ranked evaluation entities that are ranked according to one or more corresponding causal risk-based impact scores.

Figure 19:
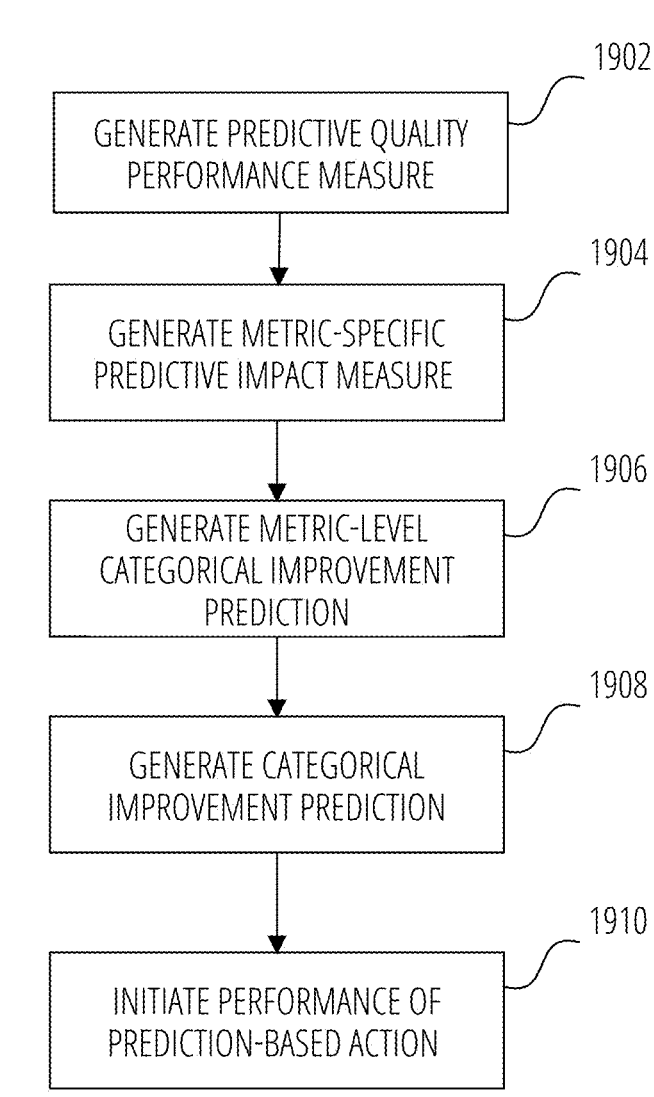
FIG. 19 is a flowchart showing an example of a process for generating a causal quality-based impact score in accordance with some embodiments discussed herein.

FIG. 19 is a flowchart showing an example of a process 1900 for generating a causal quality-based impact score in accordance with some embodiments discussed herein. The flowchart depicts a forecasting process that improves upon traditional forecasting techniques by that leveraging a multi-model pipeline to generate categorical predictions that account for a plural of disparate quality metrics defined by a categorical ranking scheme. The process 1900 may be implemented by one or more computing devices, entities, and/or systems described herein. For example, via the various steps/operations of the process 1900, the computing system 101 may generate, leverage, and/or monitor quality-based impact scores with respect to a plurality of different evaluation entities and candidate prediction-based actions to tailor prediction-based actions to a particular subset of entities. The multi-model pipeline may leverage a specific sequence of machine learning models, causal inference models, and probabilistic combinatorial techniques that collectively generate interpretable outputs with respect to a categorical. By doing so, unlike traditional forecasting techniques, the process 1900 may generate holistic categorical predictions that account for a variety of different metrics of a categorical ranking system while remaining interpretable to a human.

FIG. 19 illustrates an example process 1900 for explanatory purposes. Although the example process 1900 depicts a particular sequence of steps/operations, the sequence may be altered without departing from the scope of the present disclosure. For example, some of the steps/operations depicted may be performed in parallel or in a different sequence that does not materially impact the function of the process 1900. In other examples, different components of an example device or system that implements the process 1900 may perform functions at substantially the same time or in a specific sequence.

In some embodiments, the process 1900 includes, at step/operation 1902, generating a predictive quality performance measure. For example, a computing system 101 may generate, using a metric-specific predictive model, a predictive quality performance measure based on (i) an evaluation entity of a plurality of evaluation entities within an entity group and (ii) a quality metric of a plurality of quality metrics corresponding to a categorical ranking scheme for the entity group.

In some examples, the plurality of quality metrics includes (i) one or more member-based quality metrics that respectively define an effectiveness of an evaluation entity with respect to a service for a plurality of predictive entities associated with the evaluation entity and (ii) one or more survey-based quality metrics that respectively define a performance of an evaluation entity with respect to a survey performed by the plurality of predictive entities. In some examples, a metric-specific predictive model for a member-based quality metric may include a metric-specific performance forecasting model that is previously trained to generate the predictive quality performance measure for an evaluation entity based on a plurality of historical data objects associated with the evaluation entity. In some examples, a metric-specific predictive model for a survey-based quality metric includes a metric-specific performance simulation model that is configured to simulate a performance of a respective survey corresponding to the survey-based quality metric.

In some embodiments, the process 1900 includes, at step/operation 1904, generating a metric-specific predictive impact measure. For example, a computing system 101 may generate, using an action-specific causal inference model, a metric-specific predictive impact measure based on the quality metric, the evaluation entity, and a prediction-based action.

In some embodiments, the process 1900 includes, at step/operation 1906, generating a metric-level categorical improvement prediction. For example, a computing system 101 may generate a metric-level categorical improvement prediction for the entity group with respect to the quality metric based on a comparison of the predictive quality performance measure, the metric-specific predictive impact measure, and a metric-specific categorical threshold. In some examples, the computing system 101 may generate a modified quality performance measure for the evaluation entity based on an aggregation of the predictive quality performance measure and the metric-specific predictive impact measure. In some examples, the computing entity 101 may generate a group modified quality performance measure for the entity group based on an aggregation of the modified quality performance measure and a plurality of modified quality performance measure respectively corresponding the plurality of evaluation entities within the entity group. In some examples, the computing system 101 may generate the metric-level categorical improvement prediction based on a comparison between the group modified quality performance measure and the metric-specific categorical threshold.

In some embodiments, the categorical improvement prediction for the entity group with respect to the categorical ranking scheme is based on a weighted aggregation of the metric-level categorical improvement prediction, the plurality of metric-level categorical improvement predictions respectively corresponding the plurality of quality metrics, one or more operational quality measures, and one or more scheme-based quality improvement measures. In some examples, the computing system 101 may generate, using a machine learning operational forecasting model, the one or more operational quality measures for the entity group. In some examples, the computing system 101 may generate, using a rule-based model corresponding to the categorical ranking scheme, the one or more scheme-based quality improvement measures based on the plurality of metric-level categorical improvement predictions respectively corresponding to the plurality of quality metrics and the one or more operational quality measures.

In some embodiments, the process 1900 includes, at step/operation 1908, generating a categorical improvement prediction. For example, a computing system 101 may generate a categorical improvement prediction for the entity group with respect to the categorical ranking scheme based on a weighted aggregation of the metric-level categorical improvement prediction and a plurality of metric-level categorical improvement predictions respectively corresponding the plurality of quality metrics.

In some examples, the computing system 101 may generate a metric-level impact score for the prediction-based action based on the metric-level categorical improvement prediction, the categorical improvement prediction, and a quality impact score corresponding to the categorical improvement prediction. The computing system 101 may generate a causal metric-level impact score for the prediction-based action based on the metric-level impact score and the metric-specific predictive impact measure. In some examples, the computing system 101 may generate a causal quality-based impact score for the prediction-based action based on an aggregation of the causal metric-level impact score and a plurality of causal metric-level impact scores respectively corresponding to the plurality of quality metrics and the evaluation entity.

In some embodiments, the process 1900 includes, at step/operation 1910, initiating a performance of a prediction-based action. For example, a computing system 101 may initiate a performance of the prediction-based action based on the categorical improvement prediction. In some examples, the performance of the prediction-based action is based on a direct comparison between the causal quality-based impact score of the prediction-based action and a plurality of causal quality-based impact scores respectively corresponding to a plurality of candidate prediction-based actions for the entity group.

Figure 20:
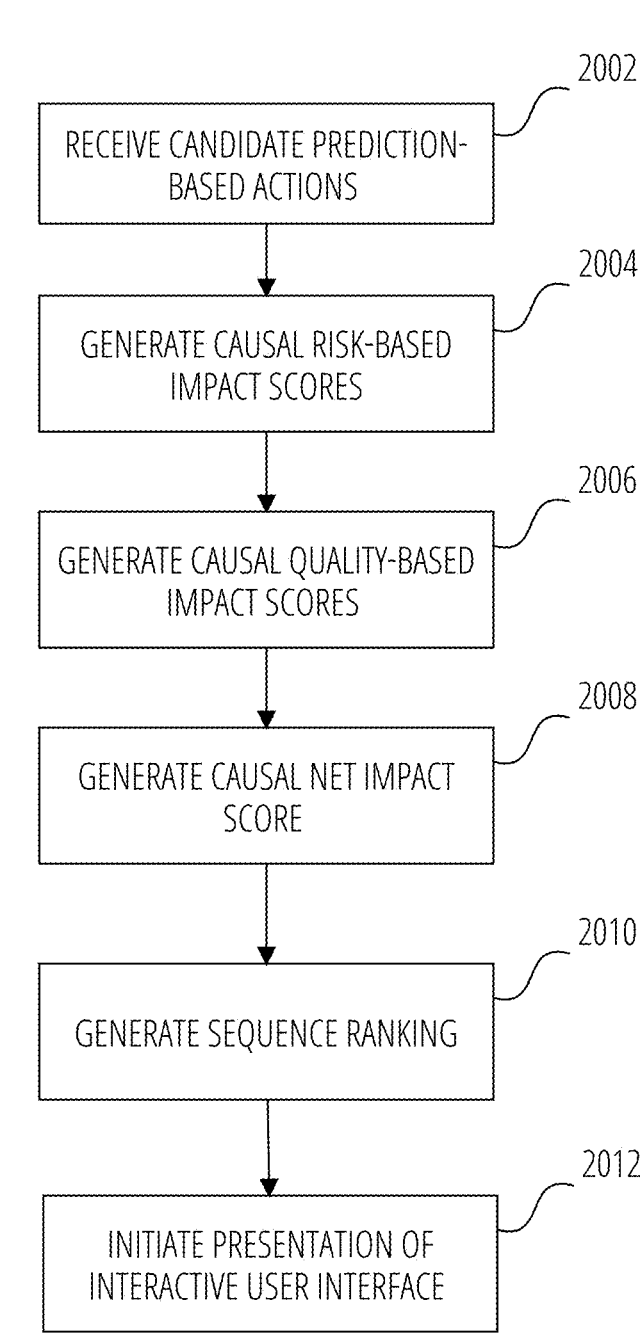
FIG. 20 is a flowchart showing an example of a process for arranging data within a user interface in accordance with some embodiments discussed herein.

FIG. 20 is a flowchart showing an example of a process 2000 for arranging data within a user interface in accordance with some embodiments discussed herein. The flowchart depicts a user interface-based process for arranging and update icons based on a combination of predictive measures. The process 2000 may be implemented by one or more computing devices, entities, and/or systems described herein. For example, via the various steps/operations of the process 2000, the computing system 101 may generate, leverage, and/or monitor the interrelated predictive measures, while providing interpretable and interactive results to users. By way of example, unlike forecasting techniques, the process 2000 may leverage an interactive user interface to dynamically update and optimize ranked action sequence based on a combination of time dependent predictive measures.

FIG. 20 illustrates an example process 2000 for explanatory purposes. Although the example process 2000 depicts a particular sequence of steps/operations, the sequence may be altered without departing from the scope of the present disclosure. For example, some of the steps/operations depicted may be performed in parallel or in a different sequence that does not materially impact the function of the process 2000. In other examples, different components of an example device or system that implements the process 2000 may perform functions at substantially the same time or in a specific sequence.

In some embodiments, the process 2000 includes, at step/operation 2002, receiving one or more candidate prediction-based actions. For example, a computing system 101 may receive one or more candidate prediction-based actions for a plurality of evaluation entities within an entity group.

In some embodiments, the process 2000 includes, at step/operation 2004, generating a plurality of causal risk-based impact scores. For example, a computing system 101 may generate a plurality of causal risk-based impact scores for the plurality of evaluation entities with respect to a candidate prediction-based action of the one or more candidate prediction-based actions.

In some embodiments, the process 2000 includes, at step/operation 2006, generating a plurality of causal quality-based impact scores. For example, a computing system 101 may generate a plurality of causal quality-based impact scores for the plurality of evaluation entities and an action sequence for the plurality of evaluation entities with respect to the candidate prediction-based action. In some examples, the action sequence and/or one or more other action sequences may be generated using a Bayesian optimization or a stochastic gradient descent sampling technique. Each action sequence may be indicative of a plurality of action statuses for the plurality of evaluation entities with respect to a candidate prediction-based action.

In some embodiments, the process 2000 includes, at step/operation 2008, generating a causal net impact score. For example, a computing system 101 may generate a causal net impact score for the action sequence based on (i) an aggregation of the plurality of causal risk-based impact scores and the plurality of causal quality-based impact scores and (ii) a sequence impact metric corresponding to the action sequence. In some examples, the computing system 101 may identify one or more entity-specific impact metrics for one or more of the plurality of evaluation entities based on the candidate prediction-based action and the action sequence. In some examples, the computing system 101 may generate the sequence impact metric based on an aggregation of the one or more entity-specific impact metrics.

In some embodiments, the process 2000 includes, at step/operation 2010, generating a causal sequence ranking. For example, a computing system 101 may generate a sequence ranking for the action sequence based on a comparison between the causal net impact score and one or more causal net impact scores associated with one or more other action sequences for the plurality of evaluation entities with respect to the one or more candidate prediction-based actions.

In some embodiments, the process 2000 includes, at step/operation 2012, initiating a presentation of an interactive user interface. For example, a computing system 101 may initiate a presentation of an interactive user interface reflective of the action sequence and the sequence ranking. In some examples, the interactive user interface may be reflective of the causal net impact score, the one or more other action sequences, and/or one or more sequence rankings and one or more causal net impact scores for each of the other action sequences.

In some examples, the interactive user interface may be reflective of a plurality of selectable evaluation entities corresponding the plurality of evaluation entities of the entity group. In some examples, a selection of a selectable evaluation entity of the plurality of selectable evaluation entities may cause an update to an action status for an evaluation entity corresponding to the selectable evaluation entity. In some examples, in response to the selection of the selectable evaluation entity, the computing system 101 may generate an updated action sequence based on the update to the action status for the evaluation entity corresponding to the selectable evaluation entity, generate an updated sequence ranking for the updated action sequence, and initiate the presentation of an updated interactive user interface reflective of the updated action sequence and the updated sequence ranking.

In some embodiment, in response to a selection of a selectable evaluation entity of the plurality of selectable evaluation entities, the computing system 101 may provide an enrollment request for the candidate prediction-based action to an evaluation entity corresponding to the selectable evaluation entity. In some examples, the computing system 101 may receive an enrollment response from an evaluation entity in response to the enrollment request. The computing system 101 may generate an updated action sequence based on the enrollment response and generate an updated sequence ranking for the updated action sequence. In some examples, the computing system 101 may initiate the presentation of an updated interactive user interface reflective of the updated action sequence and/or the updated sequence ranking.

In some examples, an action status of the plurality of action statuses and for an evaluation entity may be automatically updated in response to a denial response from the corresponding evaluation entity.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Some embodiments of the present disclosure may be implemented by one or more computing devices, entities, and/or systems described herein to perform one or more example operations, such as those outlined below. The examples are provided for explanatory purposes. Although the examples outline a particular sequence of steps/operations, each sequence may be altered without departing from the scope of the present disclosure. For example, some of the steps/operations may be performed in parallel or in a different sequence that does not materially impact the function of the various examples. In other examples, different components of an example device or system that implements a particular example may perform functions at substantially the same time or in a specific sequence.

Moreover, although the examples may outline a system or computing entity with respect to one or more steps/operations, each step/operation may be performed by any one or combination of computing devices, entities, and/or systems described herein. For example, a computing system may include a single computing entity that is configured to perform all of the steps/operations of a particular example. In addition, or alternatively, a computing system may include multiple dedicated computing entities that are respectively configured to perform one or more of the steps/operations of a particular example. By way of example, the multiple dedicated computing entities may coordinate to perform all of the steps/operations of a particular example.

Example 1. A computer-implemented method, the computer-implemented method comprising receiving, by one or more processors, one or more candidate prediction-based actions for a plurality of evaluation entities within an entity group; generating, by the one or more processors, a plurality of causal risk-based impact scores for the plurality of evaluation entities with respect to a candidate prediction-based action of the one or more candidate prediction-based actions; generating, by the one or more processors, a plurality of causal quality-based impact scores for the plurality of evaluation entities and an action sequence for the plurality of evaluation entities with respect to the candidate prediction-based action; generating, by the one or more processors, a causal net impact score for the action sequence based on (i) an aggregation of the plurality of causal risk-based impact scores and the plurality of causal quality-based impact scores and (ii) a sequence impact metric corresponding to the action sequence; generating, by the one or more processors, a sequence ranking for the action sequence based on a comparison between the causal net impact score and one or more causal net impact scores associated with one or more other action sequences for the plurality of evaluation entities with respect to the one or more candidate prediction-based actions; and initiating, by the one or more processors, a presentation of an interactive user interface reflective of the action sequence and the sequence ranking.

Example 2. The computer-implemented method of any of the preceding examples, wherein generating the causal net impact score comprises identifying one or more entity-specific impact metrics for one or more of the plurality of evaluation entities based on the candidate prediction-based action and the action sequence; and generating the sequence impact metric based on an aggregation of the one or more entity-specific impact metrics.

Example 3. The computer-implemented method of any of the preceding examples, wherein the action sequence and the one or more other action sequences are generated using a Bayesian optimization or a stochastic gradient descent sampling technique.

Example 4. The computer-implemented method of any of the preceding examples, wherein the interactive user interface is reflective of the causal net impact score, the one or more other action sequences, and one or more sequence rankings and the one or more causal net impact scores for each of the other action sequences.

Example 5. The computer-implemented method of any of the preceding examples, wherein the interactive user interface is reflective of a plurality of selectable evaluation entities corresponding the plurality of evaluation entities of the entity group.

Example 6. The computer-implemented method of any of the preceding examples, wherein the action sequence is indicative of a plurality of action statuses for the plurality of evaluation entities with respect to the candidate prediction-based action.

Example 7. The computer-implemented method of any of the preceding examples, wherein a selection of a selectable evaluation entity of the plurality of selectable evaluation entities causes an update to an action status for an evaluation entity corresponding to the selectable evaluation entity.

Example 8. The computer-implemented method of any of the preceding examples, wherein, in response to the selection of the selectable evaluation entity, the computer-implemented method comprises generating an updated action sequence based on the update to the action status for the evaluation entity corresponding to the selectable evaluation entity; generating an updated sequence ranking for the updated action sequence; and initiating the presentation of an updated interactive user interface reflective of the updated action sequence and the updated sequence ranking.

Example 9. The computer-implemented method of any of the preceding examples, wherein, in response to a selection of a selectable evaluation entity of the plurality of selectable evaluation entities, the computer-implemented method comprises providing an enrollment request for the candidate prediction-based action to an evaluation entity corresponding to the selectable evaluation entity.

Example 10. The computer-implemented method of any of the preceding examples, wherein an action status of the plurality of action statuses and for the evaluation entity is automatically updated in response to a denial response from the evaluation entity corresponding to the selectable evaluation entity.

Example 11. The computer-implemented method of any of the preceding examples, further comprising receiving an enrollment response from the evaluation entity in response to the enrollment request; generating an updated action sequence based on the enrollment response; generating an updated sequence ranking for the updated action sequence; and initiating the presentation of an updated interactive user interface reflective of the updated action sequence and the updated sequence ranking.

Example 12. A computing system comprising memory and one or more processors communicatively coupled to the memory, the one or more processors configured to: receive one or more candidate prediction-based actions for a plurality of evaluation entities within an entity group; generate a plurality of causal risk-based impact scores for the plurality of evaluation entities with respect to a candidate prediction-based action of the one or more candidate prediction-based actions; generate a plurality of causal quality-based impact scores for the plurality of evaluation entities and an action sequence for the plurality of evaluation entities with respect to the candidate prediction-based action; generate a causal net impact score for the action sequence based on (i) an aggregation of the plurality of causal risk-based impact scores and the plurality of causal quality-based impact scores and (ii) a sequence impact metric corresponding to the action sequence; generate a sequence ranking for the action sequence based on a comparison between the causal net impact score and one or more causal net impact scores associated with one or more other action sequences for the plurality of evaluation entities with respect to the one or more candidate prediction-based actions; and initiate a presentation of an interactive user interface reflective of the action sequence and the sequence ranking.

Example 13. The computing system of example 12, wherein generating the causal net impact score comprises: identifying one or more entity-specific impact metrics for one or more of the plurality of evaluation entities based on the candidate prediction-based action and the action sequence; and generating the sequence impact metric based on an aggregation of the one or more entity-specific impact metrics.

Example 14. The computing system of any of examples 12 through 13, wherein the action sequence and the one or more other action sequences are generated using a Bayesian optimization or a stochastic gradient descent sampling technique.

Example 15. The computing system of any of examples 12 through 14, wherein the interactive user interface is reflective of the causal net impact score, the one or more other action sequences, and one or more sequence rankings and the one or more causal net impact scores for each of the other action sequences.

Example 16. The computing system of any of examples 12 through 15, wherein the interactive user interface is reflective of a plurality of selectable evaluation entities corresponding the plurality of evaluation entities of the entity group.

Example 17. The computing system of any of examples 12 through 16, wherein the action sequence is indicative of a plurality of action statuses for the plurality of evaluation entities with respect to the candidate prediction-based action.

Example 18. The computing system of any of examples 12 through 17, wherein a selection of a selectable evaluation entity of the plurality of selectable evaluation entities causes an update to an action status for an evaluation entity corresponding to the selectable evaluation entity.

Example 19. One or more non-transitory computer-readable storage media including instructions that, when executed by one or more processors, cause the one or more processors to: receive one or more candidate prediction-based actions for a plurality of evaluation entities within an entity group; generate a plurality of causal risk-based impact scores for the plurality of evaluation entities with respect to a candidate prediction-based action of the one or more candidate prediction-based actions; generate a plurality of causal quality-based impact scores for the plurality of evaluation entities and an action sequence for the plurality of evaluation entities with respect to the candidate prediction-based action; generate a causal net impact score for the action sequence based on (i) an aggregation of the plurality of causal risk-based impact scores and the plurality of causal quality-based impact scores and (ii) a sequence impact metric corresponding to the action sequence; generate a sequence ranking for the action sequence based on a comparison between the causal net impact score and one or more causal net impact scores associated with one or more other action sequences for the plurality of evaluation entities with respect to the one or more candidate prediction-based actions; and initiate a presentation of an interactive user interface reflective of the action sequence and the sequence ranking.

Example 20. The one or more non-transitory computer-readable storage media of example 19, wherein the interactive user interface is reflective of a plurality of selectable evaluation entities corresponding the plurality of evaluation entities of the entity group.

The invention claimed is:

1. A computer-implemented method comprising:
displaying, by one or more processors, an interactive user interface comprising: (i) an action sequence, (ii) one or more sequence attributes for the action sequence, the one or more sequence attributes including an action status, and (iii) a sequence ranking for the action sequence, wherein the action sequence and the sequence ranking are generated by:
  receiving one or more candidate prediction-based actions for a plurality of evaluation entities within an entity group,
  generating, for the plurality of evaluation entities:
    a plurality of causal risk-based impact scores associated with a candidate prediction-based action of the one or more candidate prediction-based actions,
    a plurality of causal quality-based impact scores, and the action sequence with respect to the candidate prediction-based action,
  generating, for the action sequence, a causal net impact score based on (i) aggregating the plurality of causal risk-based impact scores and the plurality of causal quality-based impact scores and (ii) a sequence impact metric corresponding to the action sequence, and
  generating, the sequence ranking based on the causal net impact score and one or more causal net impact scores associated with one or more other action sequences for the plurality of evaluation entities;
responsive to detecting an update to the action status associated with the action sequence, generating, by the one or more processors, an updated interactive user interface comprising: (i) an updated action sequence, (ii) one or more updated sequence attributes for the updated action sequence, the one or more updated sequence attributes including an updated action status, (iii) an updated sequence ranking associated with the updated action sequence, and (iv) a sequence of selectable icons corresponding to the updated action sequence and the one or more other action sequences; and providing, by the one or more processors and via the updated interactive user interface, the sequence of selectable icons to a user.

2. The computer-implemented method of claim 1, wherein generating the causal net impact score comprises:

identifying one or more entity-specific impact metrics for one or more of the plurality of evaluation entities based on the candidate prediction-based action and the action sequence; and generating the sequence impact metric based on an aggregation of the one or more entity-specific impact metrics.

3. The computer-implemented method of claim 1, wherein the action sequence is generated using a Bayesian optimization or a stochastic gradient descent sampling technique.

4. The computer-implemented method of claim 1, wherein the interactive user interface indicates the causal net impact score, the one or more other action sequences, and one or more sequence rankings and the one or more causal net impact scores for each of the one or more other action sequences.

5. The computer-implemented method of claim 1, wherein the interactive user interface comprises a plurality of selectable evaluation entities corresponding to the plurality of evaluation entities of the entity group.

6. The computer-implemented method of claim 5, wherein the action sequence comprises a plurality of action statuses, each action status of the plurality of action statuses indicating whether the candidate prediction-based action will be performed for a corresponding evaluation entity of the plurality of evaluation entities.

7. The computer-implemented method of claim 5, wherein a selection of a selectable evaluation entity of the plurality of selectable evaluation entities causes the update to the action status for an evaluation entity corresponding to the selectable evaluation entity.

8. The computer-implemented method of claim 7, wherein, in response to the selection of the selectable evaluation entity, the computer-implemented method comprises:

generating the updated action sequence based on the update to the action status for the evaluation entity corresponding to the selectable evaluation entity;

generating the updated sequence ranking associated with the updated action sequence; and displaying the updated interactive user interface.

9. The computer-implemented method of claim 6, wherein, in response to a selection of a selectable evaluation entity of the plurality of selectable evaluation entities, the computer-implemented method comprises:

providing an enrollment request for the candidate prediction-based action to an evaluation entity corresponding to the selectable evaluation entity.

10. The computer-implemented method of claim 9, wherein the action status of the plurality of action statuses and for the evaluation entity is updated in response to detecting a denial response from the evaluation entity corresponding to the selectable evaluation entity.

11. The computer-implemented method of claim 9, further comprising:

receiving an enrollment response from the evaluation entity in response to the enrollment request;

generating the updated action sequence based on the enrollment response;

generating the updated sequence ranking for the updated action sequence; and displaying the updated interactive user interface.

12. A system comprising:

one or more processors; and one or more memories storing processor-executable instructions that, when executed, cause the one or more processors to perform operations comprising:

displaying an interactive user interface comprising: (i) an action sequence, (ii) one or more sequence attributes for the action sequence, the one or more sequence attributes including an action status, and (iii) a sequence ranking for the action sequence, wherein the action sequence and the sequence ranking are generated by:

receiving one or more candidate prediction-based actions for a plurality of evaluation entities within an entity group, generating, for the plurality of evaluation entities:

a plurality of causal risk-based impact scores associated with a candidate prediction-based action of the one or more candidate prediction-based actions, a plurality of causal quality-based impact scores, and the action sequence with respect to the candidate prediction-based action, generating, for the action sequence, a causal net impact score based on (i) aggregating the plurality of causal risk-based impact scores and the plurality of causal quality-based impact scores and (ii) a sequence impact metric corresponding to the action sequence, and generating the sequence ranking based on the causal net impact score and one or more causal net impact scores associated with one or more other action sequences for the plurality of evaluation entities;

responsive to detecting an update to the action status associated with the action sequence, generating an updated interactive user interface comprising: (i) an updated action sequence, (ii) one or more updated sequence attributes for the updated action sequence, the one or more updated sequence attributes including an updated action status, (iii) an updated sequence ranking associated with the updated action sequence, and (iv) a sequence of selectable icons corresponding to the updated action sequence and the one or more other action sequences; and providing, via the updated interactive user interface, the sequence of selectable icons to a user.

13. The system of claim 12, wherein generating the causal net impact score comprises:

identifying one or more entity-specific impact metrics for one or more of the plurality of evaluation entities based on the candidate prediction-based action and the action sequence; and generating the sequence impact metric based on an aggregation of the one or more entity-specific impact metrics.

14. The system of claim 12, wherein the action sequence is generated using a Bayesian optimization or a stochastic gradient descent sampling technique.

15. The system of claim 12, wherein the interactive user interface indicates the causal net impact score, the one or more other action sequences, and one or more sequence rankings and the one or more causal net impact scores for each of the one or more other action sequences.

16. The system of claim 12, wherein the interactive user interface comprises a plurality of selectable evaluation entities corresponding to the plurality of evaluation entities of the entity group.

17. The system of claim 16, wherein the action sequence comprises a plurality of action statuses, each action status of the plurality of action statuses indicating whether the candidate prediction-based action will be performed for a corresponding evaluation entity of the plurality of evaluation entities.

18. The system of claim 16, wherein a selection of a selectable evaluation entity of the plurality of selectable evaluation entities causes the update to the action status for an evaluation entity corresponding to the selectable evaluation entity.

19. One or more non-transitory computer-readable media storing processor-executable instructions that, when executed by one or more processors, cause the one or more processors to perform operations comprising:

displaying an interactive user interface comprising: (i) an action sequence, (ii) one or more sequence attributes for the action sequence, the one or more sequence attributes including an action status, and (iii) a sequence ranking for the action sequence, wherein the action sequence and the sequence ranking are generated by:

receiving one or more candidate prediction-based actions for a plurality of evaluation entities within an entity group, generating, for the plurality of evaluation entities, a plurality of causal risk-based impact scores associated with a candidate prediction-based action of the one or more candidate prediction-based actions, a plurality of causal quality-based impact scores, and the action sequence with respect to the candidate prediction-based action, generating, for the action sequence, a causal net impact score based on (i) aggregating the plurality of causal risk-based impact scores and the plurality of causal quality-based impact scores and (ii) a sequence impact metric corresponding to the action sequence, and generating the sequence ranking based on the causal net impact score and one or more causal net impact scores associated with one or more other action sequences for the plurality of evaluation entities;

responsive to detecting an update to the action status associated with the action sequence, generating an updated interactive user interface comprising: (i) an updated action sequence, (ii) one or more updated sequence attributes for the updated action sequence, the one or more updated sequence attributes including an updated action status, (iii) an updated sequence ranking associated with the updated action sequence, and (iv) a sequence of selectable icons corresponding to the updated action sequence and the one or more other action sequences; and providing, via the updated interactive user interface, the sequence of selectable icons to a user.

20. The one or more non-transitory computer-readable media storing the processor-excutable instructions of claim 19, wherein the interactive user interface comprises a plurality of selectable evaluation entities corresponding the plurality of evaluation entities of the entity group.

\* \* \* \* \*